United States Patent
Boonen et al.

(10) Patent No.: US 10,196,539 B2
(45) Date of Patent: Feb. 5, 2019

(54) THERMOSETTING POWDER COATING COMPOSITIONS COMPRISING METHYL-SUBSTITUTED BENZOYL PEROXIDE

(71) Applicant: DSM IP ASSETS B.V., Heerlen (NL)

(72) Inventors: Jozef Johannes Catherina Jacobus Boonen, Echt (NL); Johan Franz Gradus Antonius Jansen, Echt (NL); Jacob Leendert De Haas, Echt (NL); Petrus Henricus Marinus Wellenberg, Echt (NL); Gerrit Johannes De Lange, Echt (NL); Kurt Van Durme, Echt (NL); Hugo Gerrit Barend Renkema, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 173 days.

(21) Appl. No.: 15/026,340

(22) PCT Filed: Nov. 21, 2014

(86) PCT No.: PCT/EP2014/075294
§ 371 (c)(1),
(2) Date: Mar. 31, 2016

(87) PCT Pub. No.: WO2015/075186
PCT Pub. Date: May 28, 2015

(65) Prior Publication Data
US 2016/0264817 A1 Sep. 15, 2016

(30) Foreign Application Priority Data
Nov. 21, 2013 (EP) ..................................... 13193901

(51) Int. Cl.
*C09D 167/06* (2006.01)
*C08F 220/10* (2006.01)
*C09D 4/00* (2006.01)

(52) U.S. Cl.
CPC .......... *C09D 167/06* (2013.01); *C08F 220/10* (2013.01); *C09D 4/00* (2013.01)

(58) Field of Classification Search
None
See application file for complete search history.

(56) References Cited

U.S. PATENT DOCUMENTS

| | | | |
|---|---|---|---|
| 3,689,594 A * | 9/1972 | Groepper | C08F 283/01 525/26 |
| 4,751,273 A | 6/1988 | Lapin et al. | |
| 5,159,098 A | 10/1992 | Plotkin et al. | |
| 5,304,332 A | 4/1994 | Richart | |
| 5,480,726 A | 1/1996 | Richart | |
| 5,703,198 A | 12/1997 | Twigt et al. | |
| 6,005,017 A | 12/1999 | Daly et al. | |
| 6,028,212 A | 2/2000 | Shah et al. | |

(Continued)

FOREIGN PATENT DOCUMENTS

| | | |
|---|---|---|
| EP | 0431656 | 6/1991 |
| EP | 0636669 | 2/1995 |

(Continued)

OTHER PUBLICATIONS

JPH083235 English Machine Translation, created Mar. 8, 2018. (Year: 2018).*
International Search Report for PCT/EP2014/075294, dated Jan. 26, 2015, 3 pages.
Written Opinion of the ISA for PCT/EP2014/075294, dated Jan. 26, 2015, 6 pages.

(Continued)

*Primary Examiner* — Christopher M Rodd
(74) *Attorney, Agent, or Firm* — Nixon & Vanderhye P.C.

(57) ABSTRACT

The invention relates to thermosetting powder coating compositions comprising an unsaturated resin comprising ethylenic unsaturations and a thermal radical initiator comprising a first thermal radical initiator, wherein the first thermal radical initiator is a methyl-substituted benzoyl peroxide abbreviated herein as MBPO. The invention further relates to a process for making said thermosetting powder coating composition and processes for coating an article with said thermosetting powder coating composition. The invention further relates to a cured thermosetting powder coating composition derived upon curing of the thermosetting powder coating composition of the invention. The invention further relates to an article having coated thereon said thermosetting powder coating composition as well as to an article having coated and cured thereon said thermosetting powder coating composition. The invention further relates to the use of said thermosetting powder coating composition, to the use of an article having coated thereon said thermosetting powder coating composition and to the use of an article having coated and cured thereon said thermosetting powder coating composition. The invention further relates to cured thermosetting powder coating compositions derived upon curing of the thermosetting powder coating compositions comprising an unsaturated resin comprising ethylenic unsaturations and a first thermal radical initiator, said first thermal radical initiator being methyl-substituted benzoyl peroxide, abbreviated herein as MBPO. The invention further relates to the use of MBPO for thermosetting powder coating compositions and especially wherein the thermosetting powder coating compositions are heat-curable at low temperatures on heat-sensitive articles.

46 Claims, No Drawings

(56) References Cited

U.S. PATENT DOCUMENTS

| | | | |
|---|---|---|---|
| 6,048,949 | A | 4/2000 | Muthiah et al. |
| 6,194,525 | B1 | 2/2001 | Ortiz et al. |
| 6,235,228 | B1 | 5/2001 | Nicholl et al. |
| 6,291,541 | B1 | 9/2001 | Shah et al. |
| 2011/0262637 | A1* | 10/2011 | Jansen .................. C09D 5/033 427/180 |

FOREIGN PATENT DOCUMENTS

| | | |
|---|---|---|
| EP | 0844286 | 5/1998 |
| EP | 0942050 | 9/1999 |
| EP | 0957141 | 11/1999 |
| EP | 0957142 | 11/1999 |
| EP | 0980901 | 2/2000 |
| EP | 1221452 | 12/2000 |
| EP | 1195392 | 4/2002 |
| EP | 1195393 | 4/2002 |
| EP | 1023353 | 2/2004 |
| EP | 1398357 | 3/2004 |
| EP | 1424142 | 6/2004 |
| EP | 1477534 | 11/2004 |
| JP | 47-026189 | 7/1972 |
| JP | 55-27324 | 2/1980 |
| JP | H083235 A * | 1/1996 ............ C08F 283/01 |
| WO | 90/03988 | 4/1990 |
| WO | 93/19132 | 9/1993 |
| WO | 97/27253 | 7/1997 |
| WO | 97/38034 | 10/1997 |
| WO | 99/14254 | 3/1999 |
| WO | 01/52290 | 7/2001 |
| WO | 03/070794 | 8/2003 |
| WO | WO 03/070794 | 8/2003 |
| WO | 2006/082080 | 8/2006 |
| WO | 2007/045609 | 4/2007 |
| WO | 2007/134736 | 11/2007 |
| WO | 2010/052290 | 5/2010 |
| WO | 2010/052291 | 5/2010 |
| WO | 2010/052293 | 5/2010 |
| WO | 2010/052294 | 5/2010 |
| WO | 2010/052295 | 5/2010 |
| WO | 2010/052296 | 5/2010 |
| WO | 2011/138431 | 11/2011 |
| WO | 2012/144838 | 10/2012 |
| WO | WO 2012/144838 | 10/2012 |
| WO | 2014/173861 | 10/2014 |

OTHER PUBLICATIONS

Demand for International Preliminary Examination, dated Sep. 14, 2015, 36 pages.

Stanley R. Sandler et al; *Polymer Syntheses*, vol. I, $2^{nd}$ Ed., p. 557 (1992).

http://www.chemicalland21.com/specialtychem/finechem/BENZOYL%20PEROXIDE.htm.

* cited by examiner

THERMOSETTING POWDER COATING COMPOSITIONS COMPRISING METHYL-SUBSTITUTED BENZOYL PEROXIDE

This application is the U.S. national phase of International Application No. PCT/EP2014/075294 filed 21 Nov. 2014, which designated the U.S. and claims priority to EP Patent Application No. 13193901.9 filed 21 Nov. 2013, the entire contents of each of which are hereby incorporated by reference.

The invention relates to thermosetting powder coating compositions comprising an unsaturated resin comprising ethylenic unsaturations and a thermal radical initiator comprising a first thermal radical initiator, wherein the first thermal radical initiator is a methyl-substituted benzoyl peroxide abbreviated herein as MBPO. The invention further relates to a process for making said thermosetting powder coating composition and processes for coating an article with said thermosetting powder coating composition. The invention further relates to a cured thermosetting powder coating composition derived upon curing of the thermosetting powder coating composition of the invention. The invention further relates to an article having coated thereon said thermosetting powder coating composition as well as to an article having coated and cured thereon said thermosetting powder coating composition. The invention further relates to the use of said thermosetting powder coating composition, to the use of an article having coated thereon said thermosetting powder coating composition and to the use of an article having coated and cured thereon said thermosetting powder coating composition. The invention further relates to cured thermosetting powder coating compositions derived upon curing of the thermosetting powder coating compositions comprising an unsaturated resin comprising ethylenic unsaturations and a first thermal radical initiator, said first thermal radical initiator being methyl-substituted benzoyl peroxide, abbreviated herein as MBPO. The invention further relates to the use of MBPO for thermosetting powder coating compositions and especially wherein the thermosetting powder coating compositions are heat-curable at low temperatures on heat-sensitive articles. The invention further relates to a method for: i) rendering a thermosetting powder coating composition less susceptible to surface air inhibition and/or ii) enhancing the physical storage stability of a thermosetting powder coating composition and/or iii) enhancing the reactivity of a thermosetting powder coating composition.

Powder coating compositions (commonly referred to as powders) which are dry, finely divided, free flowing, solid materials at room temperature and at atmospheric pressure, have gained considerable popularity in recent years over liquid coating compositions for a number of reasons. For one powder coatings are user and environmentally friendly materials since they are virtually free of harmful volatile organic solvents carriers that are normally present in liquid coating compositions. Therefore, powder coatings give off little, if any, volatile materials to the environment when cured. This eliminates the solvent emission problems associated with liquid coating compositions such as air pollution and dangers to the health of workers employed in coating operations. Powder coating compositions are also clean and convenient to use since they are applied in a clean manner over the substrate because they are in dry solid form. The powders are easily swept up in the event of a spill and do not require special cleaning and spill containment supplies, as do liquid coating compositions. Working hygiene is thus improved. Moreover, powder coating compositions are essentially 100% recyclable since the sprayed powders can be fully reclaimed and recombined with fresh powder feed. Recycling of liquid coatings during application is often not done, which leads to increased waste and hazardous waste disposal costs. In addition, powder coating compositions are ready to use, i.e., no thinning or dilution is required.

Powder coating compositions are typically applied on a substrate via an electrostatic spray process; the powder coating composition is dispersed in an air stream and passed through a corona discharge field where the particles acquire an electrostatic charge. The charged particles are attracted to and deposited on the grounded article to be coated. The article, usually at room temperature, is then placed in an oven where the powder melts and forms a powder coating. A hybrid process based on a combination of high voltage electrostatic charging and fluidized-bed application techniques (electrostatic fluidized bed) has evolved, as well as triboelectric spray application methods. Powder coating compositions and their process of application are the preferred coating compositions and process for coating many familiar items such as lawn and garden equipment, patio and other metal furniture, electrical cabinets, lighting, shelving and store fixtures, and many automotive components. Today, powder coating compositions are widely accepted, with thousands of installations in the factories of original equipment manufacturers (OEMS) and custom coating job shops.

Powder coating compositions can be thermosetting or thermoplastic. The invention relates to the field of thermosetting powder coating compositions (TPCC). The preparation of thermosetting powder coating compositions is described by Misev in "Powder Coatings, Chemistry and Technology" (pp. 224-300; 1991, John Wiley& Sons Ltd.).

Despite their many advantages, powder coatings are generally not employed in coating heat sensitive substrates, such as wood and plastics. Heat sensitive substrates demand curing at low temperatures for example heat curing at temperatures as high as 130° C., to avoid significant substrate degradation and/or deformation. For instance when wood composites, e.g. particle board, fiber board and other substrates that comprise a significant amount of wood are heated to the high curing temperatures required for traditional powders (typically temperatures higher than 140° C.), the residual moisture and resinous binders present in the wood composites for substrate integrity caused to invariably evolve from the substrate. Outgassing of the volatiles during curing, results in severe blisters, craters, pinholes and other surface defects in the hardened film finish. Furthermore, overheating causes the wood composites to become brittle, friable, charred and otherwise worsened in physical and chemical properties. This is not acceptable from both a film quality and product viewpoint.

Low temperature curable powder coatings based on epoxy resins have been proposed as for example as taught in U.S. Pat. No. 5,714,206; however, curing agents used to achieve the low temperature curing are based on aliphatic amines which tend to yellow under heat; in addition, epoxy coatings generally do not provide the durability and weatherability that thermosetting powder coating compositions comprising unsaturated polyesters and thermal radical initiators e.g. peroxides and are cured via heat and/or UV radiation, normally provide.

Low temperature UV curable thermosetting powder coating compositions were proposed for coating heat sensitive substrates. UV powders still require exposure to heat, which is above either the glass transition temperature ($T_g$) or melt temperature ($T_m$) to sufficiently melt and flow out the powders into a continuous molten film over the substrate prior to UV radiation curing which is accomplished by exposing the molten film to UV radiation and the crosslinking reactions are triggered with UV radiation rather than heat. Thus, powder coating heat sensitive substrates with UV radiation curable powders requires a two step process typically comprising the steps of: i) heating the powder coating composition to melt and flow it out onto the substrate in order to form a continuous film and ii) UV radiate the film formed in order to harden (cure) it. In principle, heat curing of heat sensitive substrates is still desirable and preferred over UV curing; the reason is that heat curing has the advantage that in only a one step process that of heating a powder coating composition without the use of additional equipment, for instance equipment that generates UV light or accelerated electrons, the powder coating composition can be melted and cured onto a substrate.

Heat curing of thermosetting powder coating compositions is further desirable over UV curing because UV curing fails when it comes to powder coat complex three-dimensional articles and heat curing is the only way that powder coating of complex three-dimensional articles can be accomplished.

WO 03/070794 A1 disclosed a method of making copolymers of vinyl monomers; the mixture of vinyl monomers was polymerized in the presence of free radical polymerization initiators such as peroxides; once the vinyl monomers were polymerized via their vinyl double bonds, they afford saturated copolymers; the copolymers of WO 03/070794 A1 do not bear ethylenic unsaturations, thus they are not unsaturated resins comprising ethylenic unsaturations; moreover the copolymers of WO 03/070794 A1 do not form a composition with free radical polymerization initiators since the latter are consumed during the polymerization of the vinyl monomers. In addition, WO 03/070794 A1 does not relate to thermosetting powder coating compositions and it does not disclose thermosetting powder coating compositions as described herein and as defined by the claims.

EP 2 700 673 A2 (equivalent to WO 2012/144838 A2) disclosed a modified polyolefin copolymer as an encapsulant for an optoelectronic device. Polyolefins are the largest group of thermoplastics and are well-known saturated polymers of very high molecular weight. The modified polyolefin copolymer has two or more functional groups, and one of the functional groups is a carboxyl group. The modified polyolefin copolymer is a graft copolymer in which a) an ethylenically unsaturated silane compound as a first monomer, and b) a monomer having an ethylenically unsaturated double bond as a second monomer are grafted to a polyolefin. When the modified polyolefin copolymer of EP 2 700 673 A2 is prepared, a radical initiator may be used. The radical initiator may serve to graft the first monomer, for example, an unsaturated silane compound and the second monomer, for example, acrylic acid, and the like to a polyolefin; during this process the radical initiator is consumed; the modified polyolefins of EP 2 700 673 A2 are saturated polymers and they do not bear ethylenic unsaturations; thus they are not unsaturated resins comprising ethylenic unsaturations; moreover the polyolefins of EP 2 700 673 A2 do not contain unsaturated resins comprising ethylenic unsaturations and a radical initiator since the latter if used, is consumed during the grafting of the first and second monomers to the polyolefin. In addition, the compositions of EP 2 700 673 A2 are not thermosetting powder coating compositions and EP 2 700 673 A2 does not disclose thermosetting powder coating compositions as described herein and as defined by the claims.

In recent years, heat curable powder coating compositions that can be cured at low temperatures were proposed in WO 2010/052293; said publication provided for a one component heat curable powder coating composition comprising a resin comprising reactive unsaturations and wherein all said reactive unsaturations are carbon carbon double bonds connected directly to an electron withdrawing group, a thermal initiation system comprising a peroxide chosen from the group of compounds represented by the following formula A:

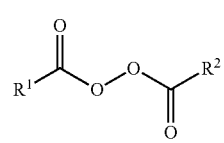

(formula A)

wherein $R^1$ and $R^2$ each independently stand for an optionally substituted alkyl of 1 to 30 C-atoms, wherein the 1 to 30 C-atoms do not include the C-atoms of the substituents or for an optionally substituted aryl of 6 to 18 C-atoms, wherein the 6 to 18 C-atoms do not include the C-atoms of the substituents and a co-crosslinker chosen from the group of vinylethers, vinylesters, vinylamides, itaconates, enamines and mixtures thereof. According to WO 2010/052293 the most preferred peroxide that reads on formula A was benzoyl peroxide (abbreviated herein as BPO) (see formula BPO, below). In the Examples of WO 2010/052293, Luperox® A75 (supplied from Arkema) was used as benzoyl peroxide.

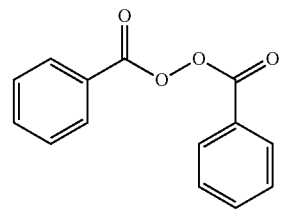

(formula BPO)

benzoyl peroxide

The one component heat curable powder coating composition of WO 2010/052293 was: i) easily processable in the extruder, ii) partially or fully thermally cured at low temperatures, for example between 60-130° C., making it suitable for use for heat-sensitive substrates and iii) storage stable. By "storage stable" WO 2010/052293 meant that a powder coating composition retains its curing characteristics, including flow, after storage; effectively WO 2010/052293 by "storage stable" meant the chemical storage stability (CSS) of its compositions. However, WO 2010/052293 does not make any reference to MBPO.

Thermosetting powder coating compositions comprising thermal radical initiators and resins comprising unsaturations based on carbon carbon double bonds connected directly to an electron withdrawing group can undergo rapid polymerization and curing; however, one of the severe drawbacks with the use of said thermosetting powder coating compositions is that said thermosetting powder coating compositions are severely susceptible to surface air inhibition (or also known as oxygen inhibition; terms will be used interchangeably herein) during their curing. More particularly, the free radical-induced polymerization or curing reaction of said thermosetting powder coating compositions is easily inhibited along the surface of the coating upon contact with air or, more precisely oxygen. Atmospheric oxygen, which contacts only the surface of the coating film, while leaving the interior unaffected, adds to the terminal free radical generated on the growing addition polymer and caps it, thereby halting further polymerization and leaving the surface of the coating cured to a lesser extend in comparison with the interior of the coating film; this often results in poorer coating surface properties, generally undesirable by the paint manufacturer and the end user alike.

Various approaches have been taken to minimize surface air inhibition. For instance, attempts have been made to incorporate polyethylene waxes in unsaturated polyester powder formulations to provide an oxygen barrier layer on the films's surface which is eventually polished off after curing. This approach works well with liquid coatings; however in powder coatings the rapid curing at low temperatures does not allow the wax enough time to diffuse and rise to the surface of the film. Higher wax loadings may be used, but this tends to cause the powders to agglomerate or sinter during storage and/or to produce an aesthetically unfavorable orange peel finish when cured. Another approach has been to incorporate oxygen-reactive species in the coatings, as for example, as taught in WO 93/19132; the latter disclosed low temperature curable unsaturated polyester powder coatings with a resin system composed of a mixture of unsaturated polyester resins and allyl ether curatives that is cured in the presence of free radical peroxide initiators and cobalt salt catalysts. Air inhibition is prevented by employing oxygen-reactive allyl ether curatives which consume oxygen before it can interfere with the curing reaction. However, one disadvantage of such powders is that the curatives used to get good surface cure are mostly liquids or waxy (low melting) semi-solids at room temperature. Liquid and semi-solid materials have only limited use in powder coatings. Typically, when employed beyond a few percent, they tend to cause the powders to agglomerate or sinter in storage, giving the powders poor shelf stability and making them difficult to meter and spray during coating operations. Conversion of such materials into solids is expensive and time-consuming. Another disadvantage is that the production of these low temperature curable powders is extremely difficult, since they have a tendency to pre-react and set-up in the extruder during the traditional melt-mixing process.

Another drawback of thermosetting powder coating compositions comprising thermal radical initiators and resins comprising unsaturations based on carbon carbon double bonds connected directly to an electron withdrawing group is that due to their generally high reactivity (rapid curing), their physical storage stability is rather limited; this drawback is especially pronounced for prolonged storage such as several weeks; prolonged storage conditions are typically encountered during for example overseas shipping of powders is rather limited; in these conditions, said powders need to be stored at rather low temperatures typically lower than 15° C.; limited/poor physical storage stability apart from adding to the complexity of commercializing such a powder due to special requirements for storage, it is generally undesirable by the paint manufacturer and the end user alike, since limited/poor physical storage stability of powder paints results to block or sinter during storage and/or producing an aesthetically undesirable orange peel finish when cured.

It would thus, be desirable and is, therefore, a primary object of the invention to provide a thermosetting powder coating composition (TPCC) that has any one of the following properties, alone or in combination with each other:
  i) thermosetting powder coating composition is heat curable;
  ii) thermosetting powder coating composition is less susceptible to surface air inhibition without the need for waxes or oxygen-reactive curatives;
  iii) thermosetting powder coating composition has at least sufficient, preferably enhanced chemical storage stability;
  iv) thermosetting powder coating composition has at least comparable, preferably enhanced physical storage stability;
  v) thermosetting powder coating composition is extrudable;
  vi) thermosetting powder coating composition is heat curable at low temperatures, thus being suitable for coating heat-sensitive articles;
  vii) thermosetting powder coating composition has at least comparable, preferably enhanced reactivity.

It would be particularly desirable to provide a thermosetting powder coating composition that has properties i)-ii), preferably properties i)-iii), more preferably properties i)-iv), even more preferably properties i)-v), most preferably properties i)-vi), especially properties i)-vii), more especially properties i), ii), iv) and v), even more especially properties i), ii), iv), v) and vi), most especially properties i), ii), iv), v), vi) and vii).

It is therefore an object of the invention to address some or all of the problems and/or some or all of the desired properties identified herein.

Therefore, broadly in accordance with the invention there is provided a thermosetting powder coating composition as described herein and as defined by the claims.

It was surprisingly found that the compositions of the invention address some or all of the problems and/or some or all of the desired properties identified herein. More particularly, the compositions of the invention have properties i)-ii), preferably properties i)-iii), more preferably properties i)-iv), even more preferably properties i)-v), most preferably properties i)-vi), especially properties i)-vii), more especially properties i), ii), iv) and v), even more especially properties i), ii), iv), v) and vi), most especially properties i), ii), iv), v), vi) and vii). Some of the combinations of said properties, for example the combination of (amongst others) enhanced reactivity, with extrudability and with enhanced physical storage stability is counter intuitive.

The thermosetting powder coating compositions of the invention comprise:
  (A) an unsaturated resin comprising ethylenic unsaturations; and
  (B) a thermal radical initiator comprising a first thermal radical initiator (said first thermal radical initiator is herein also mentioned as B1),
  wherein,
  the first thermal radical initiator is a methyl-substituted benzoyl peroxide.

Preferably the thermal radical initiator further comprises a second thermal radical initiator different than the first thermal radical initiator (said second thermal radical initiator is herein also mentioned as B2).

Preferably the first thermal radical initiator is bis-(4-methylbenzoyl)-peroxide.

Preferably, the unsaturated resin comprising ethylenic unsaturations is selected from the group consisting of polyester resins, acrylic resins, polyurethanes, epoxy resins, polyamides, polyesteramides, polycarbonates, polyureas and mixtures thereof.

Preferably, the ethylenic unsaturations of the unsaturated resin comprising ethylenic unsaturations are di-acid ethylenic unsaturations.

Preferably, the ethylenic unsaturations of the unsaturated resin comprising ethylenic unsaturations are 2-butenedioic acid ethylenic unsaturations.

Preferably, the unsaturated resin comprising ethylenic unsaturations is an unsaturated polyester resin comprising ethylenic unsaturations.

Preferably, the unsaturated resin comprising ethylenic unsaturations is an unsaturated polyester resin comprising di-acid ethylenic unsaturations.

Preferably, the unsaturated resin comprising ethylenic unsaturations is an unsaturated polyester resin comprising 2-butenedioic acid ethylenic unsaturations.

Preferably, the thermosetting powder coating composition of the invention further comprises: (C) a curing agent and/or (D) an accelerator and/or (E) a co-accelerator and/or (F) an inhibitor.

Preferably, the curing agent is a vinyl functionalized urethane resin selected from the group consisting of vinyl ether functionalized urethane resin, vinyl ester functionalized urethane resin and mixtures thereof.

In another aspect of the invention, there is provided a process for making the thermosetting powder coating composition of the invention comprising the steps of:
 a. mixing the components of the thermosetting powder coating composition of the invention to obtain a premix;
 b. heating the premix, preferably in an extruder, to obtain an extrudate;
 c. cooling down the extrudate to obtain a solidified extrudate; and
 d. grinding the solidified extrudate into smaller particles to obtain the thermosetting powder coating composition of the invention.

In another aspect of the invention there is provided a cured thermosetting powder coating composition derived upon curing of the thermosetting powder coating composition of the invention; preferably the cured thermosetting powder coating composition is a powder coating; said curing may be effected via heat- and/or radiation, preferably via heat. Equally, there is provided a form of any shape or size said form comprising the cured thermosetting powder coating composition, preferably said form is the cured thermosetting powder coating composition.

Preferably, the invention provides for a powder coating derived upon curing of the thermosetting powder coating composition of the invention; said curing may be effected via heat- and/or radiation, preferably via heat.

In another aspect the invention provides for an article having coated thereon the thermosetting powder coating composition of the invention.

Preferably the article is selected from the group consisting of heat-sensitive articles, non-heat-sensitive articles and combinations thereof.

Preferably, the article is a heat-sensitive article selected from the group consisting of wood, low density fibre board, medium density fibreboard, high density fibreboard, plastic, thermoplastic composite and combinations thereof.

Preferably, the article is a non-heat-sensitive article selected from the group consisting of thermoset composite, fibre reinforced composites, sandwich materials, metal and combinations thereof.

In another aspect, the invention provides for an article having coated and cured thereon the thermosetting powder coating composition of the invention.

Preferably, the article is selected from the group consisting of heat-sensitive articles, non-heat-sensitive articles and combinations thereof.

Preferably, the article is a heat-sensitive article selected from the group consisting of wood, low density fibre board, medium density fibreboard, high density fibreboard, plastic, thermoplastic composite and combinations thereof.

Preferably, the article is a non-heat-sensitive article selected from the group consisting of thermoset composite, fibre reinforced composites, sandwich materials, metal and combinations thereof.

In another aspect, the invention provides for a process for making a coated article as described herein and as defined by the claims; more particularly, the invention provides for a process for making a coated article comprising the steps of:
 applying the thermosetting powder coating composition of the invention to an article as herein;
 heating and/or radiating the thermosetting powder coating composition for enough time and at a suitable temperature to cure the thermosetting powder coating composition to obtain the coated article.

In another aspect of the invention there is provided a use of:
 a thermosetting powder coating composition of the invention; or
 a cured thermosetting powder coating composition (or equally a form of any shape or size, said form comprising the cured thermosetting powder coating composition); or
 an article as defined herein;
 in powder coatings, powder coatings for heat-sensitive articles, powder coatings for non-heat-sensitive articles, 3D-printing, automotive applications, marine applications, aerospace applications, medical applications, defense applications, sports/recreational applications, architectural applications, bottling applications, household applications, machinery applications, can applications, coil applications, energy applications, textile applications and electrical applications.

In another aspect the invention provides for the use of MBPO for thermosetting powder coating compositions and especially wherein the thermosetting powder coating compositions are heat-curable at low temperatures on heat-sensitive articles.

Definitions

By "methyl-substituted benzoyl peroxide" abbreviated as "MBPO", is meant herein a peranhydride of the following formula PER:

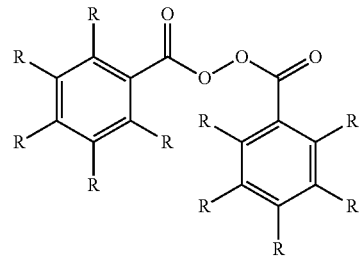

(Formula PER)

wherein,
R is hydrogen or methyl group and at least one of the R is a methyl group, isomers thereof and mixtures thereof. Exemplary methyl-substituted benzoyl peroxide include but are not limited to bis-(2-methylbenzoyl)-peroxide, bis-(3-methylbenzoyl)-peroxide, bis-(4-methylbenzoyl)-peroxide, (2-methylbenzoyl, 3-methylbenzoyl)-peroxide, (2-methylbenzoyl, 4-methylbenzoyl)-peroxide, (3-methylbenzoyl, 4-methylbenzoyl)-peroxide and mixtures thereof.

By "heat curable" is meant herein that the curing can be effected by using heat.

By a thermosetting powder coating composition (TPCC) being "heat curable at low temperatures" is meant herein that the TPCC is heat curable and once the TPCC is cured at 120° C. for 20 min, it affords a powder coating that can withstand at least 60, more especially at least 70, even more especially at least 80, most especially at least 90, for example at least 100, for example at least 120, for example at least 140, for example at least 160, for example at least 180, for example at least 200 acetone double rubs. A TPCC being heat curable at low temperatures is thus suitable for coating heat-sensitive articles.

By a thermosetting powder coating composition being "less susceptible to surface air inhibition" is meant herein that the sensitivity S of the TPCC (see Equation E1 in the Examples) is at most equal to 95%, more preferably at most 93%, even more preferably at most 90%, most preferably at most 88%, especially at most 86, more especially at most 85% of the S value of a comparable TPCC comprising BPO instead of MBPO as a first thermal radical initiator and as S is measured herein (see Examples, FT-IR Method S). S provides a measure of the sensitivity of a TPCC to surface air inhibition; the measurements for determining the S are carried out on cured films having a thickness of 80±5 μm, said cured films are powder coatings derived upon curing of TPCC at 120° C. for 10 min, in air; thus, the curing conditions that are to be applied for the curing of TPCC and thus the assessment/measurement of S are: 120° C. for 10 min, in air, and said assessment/measurement of S should be carried out on cured films having a thickness of 80±5 μm. The lower the S, the fewer are the unsaturations present on the surface of the cured film compared to the unsaturations on the substrate side of the cured film, and as such the least sensitive is the TPCC to surface air inhibition during curing. The terms "surface air inhibition" and "oxygen inhibition" will be used herein interchangeably.

By "curing characteristics" of a thermosetting powder coating composition is meant herein the $T_{onset\ curing}$, the $T_{peak\ curing}$ as these are defined and measured herein and the smoothness of a powder coating—as this is measured herein-derived upon curing of said thermosetting powder coating composition.

By a thermosetting powder coating composition having "sufficient chemical storage stability" is meant herein that the TPCC retains its curing characteristics after storage at 40° C. for 72 hours; herein chemical storage stability is abbreviated as CSS.

By a thermosetting powder coating composition having "enhanced chemical storage stability" is meant herein that the TPCC retains its curing characteristics after storage at 40° C. for 72 hours and any one of these characteristics, preferably at least one of them, more preferably at least two of them, even more preferably all three of them are better than the corresponding values of a comparable TPCC comprising BPO instead of MBPO as a first thermal radical initiator. By "better" in view of the assessment of the enhanced CSS is meant herein that the change in $T_{onset\ curing}$ and/or $T_{peak\ curing}$ and/or smoothness (flow) before and after storage at 40° C. for 72 hours, is lower than the change of the corresponding values of the comparable TPCC comprising BPO instead of MBPO as a first thermal radical initiator.

By a thermosetting powder coating composition having "comparable physical storage stability" is meant herein that the thermosetting powder coating composition upon storage at 23° C. for 7 weeks, has the same physical storage stability (PSS) with a comparable TPCC comprising BPO instead of MBPO as a first thermal radical initiator, PSS being measured according to the relevant method described in the Examples.

By a thermosetting powder coating composition having "enhanced physical storage stability" is meant herein that the thermosetting powder coating composition upon storage at 23° C. for 7 weeks, has a better physical storage stability (PSS) when compared with a comparable TPCC comprising BPO instead of MBPO as a first thermal radical initiator, PSS being measured according to the relevant method described in the Examples. Preferably, the physical storage stability of a TPCC according to the invention is at least 1 unit higher, more preferably is at least 2 units, even more preferably is at least 3 units higher than the physical storage stability of a comparable TPCC comprising BPO instead of MBPO as a first thermal radical initiator.

By "comparable reactivity" of a thermosetting powder coating composition is meant herein that the $\Delta H_{curing}$ of said TPCC as measured in the Examples and prior to any storage is ±1% of the $\Delta H_{curing}$ of a comparable TPCC comprising BPO instead of MBPO as a first thermal radical initiator.

By "enhanced reactivity" of a thermosetting powder coating composition is meant herein that the $\Delta H_{curing}$ of said TPCC as measured in the Examples and prior to any storage is higher than 1, preferably higher than 2, more preferably higher than 3, even more preferably higher than 4, most preferably higher than 5% of the $\Delta H_{curing}$ of a comparable TPCC comprising BPO instead of MBPO as a first thermal radical initiator.

By a thermosetting powder coating composition being "extrudable" is meant herein that once the components of said composition are mixed together, said mixture can be processed via an extruder.

By "curing" or "cure" is meant herein the process of becoming "set" that is to form an irreversibly crosslinked network (the so-called "cured form"), a material that can no longer flow, be melted or dissolved. Herein, the terms "curing" "cure" and "crosslinking" are used interchangeably. Preferably, the curing of the thermosetting powder coating composition of the invention takes place using heat and in that case the curing is "heat curing". For clarity, the term heat curing does not include ultraviolet (UV) or electron beam induced curing. When the curing of the thermosetting powder coating composition of the invention takes place using radiation i.e. UV and/or electron beam, in that case the curing is called "radiation curing". Optionally, a combination of heat and pressure can be used to cure the heat-curable thermosetting powder coating compositions of the invention. In the context of the invention, the term "heat curing" does not exclude the application of pressure along with heat in order to cure the heat-curable thermosetting powder coating compositions of the invention.

By "low temperatures" is meant herein temperatures in the range of 80-150° C., preferably 100-150° C., more preferably 110-150° C., even more preferably 120-150° C., most preferably 80-140° C., especially 80-130° C., more especially 80-120° C., most especially 80-110° C.

By "room temperature" is meant herein a temperature of 23° C.

A "resin" is herein understood to have the same meaning as it has to a skilled person in thermosetting polymer chemistry, namely as a low molecular weight polymer comprising reactive moieties such as for example ethylenic unsaturations, said resin is able to crosslink; said reactive moieties via a chemical reaction preferably said chemical reaction is induced by means of heat and/or radiation, ultimately connect the polymer chains together through the formation of permanent covalent (crosslink) bonds, resulting to the cured resin. The term "low molecular weight" means a theoretical number average molecular weight ($M_n$) ranging between a few hundred Da, e.g. 200 Da, and a few thousand Da, e.g. 20000 Da. Preferably a resin has a $M_n$ of at least 200, more preferably of at least 205, even more preferably of at least 210, most preferably of at least 215, especially of at least 220, more especially of at least 250, most especially of at least 300, for example of at least 310, for example of at least 315, for example of at least 350, for example of at least 400, for example of at least 450, for example of at least 500, for example of at least 600, for example of at least 700, for example of at least 800. Preferably, a resin has a $M_n$ of at most 20000, more preferably of at most 10000, even more preferably of at most 9000, most preferably of at most 8000, especially of at most 7000, more especially of at most 6000, most especially of at most 5000, for example of at most 4000, for example of at most 3500, for example of at most 3000, for example of at most 2500, for example of at most 2200 Da. A resin is classified as acid functional in case its hydroxyl value (OHV) is lower than its acid value (AV). A resin is classified as hydroxyl functional in case its acid value is lower than its hydroxyl value. In the context of the invention the acid value of a resin (AV in mg KOH/g resin) is measured titrimetrically according to ISO 2114-2000, whereas the hydroxyl value of a resin (OHV in mg KOH/g resin) is measured using ISO 4629-1978.

By "urethane resin" is meant herein a resin comprising urethane moieties . . . —NH—(C=O)—O— . . . .

By "composition" is meant herein the combining and/or mixture of distinct chemical substances and/or components to form a whole.

By "vinyl functionalized urethane resin" (VFUR) is meant herein a urethane resin comprising vinyl groups . . . —CH=CH$_2$.

The term "vinyl groups" is used herein interchangeably with the term "vinyl unsaturations".

The term "vinyl" is used herein interchangeably with the term "ethenyl".

By "vinyl ether functionalized urethane resin" (VEFUR) is meant herein a urethane resin comprising vinyl ether groups (see chemical structure 1;

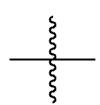

indicates the points of attachment of the vinyl ether group).

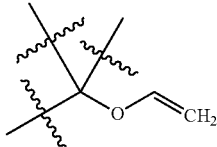

(chemical structure 1)

By "vinyl ester functionalized urethane resin" (VESFUR) is meant herein a urethane resin comprising vinyl ester groups (see chemical structure 2;

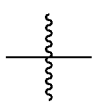

indicates the points of attachment of the vinyl ester group).

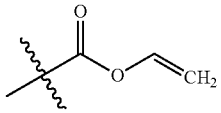

(chemical structure 2)

By "vinyl (ether-ester) functionalized urethane resin" is meant herein a urethane resin comprising vinyl ether groups (see chemical structure 1) and vinyl ester groups (see chemical structure 2).

Vinyl ether functionalized urethane resins, vinyl ester functionalized urethane resins and vinyl (ether-ester) functionalized urethane resins as well as their preferred embodiments are each a vinyl functionalized urethane resin.

By "powder" is meant herein, a substantially dry solid substance at room temperature and at atmospheric pressure reduced to a state of fine, loose particles wherein the individual particles have preferably a maximum particle size of at most 200, more preferably of at most 180, even more preferably of at most 160, most preferably of at most 150, especially of at most 140, more especially of at most 130, most especially of at most 120, for example of at most 110, for example of at most 100, for example of at most 90 µm at 23° C. and at atmospheric pressure; the individual particles have preferably a minimum particle size of at least 10, more preferably of at least 15, even more preferably of at least 20, most preferably of at least 25, especially of at least 30, more especially of at least 35, most especially of at least 40, for example of at least 45, for example of at least 50, for example of at least 60, for example of at least 70 µm at 23° C. and at atmospheric pressure. A particle is defined as a small object that: a) has mean linear dimensions as described herein after and b) behaves as a whole unit in terms of its transport and properties. The particle size distribution (PSD) of a powder is a list of values or a mathematical function that defines the relative amounts of particles present, sorted according to size. The terms "particle size" and "particle size distribution" will be used interchangeably in the context of the invention when used in relation to a powder. The method used to measure the particle size of the thermosetting powder coating compositions of the invention is sieve analysis. According to it, the powder is separated on sieves of different sizes. Thus, the PSD is defined in terms of discrete size ranges: e.g. "weight % of sample powder has particle size in the range of 75 microns to 90 microns", when sieves of these sizes are used. Preferably, 90 weight % of the thermosetting powder coating composition of the invention has a particle size in the range of 20 to 200 micron. The PSD can be determined for example by the following method: a certain amount of thermosetting powder coating composition, for example 100 g, is brought onto a Fritsch Analysette Spartan sieving apparatus equipped with a 200 micron sieve. The sample is sieved for 15 minutes at a 2.5 mm amplitude. The fraction of the sample which remained on the sieve was weighed after sieving. The fraction of the sample that went through the sieve (sieved fraction) is collected and is placed on a 160 micron sieve and is sieved as mentioned herein above. Once the same measurements (weighing) are performed as mentioned herein above, the same procedure is repeated using sequentially a 140, a 125, a 112, a 100, a 90, a 75, a 50 and a 20 micron sieve; the last sieved fraction with a size smaller than 20 micron is also weighed. Summing up the various weight fractions, this should yield the initial amount of sample, in this example 100 g. The various weight fractions represent the PSD as a list of values representing the relative amounts of particles present, sorted according to sieves used.

By "substantially dry" is meant herein that the powder e.g. a thermosetting powder composition, does not comprise any deliberately added water or moisture but the powder may comprise moisture absorbed from the atmosphere in an amount of up to 30, preferably up to 20, more preferably up to 10, even more preferably up to 5, most preferably up to 3, especially up to 2, more especially up to 1% w/w based on the total weight of the component.

By "thermosetting powder coating compositions" or "powders" is meant herein, a mixture of components in the form of a powder and which compositions have the ability to form an irreversible crosslinked network (the so-called 'cured form') upon curing, preferably via heat and/or radiation curing, more preferably via heat curing.

By "comparable TPCC comprising BPO instead of MBPO as a first thermal radical initiator" (mentioned also as "comparable TPCC"), is meant herein a TPCC that when compared to a TPCC according to the invention, the comparable TPCC:
i) does not contain MBPO; and
ii) the amount of moles of BPO per kg UR and curing agent—if the latter is present—in the comparable TPCC (moles BPO/Kg UR and curing agent if the latter is present) must be equal to the amount of moles of MBPO per kg UR and curing agent—if the latter is present—contained to a TPCC according to the invention (moles MBPO/Kg UR and curing agent if the latter is present); and
iii) the rest of the components of the comparable TPCC are the same and are contained in the same amounts when compared to a TPCC according to the invention. For example, if the TPCC of the invention comprises a first thermal radical initiator and a second thermal radical initiator, then—in essence—in a comparable TPCC according to the aforementioned definition, only the MBPO should be exchanged for BPO and the amount of moles of MBPO (moles/Kg UR and curing agent if the latter is present) should be exchanged for the same amount of moles of BPO (moles/Kg UR and curing agent if the latter is present) whilst the rest of the components and their amounts in the TPCC of the invention that is to be compared with the comparable TPCC should be the same.

By "components of the thermosetting powder coating compositions of the invention" is meant herein constituent elements, their preferred embodiments and combinations thereof, that constitute part of the thermosetting powder coating composition of the invention; said components, their preferred embodiments and combinations thereof, should be construed in view of the whole disclosure; exemplary components include but are not limited to UR, MBPO as each is defined herein.

By "heat-curable thermosetting powder coating composition" is meant herein a thermosetting powder coating composition, said composition has the ability to cure upon heating. For clarity, the thermosetting powder coating composition of the invention is heat-curable.

By "radiation-curable thermosetting powder coating composition" is meant herein a thermosetting powder coating composition, said composition has the ability to cure upon radiation i.e. UV and/or electron beam radiation. The thermosetting powder coating composition of the invention may be radiation curable.

By "heat- and/or radiation-curable thermosetting powder coating composition" is meant herein a thermosetting powder coating composition, said composition has the ability to cure upon heat- and/or radiation i.e. UV and/or electron beam radiation. The thermosetting powder coating composition of the invention may be heat- and/or radiation curable; preferably the thermosetting powder coating composition of the invention is heat-curable.

The terms amorphous and crystalline used to characterize a monomer or a resin or a resin composition are informal terms used in the art to indicate the predominant character of the relevant monomer or resin or resin composition in respect to its degree of crystallinity but these terms are defined more precisely herein by melting enthalpy ($\Delta H_m$) values. The term "crystalline" denotes both crystalline and semicrystalline By "amorphous" is meant herein that a monomer or a resin for example a vinyl functionalized urethane resin or a resin composition for example a vinyl functionalized urethane resin composition has a melting enthalpy ($\Delta H_m$) lower than 35 J/g. Preferably the amorphous monomer or resin or resin composition does not have a melting temperature ($T_m$).

By "crystalline" is meant herein that a monomer or a resin for example a vinyl functionalized urethane resin or a resin composition for example a vinyl functionalized urethane resin composition has a melting enthalpy ($\Delta H_m$) of at least 35, more preferably of at least 38, even more preferably of at least 40, most preferably of at least 50, especially of at least 60 J/g.

By "$T_g$" is meant herein the glass transition temperature. The $T_g$ is measured using DSC (Differential Scanning calorimetry) as described herein.

By "$T_a$" is meant herein the crystallization temperature; in case a monomer or a resin or a resin composition has multiple crystallization peaks, then the peak temperature of the crystallization peak with the largest crystallization enthalpy ($\Delta H_c$) is mentioned herein as $T_c$. The $T_c$ is measured using DSC (Differential Scanning calorimetry) as described herein.

By "$T_m$" is meant herein the melting temperature; in case a monomer or a resin or a resin composition or a compound has multiple meltings then the $T_m$ of the melting with the largest melting enthalpy is mentioned herein as $T_m$. The $T_m$ is measured using DSC as described herein.

By "$\Delta H_c$" is meant herein the melting enthalpy. The ($\Delta H_m$) is measured using DSC as described herein. In case a monomer or a resin or a resin composition has more than one melting peaks then the melting enthalpy ($\Delta H_m$) values mentioned herein, refer to the total of the melting enthalpy ($\Delta H_m$) said total obtained by summing up the $\Delta H_m$ values of each of the melting peaks.

By "$\Delta H_c$" is meant herein the crystallization enthalpy. The ($\Delta H_c$) is measured using DSC as described herein. In case a monomer or a resin or a resin composition has more than one crystallization peaks then the crystallization enthalpy ($\Delta H_c$) values mentioned herein, refer to the total of the crystallization enthalpy ($\Delta H_c$) said total obtained by summing up the $\Delta H_c$ values of each of the crystallization peaks.

By "$\Delta H_{curing}$" is meant herein the net exothermic result of all chemical and physical processes that happen during the curing of the TPCC. The $\Delta H_{curing}$ is measured using DSC as described herein.

The $T_{peak\ curing}$ was measured as the temperature recorded at the maximum heat flow of the exothermic signal (=exothermic peak) attributed to curing reactions. The $T_{peak\ curing}$ is measured using DSC as described herein.

The $T_{onset\ curing}$ was measured as the temperature at the intersection of:
a) the extrapolated baseline regarding the exothermic signal attributed to curing reactions, with
b) the best fitting tangent on the part of said exothermic signal contained between the $T_{peak\ curing}$ and the temperature at which an initial change in the baseline occured (=low temperature side of the exothermic peak)

The glass transition temperature ($T_g$), melting temperature ($T_m$), crystallization temperature ($T_c$), melting enthalpy ($\Delta H_m$) crystallization enthalpy $\Delta H_{curing}$, $T_{peak\ curing}$ and $T_{onset\ curing}$ measurements are carried out via differential scanning calorimetry (DSC) on a TA instruments DSC Q2000, in $N_2$ atmosphere as described herein.

By "cured thermosetting powder coating composition" is meant herein a form that is derived upon partial or full curing of a thermosetting powder coating composition; said curing may be effected via heat and/or radiation, preferably via heat; said form may have any shape or size and it can for example be a film, coating; preferably the cured thermosetting powder coating composition is a powder coating.

By "powder coating" is meant herein the partially or fully cured form of a thermosetting powder coating composition, the latter being preferably heat- and/or radiation curable, said form being a coating. A powder coating is derived upon curing of a thermosetting powder coating composition.

By "article" is meant herein an individual object or item or element of a class designed to serve a purpose or perform a special function and can stand alone. A substrate is an example of an article.

By "di-acid" as used herein means a dicarboxylic acid or anhydride or diester or other derivatives of a dicarboxylic acid such as for examples dicarboxylic acid salts; preferably "di-acid" is a dicarboxylic acid or anhydride, more preferably "di-acid" is a dicarboxylic acid.

By "ethylenic unsaturation" as used herein means cis- or trans-configured reactive carbon-carbon double bond unsaturation and does not include aromatic unsaturation, carbon-carbon triple bond, carbon-heteroatom unsaturation. Preferably, the ethylenic unsaturation comprises at least a hydrogen which is covalently bonded to a carbon of the ethylenic unsaturation.

The term 'di-acid ethylenic unsaturations' as used herein means ethylenic unsaturations obtainable from any isomer of an unsaturated di-acid and/or derivatives thereof, such as for example ethylenic unsaturations obtainable from a di-acid chosen from the group of 2-butenedioic acid, 2-methyl-2-butenedioic acid, itaconic acid and mixtures thereof. Derivatives of any isomer of unsaturated di-acids include esters, anhydrides, acid salts. Fumaric acid and maleic acid are isomers of 2-butenedioic acid, whereas citraconic acid and mesaconic acid are isomers of 2-methyl-2-butenedioic acid. For example "di-acid ethylenic unsaturations" may be obtainable from fumaric, maleic, itaconic, citraconic and/or mesaconic acids, derivatives thereof and/or mixtures thereof. Fumaric acid based unsaturation is an informal term used herein to denote unsaturation derived from fumaric acid, its isomers e.g. maleic acid and/or derivatives thereof.

By "2-butenedioic acid ethylenic unsaturations" as used herein means di-acid ethylenic unsaturations obtainable from any isomer of 2-butenedioic acid and/or derivatives thereof. Fumaric acid and maleic acid are isomers of 2-butenedioic acid. Maleic acid is the cis-isomer of 2-butenedioic acid, whereas fumaric acid is the trans-isomer of 2-butenedioic acid. Derivatives of any isomer of 2-butenedioic acid include esters, anhydrides, acid salts.

By "unsaturated resin comprising ethylenic unsaturations" or equally mentioned herein as "UR", is meant herein an unsaturated resin having ethylenic unsaturations. For example an unsaturated polyester resin comprising 2-butenedioic acid ethylenic unsaturations, an acrylated polyester resin, a methacylated polyester resin, a (meth) acrylated polyester resin, are each an unsaturated resin comprising ethylenic unsaturations.

By "unsaturated resin comprising di-acid ethylenic unsaturations" is meant herein an unsaturated resin having di-acid ethylenic unsaturations; said resin is a sub-class of an unsaturated resin comprising ethylenic unsaturations. For example an unsaturated polyester resin comprising di-acid ethylenic unsaturations is an unsaturated resin comprising di-acid ethylenic unsaturations.

By "unsaturated resin comprising 2-butenedioic acid ethylenic unsaturations" is meant herein an unsaturated resin having 2-butenedioic acid ethylenic unsaturations; said resin is a sub-class of an unsaturated resin comprising di-acid ethylenic unsaturations and thus a further sub-class of an unsaturated resin comprising ethylenic unsaturations. For example an unsaturated polyester resin having 2-butenedioic acid ethylenic unsaturations is an unsaturated resin comprising 2-butenedioic acid ethylenic unsaturations.

By "unsaturated polyester resin comprising ethylenic unsaturations" or equally "unsaturated polyester resin having ethylenic unsaturations" is meant herein, an unsaturated polyester resin having ethylenic unsaturations.

By "unsaturated polyester resin comprising di-acid ethylenic unsaturations" or equally "unsaturated polyester resin having di-acid ethylenic unsaturations" is meant herein, an unsaturated polyester resin having di-acid ethylenic unsaturations; said polyester resin is a sub-class of an unsaturated polyester resin comprising ethylenic unsaturations By "unsaturated polyester resin comprising 2-butenedioic acid ethylenic unsaturations" or equally "unsaturated polyester resin having 2-butenedioic acid ethylenic unsaturations" is meant herein, an unsaturated polyester resin having 2-butenedioic acid ethylenic unsaturations. The "unsaturated polyester resin comprising 2-butenedioic acid ethylenic unsaturations" may for example be prepared from any isomer of 2-butenedioic acid and/or derivatives thereof. Fumaric acid and maleic acid are isomers of 2-butenedioic acid. Maleic acid is the cis-isomer of 2-butenedioic acid, whereas fumaric acid is the trans-isomer of 2-butenedioic acid. Derivatives of any isomer of 2-butenedioic acid include esters, anhydrides, acid salts. Maleic acid and maleic acid anhydride partly isomerize to fumaric acid when used in the synthesis of a polyester resin comprising 2-butene-dioic acid ethylenic unsaturations.

By "curing agent" or "crosslinking agent" or "co-crosslinker" or "crosslinker" is herein understood to be a low molecular weight monomer or resin comprising unsaturations as reactive moieties that are reactable with the ethylenic unsaturations of the unsaturated resin comprising ethylenic unsaturations and said curing agent is able to react and crosslink with the UR; the unsaturations of the curing agent are different from those of the UR; for example a reactive carbon-carbon triple bond unsaturation is considered herein as being different from a cis- or trans-configured reactive carbon-carbon double bond unsaturation; for example in case the reactive unsaturations of the curing agent are cis- or trans-configured reactive carbon-carbon double bond unsaturations, these are considered as being different from the ethylenic unsaturations of the UR, in the sense that at least one substituent of the carbon-carbon double bond of the reactive unsaturations of the curing agent is different upon comparison to the substituents of the carbon-carbon double bonds of the ethylenic unsaturations. Preferably, the unsaturation of the curing agent comprises at least a hydrogen which is covalently bonded to a carbon of said unsaturation, that is to a carbon forming said unsaturation. Preferably, the unsaturations of the curing agent are vinyl unsaturations; the reactive moieties of the curing agent via a chemical reaction—preferably said chemical reaction is induced by means of heat and/or radiation—ultimately connect the polymer chains of the UR together through the formation of permanent covalent (crosslink) bonds, resulting to the curing of the UR and of the curing agent. The term "low molecular weight" in the case of the curing agent means a theoretical number average molecular weight ($M_n$) lying between a few hundred Da, e.g. 200 Da, and a few thousand Da, e.g. 20000 Da. Preferably a curing agent has a $M_n$ of at least 200, more preferably of at least 205, even more preferably of at least 210, most preferably of at least 215, especially of at least 220, more especially of at least 250, most especially of at least 300, for example of at least 310, for example of at least 315, for example of at least 350, for example of at least 400, for example of at least 450, for example of at least 500, for example of at least 600, for example of at least 700, for example of at least 800. Preferably, a curing agent has a $M_n$ of at most 20000, more preferably of at most 10000, even more preferably of at most 9000, most preferably of at most 8000, especially of at most 7000, more especially of at most 6000, most especially of at most 5000, for example of at most 4000, for example of at most 3500, for example of at most 3000, for example of at most 2500, for example of at most 2200 Da. A curing agent is classified as acid functional in case its hydroxyl value (OHV) is lower than its acid value (AV). A curing agent is classified as hydroxyl functional in case its acid value is lower than its hydroxyl value. In the context of the invention the acid value of a curing agent (AV in mg KOH/g curing agent) is measured titrimetrically according to ISO 2114-2000, whereas the hydroxyl value of a curing agent (OHV in mg KOH/g curing agent) is measured using ISO 4629-1978.

By "thermal radical initiator" is meant herein any organic or inorganic compound that upon heating is able to generate free radicals for example via decomposition and initiate radical crosslinking in the thermosetting powder coating composition of the invention; preferably the thermal radical initiators are able to generate free radicals for example via decomposition, upon being heated at temperatures of up to 230° C.

By "photoinitiators" is meant herein any organic or inorganic compound that upon radiation is able to generate free radicals for example via decomposition and initiate radical crosslinking in the thermosetting powder coating composition of the invention; preferably the photoinitiators are able to generate free radicals for example via decomposition, upon being radiated for example in the range of from 300 to 500 nm.

Certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers (such as enantiomers (e.g. E and/or Z forms), diastereoisomers and/or geometric isomers); tautomers (e.g. keto and/or enol forms). The invention comprises and/or uses all such forms which are effective as defined herein.

By "$M_n$" is meant herein the theoretical number average molecular weight and it is calculated as shown in the Examples unless stated otherwise. For example, in case $M_n$ refers to the UR, then the "$M_n$" is calculated as disclosed in the Examples; in case $M_n$ refers to the curing agent such as a VFUR, then the "$M_n$" is calculated as disclosed in the Examples; in case $M_n$ refers to a monomer then "$M_n$" corresponds to molecular weight values calculated on the basis of the molecular formula of said monomer, as such calculation is known to one skilled in the art.

By "WPU" is meant herein the measured weight per ethylenic unsaturation, unless otherwise stated; the WPU is measured using $^1$H-NMR spectroscopy as described in the Examples [see Examples, $^1$H-NMR method for the measurement of the WPU ($^1$H-NMR method WPU)].

By "theoretical WPU" is meant herein the calculated WPU which is being calculated by dividing the weight (g) of a UR or a curing agent produced by the number of moles (mol) of ethylenic unsaturations in said UR or a curing agent. The weight (g) of a UR or a curing agent produced, is the total weight (g) of the individual monomers added during the synthesis of said UR or a curing agent subtracting the weight (g) of the water or other volatile by-product which is formed during the synthesis of said UR or a curing agent (see Examples, Tables 1 and 2).

By "theoretical functionality" or equally "targeted functionality" is meant the theoretical average number of unreacted functional groups, typically found on the ends of a monomers or resins. Unreacted groups are chemical groups on monomers or resins, which groups are not covalently bonded to another monomer or resin, and thus are available for participation in a desired chemical polymerisation reaction; said unreacted groups are typically known in the art as "end-groups". For example in polyester resins the theoretical functionality is determined by the theoretical number of hydroxyl groups plus the theoretical number of carboxyl groups divided by the total theoretical number of resin chains.

By "viscosity" (η) is meant herein the melt viscosity (in Pa·s) at 160° C. Viscosity measurements were carried out at 160° C., on a Brookfield CAP 2000+H Viscometer. The applied shear-rate was 70 s$^{-1}$ and a 19.05 mm spindle (cone spindle CAP-S-05 (19.05 mm, 1.8°) was used.

By "pph" is meant herein weight parts of a component of the TPCC of the invention per hundred weight parts of UR and curing agent—if the latter is present in the TPCC of the invention. For example, the total amount (pph) of the thermal radical initiator in the TPCC of the invention is calculated on the total amount of UR and curing agent—if the latter is present in the TPCC of the invention—normalized to 100 weight parts of UR and curing agent—if the latter is present in the TPCC of the invention. For example, the amount (pph) of the first thermal radical initiator in the TPCC of the invention is calculated on the total amount of UR and curing agent—if the latter is present in the TPCC of the invention—normalized to 100 weight parts of UR and curing agent—if the latter is present in the TPCC of the invention. For example, the amount (pph) of the second thermal radical initiator in the TPCC of the invention is calculated on the total amount of UR and curing agent—if the latter is present in the TPCC of the invention—normalized to 100 weight parts of UR and curing agent—if the latter is present in the TPCC of the invention. For example, the total amount (pph) of the first and second thermal radical initiator in the TPCC of the invention is calculated on the total amount of UR and curing agent—if the latter is present in the TPCC of the invention—normalized to 100 weight parts of UR and curing agent—if the latter is present in the TPCC of the invention. For example, the amount (pph) of the accelerator in the thermosetting powder coating composition of the invention is calculated on the total amount of UR and curing agent—if the latter is present in the TPCC of the invention—normalized to 100 weight parts of UR and curing agent—if the latter is present in the TPCC of the invention. For example, the amount (pph) of the co-accelerator in the thermosetting powder coating composition of the invention is calculated on the total amount of total amount of UR and curing agent—if the latter is present in the TPCC of the invention—normalized to 100 weight parts of UR and curing agent—if the latter is present in the TPCC of the invention. For example, the amount (pph) of the inhibitor in the thermosetting powder coating composition of the invention is calculated on the total amount of UR and curing agent—if the latter is present in the TPCC of the invention—normalized to 100 weight parts of UR and curing agent—if the latter is present in the TPCC of the invention. For example, the amount (pph) of the photoinitiator in the TPCC of the invention is calculated on the total amount of UR and curing agent—if the latter is present in the TPCC of the invention—normalized to 100 weight parts of UR and curing agent—if the latter is present in the TPCC of the invention.

For clarity, if a TPCC comprises more than one UR, then the "total amount of UR" mentioned herein, refers to the total amount of all UR contained in the TPCC.

By "(N)IR lamp" denotes herein both a near-IR lamp and an IR lamp.

By the term "lower than" is meant herein that the relevant maximum boundary value is not included in the range.

By the term "higher than" is meant herein that the relevant minimum boundary value is not included in the range.

For all upper and lower boundaries of any parameters given herein, the boundary value is included in each range for each parameter. All combinations of minimum and maximum values of the parameters described herein may be used to define the parameter ranges for various embodiments and preferences of the invention.

In the context of the invention unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying in between the more preferred and the less preferred of said alternatives, is itself preferred to said less preferred value and also to each value lying between said less preferred value and said intermediate value.

The term "comprising" as used herein means that the list that immediately follows is non-exhaustive and may or may not include any other additional suitable items, for example one or more further feature(s), component(s) and/or substituent(s) as appropriate. The term "comprising" will be used interchangeably with the term "containing". "Substantially comprising" as used herein means a component or list of component(s) is present in a given material in an amount greater than or equal to about 90% w/w, preferably greater than or equal to 95% w/w, more preferably greater than or equal to 98% w/w, even more preferably greater than or equal to 99% w/w of the total amount of the given material. The term "consisting of" as used herein mean that the list that follows is exhaustive and does not include additional items.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non-exhaustive the sum of the percentage for each of such components may be less than 100% to allow a certain percentage for additional amount(s) of any additional component(s) that may not be explicitly described herein.

Unless the context clearly indicates otherwise, as used herein plural forms of the terms herein (for example composition, component, resin, polymer, minute) are to be construed as including the singular form and vice versa.

Thermosetting Powder Coating Compositions (TPCC) of the Invention

The thermosetting powder coating composition of the invention comprises:
(A) an unsaturated resin comprising ethylenic unsaturations; and
(B) a thermal radical initiator comprising a first thermal radical initiator (said first thermal radical initiator is herein also mentioned as B1),
wherein,
the first thermal radical initiator is a methyl-substituted benzoyl peroxide.

Preferably the thermal radical initiator further comprises a second thermal radical initiator different than the first thermal radical initiator (said second thermal radical initiator is herein also mentioned as B2).

Preferably the thermal radical initiator consists of a first thermal radical initiator and a second thermal radical initiator different than the first thermal radical initiator.

Preferably the first thermal radical initiator is bis-(4-methylbenzoyl)-peroxide.

The thermosetting powder coating composition of the invention comprises:
(A) an unsaturated resin comprising ethylenic unsaturations; and
(B1) a first thermal radical initiator,
wherein,
the first thermal radical initiator is a methyl-substituted benzoyl peroxide.

Preferably, the thermosetting powder coating composition of the invention further comprises: (C) a curing agent and/or (D) an accelerator and/or (E) a co-accelerator and/or (F) an inhibitor.

The thermal radical initiator, accelerator, co-accelerator, the inhibitor, the unsaturated resin comprising ethylenic unsaturations and the curing agent are discussed separately herein.

All preferred elements and embodiments presented herein for any one of thermal radical initiator, accelerator, co-accelerator, the inhibitor, the unsaturated resin comprising ethylenic unsaturations and the curing agent may be combined with each other.

Any feature or preferred combination of features or preferred combination of ranges disclosed in the invention and regard the TPCC of the invention and their components, the unsaturated resin comprising ethylenic unsaturations, the thermal radical initiators, the accelarators, the co-accelarators, the inhibitors, processes for making the TPCC of the invention thereof, can be combined.

Thermal Radical Initiator

The TPCC of the invention comprises a thermal radical initiator.

The thermal radical initiator of the TPCC of the present invention comprises a first thermal radical initiator (as defined herein) and optionally a second thermal radical initiator different than the first thermal radical initiator (see paragraph for second thermal radical initiator). Preferably the thermal radical initiator of the TPCC of the invention substantially comprises a first and a second thermal radical initiator, more preferably the thermal radical initiator of the TPCC of the invention consists of a first and a second thermal radical initiator, even more preferably the thermal radical initiator of the TPCC of the invention substantially comprises a first thermal radical initiator, most preferably the thermal radical initiator of the TPCC of the invention consists of a first thermal radical initiator.

Preferably the thermal radical initiator of the TPCC of the invention comprises a first thermal radical initiator in an amount of at least 5, more preferably of at least 10, even more preferably of at least 15, most preferably of at least 20, especially of at least 30, more especially of at least 40, even more especially of at least 50, most especially of at least 60, for example of at least 70, for example of at least 75, for example of at least 80, for example of at least 85, for example of at least 90, for example of at least 92, for example of at least 94, for example of at least 95, for example of at least 96, for example of at least 97, for example of at least 98, for example of at least 99, for example of at least 99.5% w/w based on the total amount of thermal radical initiator. Preferably, the thermal radical initiator of the TPCC of the invention substantially comprises a first thermal radical initiator. Preferably the thermal radical initiator of the TPCC of the invention comprises a first thermal radical initiator in an amount of about 100% w/w based on the total amount of thermal radical initiator. Preferably the thermal radical initiator of the TPCC of the invention is (or equally consists of) a first thermal radical initiator.

The TPCC of the invention comprises a thermal radical initiator, said thermal radical initiator comprises a first thermal radical initiator in an amount of at least 5, more preferably of at least 10, even more preferably of at least 15, most preferably of at least 20, especially of at least 30, more especially of at least 40, even more especially of at least 50, most especially of at least 60, for example of at least 70, for example of at least 75, for example of at least 80, for example of at least 85, for example of at least 90, for example of at least 92, for example of at least 94, for example of at least 95, for example of at least 96, for example of at least 97, for example of at least 98, for example of at least 99, for example of at least 99.5% w/w based on the total amount of thermal radical initiator. Preferably, the TPCC of the invention comprises a thermal radical initiator said thermal radical initiator substantially comprises a first thermal radical initiator. Preferably, the TPCC of the invention comprises a thermal radical initiator said thermal radical initiator comprises a first thermal radical initiator in an amount of about 100% w/w based on the total amount of thermal radical initiator. Preferably the TPCC of the invention comprises a thermal radical initiator said thermal radical initiator is (or equally consists of) a first thermal radical initiator.

Preferably, the amount of the thermal radical initiator in the thermosetting powder coating composition of the invention is at least 0.1, more preferably is at least 0.2, even more preferably is at least 0.3, most preferably is at least 0.4, especially is at least 0.5, more especially is at least 0.65, most especially is at least 0.7, for example is at least 0.75, for example is at least 0.8, for example is at least 0.9, for example is at least 1, for example is at least 1.2, for example is at least 1.5, for example is at least 2, for example is at least 2.2, for example is at least 2.3, for example is at least 2.4 pph. The amount of the thermal radical initiator in the thermosetting powder coating composition of the invention is preferably at most 20, more preferably at most 18, even more preferably at most 17.2, more preferably at most 16, even more preferably at most 15.6, most preferably at most 15.2, especially at most 14.8, more especially at most 14, even more especially at most 12, most especially at most 10, for example at most 9, for example at most 8.6, for example at most 8, for example at most 7.8, for example at most 7.6, for example at most 7.4. Preferably, the amount of the thermal radical initiator in the thermosetting powder coating composition of the invention is at least 2 and at most 9 pph, more preferably, the amount of the thermal radical initiator in the thermosetting powder coating composition of the invention is at least 2.2 and at most 8.7 pph, even more preferably the amount of the thermal radical initiator in the thermosetting powder coating composition of the invention is at least 2.3 and at most 8 pph, most preferably preferably the amount of the thermal radical initiator in the thermosetting powder coating composition of the invention is at least 2.3 and at most 7.6 pph.

For clarity, any reference herein to the thermal radical initiator or the first thermal radical initiator or the second thermal radical initiator refers to the chemical substances per se and not to their mixtures with other chemical substances for examples carrier material, as the latter is explained herein. For example when amounts regarding either the first or the second radical initiator are mentioned herein these amounts are associated to the chemical substances per se and not to their mixtures with any carrier material for example water, if they happen to be provided in a mixture form with a carrier material (as carrier material is disclosed herein).

First Thermal Radical Initiator

The thermal radical initiator of the TPCC of the present invention comprises a first thermal radical initiator said first thermal radical initiator is a methyl-substituted benzoyl peroxide.

By "methyl-substituted benzoyl peroxide" abbreviated as "MBPO", is meant herein a peranhydride of the following formula PER:

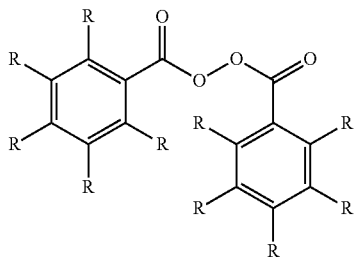

(Formula PER)

wherein R is hydrogen or methyl group and at least one of the R is a methyl group, isomers thereof and mixtures thereof. Methyl-substituted benzoyl peroxide belongs to the class of peranhydrides also known as diacyl peroxides. Peranhydrides are substances comprising a structure of formula . . . —C(=O)—O—O—C(=O)— . . . . Peranhydrides are a sub-class of organic peroxides.

When the first thermal radical initiator is a peranhydride of formula PER wherein R is hydrogen or methyl group and at least one of the R of formula PER is a methyl group then preferably at most all the R are methyl groups, more preferably at most nine of the R are methyl groups, even more preferably at most eight of the R are methyl groups, most preferably at most seven of the R are methyl groups, especially at most six of the R are methyl groups, more especially at most five of the R are methyl groups, even more especially at most four of the R are methyl groups, most especially at most three of the R are methyl groups, for example at most two of the R are methyl groups.

Preferably, the first thermal radical initiator is a peranhydride of formula PER wherein R is hydrogen or methyl group and one of the R is a methyl group, isomers thereof and mixtures thereof.

When the first thermal radical initiator is a peranhydride of formula PER wherein R is hydrogen or methyl group and at least two of the R of formula PER are methyl groups then preferably at most all the R are methyl groups, more preferably at most nine of the R are methyl groups, even more preferably at most eight of the R are methyl groups, most preferably at most seven of the R are methyl groups, especially at most six of the R are methyl groups, more especially at most five of the R are methyl groups, even more especially at most four of the R are methyl groups, most especially at most three of the R are methyl groups.

Preferably, the first thermal radical initiator is a peranhydride of formula PER wherein R is hydrogen or methyl group and two of the R are methyl groups, isomers thereof and mixtures thereof. When the first thermal radical initiator is a peranhydride of formula PER wherein R is hydrogen or methyl group and at least three of the R of the formula PER are methyl groups then preferably at most all the R are methyl groups, more preferably at most nine of the R are methyl groups, even more preferably at most eight of the R are methyl groups, most preferably at most seven of the R are methyl groups, especially at most six of the R are methyl groups, more especially at most five of the R are methyl groups, even more especially at most four of the R are methyl groups.

Preferably, the first thermal radical initiator is a peranhydride of formula PER wherein R is hydrogen or methyl group and three of the R are methyl groups, isomers thereof and mixtures thereof.

When the first thermal radical initiator is a peranhydride of formula PER wherein R is hydrogen or methyl group and at least four of the R of the formula PER are methyl groups then preferably at most all the R are methyl groups, more preferably at most nine of the R are methyl groups, even more preferably at most eight of the R are methyl groups, most preferably at most seven of the R are methyl groups, especially at most six of the R are methyl groups, more especially at most five of the R are methyl groups.

Preferably, the first thermal radical initiator is a peranhydride of formula PER wherein R is hydrogen or methyl group and four of the R are methyl groups, isomers thereof and mixtures thereof; more preferably the first thermal radical initiator is a peranhydride of formula PER wherein R is hydrogen or methyl group and two of the R in one of the two benzene rings are methyl groups and two of the R in the other benzene ring are methyl groups and the rest of the R in the two benzene rings are hydrogens, isomers thereof and mixtures thereof.

When the first thermal radical initiator is a peranhydride of formula PER wherein R is hydrogen or methyl group and at least five of the R of the formula PER are methyl groups then preferably at most all the R are methyl groups, more preferably at most nine of the R are methyl groups, even more preferably at most eight of the R are methyl groups, most preferably at most seven of the R are methyl groups, especially at most six of the R are methyl groups.

Preferably, the first thermal radical initiator is a peranhydride of formula PER wherein R is hydrogen or methyl group and five of the R are methyl groups, isomers thereof and mixtures thereof.

When the first thermal radical initiator is a peranhydride of formula PER wherein R is hydrogen or methyl group and at least six of the R of the formula PER are methyl groups then preferably at most all the R are methyl groups, more preferably at most nine of the R are methyl groups, even more preferably at most eight of the R are methyl groups, most preferably at most seven of the R are methyl groups.

Preferably, the first thermal radical initiator is a peranhydride of formula PER wherein R is hydrogen or methyl group and six of the R are methyl groups, isomers thereof and mixtures thereof.

When the first thermal radical initiator is a peranhydride of formula PER wherein R is hydrogen or methyl group and at least seven of the R of the formula PER are methyl groups then preferably at most all the R are methyl groups, more preferably at most nine of the R are methyl groups, even more preferably at most eight of the R are methyl groups.

Preferably, the first thermal radical initiator is a peranhydride of formula PER wherein R is hydrogen or methyl group and seven of the R are methyl groups, isomers thereof and mixtures thereof.

When the first thermal radical initiator is a peranhydride of formula PER wherein R is hydrogen or methyl group and at least eight of the R of the formula PER are methyl groups then preferably at most all the R are methyl groups, more preferably at most nine of the R are methyl groups.

Preferably, the first thermal radical initiator is a peranhydride of formula PER wherein R is hydrogen or methyl group and eight of the R are methyl groups, isomers thereof and mixtures thereof.

When the first thermal radical initiator is a peranhydride of formula PER wherein R is hydrogen or methyl group and at least nine of the R of the formula PER are methyl groups then preferably at most all the R are methyl groups.

Preferably, the first thermal radical initiator is a peranhydride of formula PER wherein R is hydrogen or methyl group and nine of the R are methyl groups, isomers thereof and mixtures thereof.

Preferably, the first thermal radical initiator is a peranhydride of formula PER wherein all R are methyl groups.

Preferably the first thermal radical initiator is selected from the group consisting of bis-(2-methylbenzoyl)-peroxide, bis-(3-methylbenzoyl)-peroxide, bis-(4-methylbenzoyl)-peroxide, (2-methylbenzoyl, 3-methyl benzoyl)-peroxide, (2-methylbenzoyl, 4-methylbenzoyl)-peroxide, (3-methylbenzoyl, 4-methylbenzoyl)-peroxide and mixtures thereof; more preferably the first thermal radical initiator is selected from the group consisting of bis-(2-methylbenzoyl)-peroxide, bis-(3-methylbenzoyl)-peroxide, bis-(4-methylbenzoyl)-peroxide, (2-methylbenzoyl, 4-methylbenzoyl)-peroxide, (3-methylbenzoyl, 4-methyl benzoyl)-peroxide and mixtures thereof; even more preferably the first thermal radical initiator is selected from the group consisting of bis-(2-methylbenzoyl)-peroxide, bis-(3-methylbenzoyl)-peroxide, bis-(4-methylbenzoyl)-peroxide, (2-methylbenzoyl, 4-methylbenzoyl)-peroxide, and mixtures thereof; most preferably the first thermal radical initiator is selected from the group consisting of bis-(2-methylbenzoyl)-peroxide, bis-(3-methylbenzoyl)-peroxide, bis-(4-methylbenzoyl)-peroxide and mixtures thereof; especially the first thermal radical initiator is selected from the group consisting of bis-(2-methylbenzoyl)-peroxide, bis-(4-methylbenzoyl)-peroxide, and mixtures thereof; more especially the first thermal radical initiator is selected from the group consisting of bis-(3-methylbenzoyl)-peroxide, bis-(4-methylbenzoyl)-peroxide, and mixtures thereof; most especially the first thermal radical initiator is bis-(4-methylbenzoyl)-peroxide since the TPCC of the present invention comprising 4-MBPO in particular, combines properties i)-vii).

Preferably the first radical initiator is MBPO not including bis-(2-methylbenzoyl)-peroxide, bis-(3-methylbenzoyl)-peroxide, isomers thereof and mixtures thereof.

Preferably the first thermal radical initiator is selected from the group consisting of bis-(4-methylbenzoyl)-peroxide, (2-methylbenzoyl, 3-methylbenzoyl)-peroxide, (2-methylbenzoyl, 4-methylbenzoyl)-peroxide, (3-methylbenzoyl, 4-methylbenzoyl)-peroxide and mixtures thereof; more preferably the first thermal radical initiator is selected from the group consisting of bis-(4-methylbenzoyl)-peroxide, (2-methylbenzoyl, 4-methylbenzoyl)-peroxide, (3-methylbenzoyl, 4-methylbenzoyl)-peroxide and mixtures thereof; even more preferably the first thermal radical initiator is selected from the group consisting of bis-(4-methylbenzoyl)-peroxide, (2-methylbenzoyl, 4-methylbenzoyl)-peroxide, and mixtures thereof.

The chemical structures of bis-(2-methylbenzoyl)-peroxide (abbreviated herein as 2-MBPO), bis-(3-methylbenzoyl)-peroxide (abbreviated herein as 3-MBPO), bis-(4-methylbenzoyl)-peroxide (abbreviated herein as 4-MBPO), (2-methylbenzoyl, 3-methylbenzoyl)-peroxide (abbreviated herein as 2-3-MBPO), (2-methylbenzoyl, 4-methylbenzoyl)-peroxide (abbreviated herein 2-4-MBPO), (3-methylbenzoyl, 4-methylbenzoyl)-peroxide (abbreviated herein as 3-4-MBPO) are shown herein after:

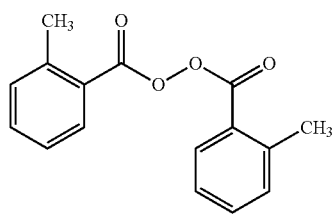

bis-(2-methylbenzoyl)-peroxide (2-MBPO)

-continued

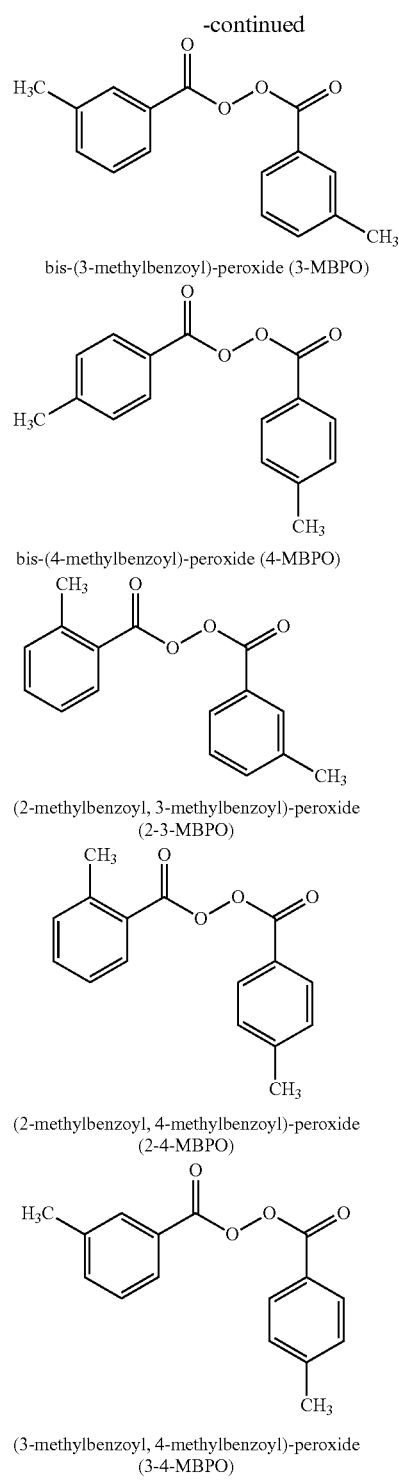

bis-(3-methylbenzoyl)-peroxide (3-MBPO)

bis-(4-methylbenzoyl)-peroxide (4-MBPO)

(2-methylbenzoyl, 3-methylbenzoyl)-peroxide
(2-3-MBPO)

(2-methylbenzoyl, 4-methylbenzoyl)-peroxide
(2-4-MBPO)

(3-methylbenzoyl, 4-methylbenzoyl)-peroxide
(3-4-MBPO)

It is of course possible to use any mixture of any one of methyl-substituted benzoyl peroxide, for example mixtures of 2-MBPO and/or 3-MBPO and/or 4-MBPO and/or 2-3-MBPO and/or 2-4-MBPO and/or 3-4-MBPO in the TPCC of the present invention.

The first thermal radical initiator is preferably mixed with a carrier material; the carrier material can be solid or liquid, for example water; the mixture of the first thermal radical initiator with the carrier material (herein mentioned as "FRI-mixture") enhances the safety in handling the first thermal radical initiator. Preferably, the amount of the first thermal radical initiator in the FRI-mixture can be in the range of 1-99.9% w/w on the FRI-mixture; preferably the amount of the first thermal radical initiator is at least 10, more preferably at least 20, even more preferably at least 30, most preferably at least 40, especially at least 50, more especially at least 60, even more especially at least 70, most especially at least 75, for example at least 90, for example at least 95% w/w on the FRI-mixture.

Preferably, the amount of the first thermal radical initiator in the thermosetting powder coating composition of the invention is at least 0.1, more preferably is at least 0.2, even more preferably is at least 0.3, most preferably is at least 0.4, especially is at least 0.5, more especially is at least 0.65, most especially is at least 0.7, for example is at least 0.75, for example is at least 0.8, for example is at least 0.9, for example is at least 1, for example is at least 1.2, for example is at least 1.5, for example is at least 2, for example is at least 2.2, for example is at least 2.3, for example is at least 2.4 pph. Preferably, the amount of the first thermal radical initiator in the thermosetting powder coating composition of the invention is preferably at most 10, more preferably at most 9, even more preferably at most 8.6, more preferably at most 8, even more preferably at most 7.8, most preferably at most 7.6, especially at most 7.4, Preferably, the amount of the first thermal radical initiator in the thermosetting powder coating composition of the invention is at least 2 and at most 9 pph, more preferably, the amount of the first thermal radical initiator in the thermosetting powder coating composition of the invention is at least 2.2 and at most 8.7 pph, even more preferably the amount of the first thermal radical initiator in the thermosetting powder coating composition of the invention is at least 2.3 and at most 8 pph, most preferably preferably the amount of the first thermal radical initiator in the thermosetting powder coating composition of the invention is at least 2.3 and at most 7.6 pph.

All preferred elements and embodiments presented herein for the first thermal radical initiator apply equally to each one of them separately or in mixtures with each other.

All preferred elements and embodiments presented herein for the first thermal radical initiator may be combined.

Second Thermal Radical Initiator

The thermal radical initiator of the TPCC of the present invention may optionally comprise a second thermal radical initiator different than the first thermal radical initiator and as described herein. The second thermal radical initiator is thus different to the first thermal radical initiator, consequently the second thermal radical initiator is other than methyl-substituted-benzoyl peroxide; thus, any reference herein to peranhydrides (term also synonymous to diacyl peroxides) refers to the class of peranhydrides not including the methyl-substituted-benzoyl peroxide (as according to formula PER) that is the first thermal radical initiator; said second thermal radical initiator may be a thermal radical initiator or a mixture of thermal radical initiators.

The TPCC of the present invention may also comprise a second thermal radical initiator other than methyl-substituted-benzoyl peroxide.

The second thermal radical initiator may be any thermal radical initiator known to the person skilled in the art. Examples of thermal radical initiators include, but are not limited to azo compounds such as for example azo isobutyronitrile (AIBN), 1,1'-azobis(cyclohexanenitrile), 1,1'-azobis(2,4,4-trimethylpentane), C—C labile compounds such as for example benzopinacole, peroxides and mixtures thereof.

The second thermal radical initiator for example peroxides that may be used in the thermosetting powder coating composition of the invention can be any thermal radical initiator known to the person skilled in the art for being suitable for use in the radical curing of UR. Such thermal radical initiators for example peroxides include organic and inorganic peroxides, whether solid or liquid (including peroxides on a carrier); also hydrogen peroxide may be applied.

The second thermal radical initiator may be monomeric, oligomeric or polymeric in nature; consequently also peroxides may be monomeric, oligomeric or polymeric in nature. An extensive series of examples of suitable second thermal radical initiator such as peroxides can be found, for instance in US 2002/0091214 A1, paragraph [0018], hereby incorporated by reference.

Preferably, the second thermal radical initiator is an organic or inorganic peroxide, more preferably the second thermal radical initiator is an organic peroxide, most preferably the second thermal radical initiator is chosen from the group consisting of peranhydrides, percarbonates peresters and mixtures thereof, especially the second thermal radical initiator is selected from the group consisting of peranhydrides, peresters and mixtures thereof, more especially the second thermal radical initiator is a peranhydride, for example the second thermal radical initiator is selected from the group consisting of benzoyl peroxide, lauroyl peroxide, dilauroyl peroxide, di(4-tert-butylcyclohexyl)-peroxydicarbonate, dicetyl peroxydicarbonate, dimyristylperoxydicarbonate, tert-butyl peroxybenzoate (Trigonox® C) and mixtures thereof, for example the second thermal radical initiator is selected from the group consisting of benzoyl peroxide, lauroyl peroxide, tert-butyl peroxybenzoate (Trigonox® C) and mixtures thereof, for example the second thermal radical initiator is selected from the group consisting of benzoyl peroxide, tert-butyl peroxybenzoate (Trigonox® C) and mixtures thereof; for example the second thermal radical initiator is benzoyl peroxide.

Exemplary organic peroxides include but are not limited to hydroperoxides (comprising a structure of formula . . . —O—O—H), ketone peroxides (comprising a structure of formula H—O—O—(C—O—O—)$_n$H, n≤1), peroxyketals (comprising a structure of formula ( . . . —O—O—)$_2$C< . . . ), dialkyl peroxides also known as perethers (comprising a structure of formula . . . —O—O— . . . ), peroxyesters also known as peresters or peracids (comprising a structure of formula . . . —O—O—C(=O)— . . . ), diacyl peroxides also known as peranhydrides (comprising a structure of formula . . . —C(=O)—O—O—C(=O)— . . . ), alkylperoxy carbonates also known as monopercarbonates (comprising a structure of formula . . . —O—O—C(=O)—O— . . . ) and peroxydicarbonates also known as percarbonates (comprising a structure of formula . . . —O—C(=O)—O—O—C(=O)—O— . . . ).

Exemplary hydroperoxides include but are not limited to tertiary alkyl hydroperoxides (such as, for instance, t-butyl hydroperoxide) and other hydroperoxides (such as, for instance, cumene hydroperoxide). Examples of a special class of hydroperoxides formed by the group of ketone peroxides (also known as perketones, being an addition product of hydrogen peroxide and a ketone), are for example methyl ethyl ketone peroxide, methyl isobutylketone peroxide and acetylacetone peroxide.

Exemplary peroxyketals include but are not limited to 1,1-di-(tert-butylperoxy) cyclohexane (Trigonox® 22), 1,1-di(tert-amylperoxy)cyclohexane (Trigonox® 122), 1,1-di(tert-butylperoxy)-3,3,5-trimethylcyclohexane (Trigonox® 29) and mixtures thereof.

Exemplary perethers include but are not limited to diperethers like 2,2-di(tert-butylperoxy)butane (Trigonox® D), butyl 4,4-di(tert-butylperoxy)valerate (Trigonox® 17), di(tert-butylperoxyisopropyl)benzene(s) (Perkadox® 14S), 2,5-dimethyl-2,5-di(tert-butylperoxy)hexane (Trigonox® 101) of for example monoperethers like dicumyl peroxide (Perkadox® BC-FF), tert-butyl cumyl peroxide (Trigonox® T), di-tert-butyl peroxide (Trigonox® B) or mixtures thereof.

Trigonox®, and Perkadox® are trademarks of Akzo Nobel.

Exemplary peresters include but are not limited to peracetates and perbenzoates, or for example tert-butyl peroxybenzoate (Trigonox® C), tert-butyl peroxyacetate (Trigonox® F-050), tert-amyl peroxybenzoate (Trigonox® 127), tert-amyl peroxyacetate (Trigonox® 133-CK60), tert-butyl-2-ethylhexanoate (Trigonox® 21 S), tert-butylperoxydiethylacetate (Trigonox® 27), di-tert-butylperoxypivalate (Trigonox® 25-C75), tert-butyl peroxyneoheptanoate (Trigonox® 257-C75), cumylperoxyneodecanoate (Trigonox® 99-C75), 2-ethylhexyl perlaurate or mixtures thereof.

Exemplary peranhydrides (for clarity not according to formula PER) include but are not limited to benzoylperoxide (BPO) and lauroyl peroxide (commercially available as Laurox®), didecanoylperoxide (Perkadox® SE-10), di(3,5, 5-trimethylhexanoyl)peroxide (Trigonox® 36-C75) and mixtures thereof.

Exemplary percarbonates include but are not limited to di-t-butylpercarbonate and di-2-ethylhexylpercarbonate or monopercarbonates. Exemplary monopercarbonates include but are not limited to tert-butyl peroxy-2-ethylhexylcarbonate (Trigonox® 117), tert-butyl peroxyisopropylcarbonate (Trigonox® BPIC75), tert-amylperoxy-2-ethylhexylcarbonate (Trigonox® 131) and mixtures thereof.

It is of course also possible to use mixtures of thermal radical initiators as second thermal radical initiator, for example mixture of peroxides, in the powder coating composition of the present invention. Furthermore, the second thermal radical initiator may be mixed peroxides, i.e. peroxides containing any two different peroxy-bearing moieties in one molecule.

Preferably, the amount of the second thermal radical initiator in the thermosetting powder coating composition of the invention is at least 0.1, more preferably is at least 0.2, even more preferably is at least 0.3, most preferably is at least 0.4, especially is at least 0.5, more especially is at least 0.65, most especially is at least 0.7, for example is at least 0.75, for example is at least 0.8, for example is at least 0.9, for example is at least 1, for example is at least 1.2, for example is at least 1.5, for example is at least 2, for example is at least 2.2, for example is at least 2.3, for example is at least 2.4 pph. The amount of the second thermal radical initiator in the thermosetting powder coating composition of the invention is preferably at most 10, more preferably at most 9, even more preferably at most 8.6, more preferably at most 8, even more preferably at most 7.8, most preferably at most 7.6, especially at most 7.4, Preferably, the amount of the second thermal radical initiator in the thermosetting powder coating composition of the invention is at least 2 and at most 9 pph, more preferably, the amount of the second thermal radical initiator in the thermosetting powder coating composition of the invention is at least 2.2 and at most 8.7 pph, even more preferably the amount of the second thermal radical initiator in the thermosetting powder coating composition of the invention is at least 2.3 and at most 8 pph, most preferably the amount of the second thermal radical initiator in the thermosetting powder coating composition of the invention is at least 2.3 and at most 7.6 pph.

Preferably, the amount of the first and the second thermal radical initiator in the thermosetting powder coating composition of the invention is at least 0.1, more preferably is at least 0.2, even more preferably is at least 0.3, most preferably is at least 0.4, especially is at least 0.5, more especially is at least 0.65, most especially is at least 0.7, for example is at least 0.75, for example is at least 0.8, for example is at least 0.9, for example is at least 1, for example is at least 1.2, for example is at least 1.5, for example is at least 2, for example is at least 2.2, for example is at least 2.3, for example is at least 2.4 pph. Preferably, the amount of the first and the second thermal radical initiator in the thermosetting powder coating composition of the invention is preferably at most 10, more preferably at most 9, even more preferably at most 8.6, more preferably at most 8, even more preferably at most 7.8, most preferably at most 7.6, especially at most 7.4, Preferably, the amount of the first and the second thermal radical initiator in the thermosetting powder coating composition of the invention is at least 2 and at most 9 pph, more preferably, the amount of the first and the second thermal radical initiator in the thermosetting powder coating composition of the invention is at least 2.2 and at most 8.7 pph, even more preferably the amount of the first and the second thermal radical initiator in the thermosetting powder coating composition of the invention is at least 2.3 and at most 8 pph, most preferably preferably the amount of the first and the second thermal radical initiator in the thermosetting powder coating composition of the invention is at least 2.3 and at most 7.6 pph.

All preferred elements and embodiments presented herein for the second thermal radical initiator and/or for any one of the thermal radical initiators encompassed by the definition of the thermal radical initiator i.e. peroxides, types of peroxides apply equally to each other.

All preferred elements and embodiments presented herein for the first and second thermal radical initiator may be combined.

Accelerators & Co-Accelerators

In case the reactivity of the thermosetting powder coating composition is too low, one or more accelerators may be added to the thermosetting powder coating composition.

The accelerator may be chosen from the group of amines acetoacetamides, ammonium salts, transition metal compounds and mixtures thereof. Preferably, the accelerator is a transition metal compound. Preferably, the accelarator is preferably chosen from the group consisting of transition metal salts, transition metal complexes and mixtures thereof; more preferably the accelarator is chosen from the group consisting of transition metal organic salts, transition metal complexes; most preferably the accelarator is chosen from the group consisting of transition metal organic acid salts, derivatives of transition metal organic acid salts. Examples of suitable transition metal compounds as accelarators for the TPCC of the present invention are transition metal carboxylates, transition metal acetoacetates, for example transition metal ethylhexanoate.

Preferably the accelerator is selected from the group consisting of transition metal compounds—such as those mentioned herein above—of transition metals with atomic numbers from/equal to 21 and up to/equal to 79. In chemistry and physics, the atomic number (also known as the proton number) is the number of protons found in the nucleus of an atom. It is traditionally represented by the symbol Z. The atomic number uniquely identifies a chemical element. In an atom of neutral charge, the atomic number is equal to the number of electrons. Examples of suitable transition metal compounds are those of the following transition metals Sc, Ti, V, Cr, Mn, Fe, Co, Ni, Cu, Zn, Mo, W; preferably Mn, Fe, Co, Cu, more preferably, Mn, Fe, Cu. If a copper compound is used, it may for example be in the form of a $Cu^+$ salt or a $Cu^{2+}$ salt. If a manganese compound is used, it may for example be in the form of a $Mn^{2+}$ salt or a $Mn^{3+}$ salt. If a cobalt compound is used, it may for example be in the form of a $Co^{2+}$ salt.

Depending on the reactivity of the transition metal compound, the reactivity of the initiation system may be further enhanced using a co-accelerator.

Preferably a transition metal compound is used in combination with a co-accelerator.

Examples of suitable co-accelerators include 1,3-dioxocompounds, bases and thiol comprising compounds.

The 1,3-dioxo compound is preferably a 1,3-dioxo compound having the following formula Dioxo:

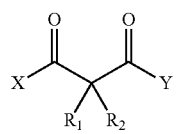

(Formula Dioxo)

wherein
X,Y=H, $C_1$-$C_{20}$ alkyl, $C_6$-$C_{20}$ aryl, alkylaryl, arylalkyl, monovalent polymeric radical, $OR_3$, $NR_3R_4$; $R_1$, $R_2$, $R_3$, and $R_4$ each individually may represent hydrogen (H), or a $C_1$-$C_{20}$ alkyl, aryl, alkylaryl or arylalkyl group, that each optionally may comprise one or more hetero-atoms (e.g. oxygen, phosphor, nitrogen or sulphur atoms) and/or substituents; a ring may be present between $R_1$ and $R_2$, $R_1$ and $R_3$, and/or between $R_2$ and $R_4$; $R_3$ and/or $R_4$ may be part of a polymer chain, may be attached to a polymer chain or may comprise a polymerizable group. Preferably, X and/or Y are/is $C_1$-$C_{20}$ alkyl and/or $C_6$-$C_{20}$ aryl. More preferably, X and/or Y are/is a methyl group. Preferably, the 1,3-dioxo compound is acetylacetone. The 1,3-dioxo compound may be a monomer or a resin.

Other examples of 1,3-dioxo compounds include 1,3-diketones, 1,3-dialdehydes, 1,3-ketoaldehydes, 1,3-ketoesters, and 1,3-ketoamides.

Examples of suitable base co-accelerators are organic bases or inorganic bases. Inorganic bases are for example alkali metal or earth alkali metal compounds. The organic base is preferably a nitrogen comprising compound, preferably an amine for example tertiary aliphatic amines, tertiary aromatic amines, aromatic amines and polyamines.

Examples of tertiary aromatic amine accelerators include N,N-dimethylaniline, N,N-diethylaniline; toluidines and xylidines such as N,N-diiosopropanol-para-toluidine, N,N-dimethyl-p-toluidine, N,N-bis(2-hydroxyethyl)xylidine, N,N-dimethylnaphtylamine, N,N-dimethyl toluidine and ethyl N,N-dimethylamino benzoate.

Examples of suitable thiol-comprising compounds that may be used as a co-accelerator include aliphatic thiols, more preferably primary aliphatic thiols. The aliphatic thiol is preferably an α-mercapto acetate, a β-mercapto propionate, a dodecylmercaptane or a mixture thereof. The thiol-functionality of the thiol-comprising compound in the powder coating composition is preferably >2, more preferably >3.

In case an accelerator is needed, then preferably the amount of accelerator in the thermosetting powder coating composition of the invention is at least 0.000003, more preferably is at least 0.00003, even more preferably is at least 0.0003, most preferably is at least 0.003, especially is at least 0.03, more especially is at least 0.1, most especially is at least 0.2, for example is at least 0.3, for example is at least 0.4, for example is at least 0.5, for example is at least 0.8, for example is at least 1.0, for example is at least 1.5, for example is at least 2 pph. In case an accelerator is needed, then the amount of accelerator in the thermosetting powder coating composition of the invention is preferably at most 10, more preferably at most 8, even more preferably at most 7, most preferably at most 6, especially at most 5 pph, more especially at most 4, most especially at most 3 pph.

Preferably, the amount of co-accelerator in the thermosetting powder coating composition of the invention is at least 0.000003, more preferably is at least 0.00003, even more preferably is at least 0.0003, most preferably is at least 0.003, especially is at least 0.03, more especially is at least 0.1, most especially is at least 0.2, for example is at least 0.3, for example is at least 0.4, for example is at least 0.5, for example is at least 0.8, for example is at least 1.0, for example is at least 1.5, for example is at least 2 pph. The amount of co-accelerator the amount of co-accelerator in the thermosetting powder coating composition of the invention is preferably at most 10, more preferably at most 8, even more preferably at most 7, most preferably at most 6, especially at most 5 pph, more especially at most 4, most especially at most 3 pph.

Inhibitors

In case the reactivity of the thermosetting powder coating composition is too high one or more inhibitors may be added to the thermosetting powder coating composition. Alternatively, the inhibitor may be added during the synthesis of the unsaturated resin comprising ethylenic unsaturations and/or during the synthesis of the curing agent.

Examples of inhibitors are preferably chosen from the group of phenolic compounds, stable radicals, catechols, phenothiazines, hydroquinones, benzoquinones or mixtures thereof.

Examples of phenolic compounds include 2-methoxyphenol, 4-methoxyphenol, 2,6-di-t-butyl-4-methylphenol, 2,6-di-t-butylphenol, 2,6-di-6-butyl-4-ethyl phenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol and 6,6'-di-t-butyl-2,2'-methylene di-p-cresol.

Examples of stable radicals include 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL and galvinoxyl (2,6-di-tert-butyl-α-(3,5-di-tert-butyl-4-oxo-2,5-cyclohexadien-1-ylidene)-p-tolyloxy).

Examples of catechols include catechol, 4-tert-butylcatechol, and 3,5-di-tert-butylcatechol.

Examples of hydroquinones include hydroquinone, 2-methylhydroquinone, 2-tert-butylhydroquinone, 2,5-di-tert-butylhydroquinone, 2,6-di-tert-butylhydroquinone, 2,6-dimethylhydroquinone and 2,3,5-trimethylhydroquinone.

Examples of benzoquinones include benzoquinone, 2,3,5,6-tetrachloro-1,4-benzoquinone, methylbenzoquinone, 2,6-dimethylbenzoquinone, and napthoquinone.

Other suitable inhibitors may for example be chosen from the group of an aluminium-N-nitrosophenyl hydroxylamine, a diethylhydroxylamine and a phenothiazine.

Preferably, the inhibitor is chosen from the group consisting of phenolic compounds, stable radicals, catechols, phenothiazines, hydroquinones, benzoquinones or mixtures thereof; more preferably from the group consisting of phenolic compounds, catechols, phenothiazines, hydroquinones, benzoquinones or mixtures thereof; even more preferably from the group consisting of catechols, phenothiazines, hydroquinones, benzoquinones or mixtures thereof; most preferably from the group consisting of catechols, hydroquinones, benzoquinones or mixtures thereof; especially from the group consisting of catechols, hydroquinones, benzoquinones or mixtures thereof; more especially from the group consisting of catechols, hydroquinones, or mixtures thereof; most especially from the group of hydroquinones.

Preferably, the inhibitor is chosen from the group consisting of hydroquinone, 2-methylhydroquinone, 2-tert-butylhydroquinone, 2,5-di-tert-butylhydroquinone, 2,6-di-tert-butylhydroquinone, 2,6-dimethylhydroquinone and 2,3,5-trimethylhydroquinone, or mixtures thereof; more preferably from the group consisting of hydroquinone, 2-methylhydroquinone, 2-tert-butylhydroquinone, 2,5-di-tert-butylhydroquinone, 2,6-di-tert-butylhydroquinone, 2,6-dimethylhydroquinone or mixtures thereof; most preferably from the group consisting of hydroquinone, 2-methylhydroquinone, 2-tert-butylhydroquinone, 2,5-di-tert-butylhydroquinone, 2,6-di-tert-butylhydroquinone, or mixtures thereof; especially from the group of consisting of hydroquinone, 2-methylhydroquinone, 2-tert-butylhydroquinone, 2,5-di-tert-butylhydroquinone, 2,6-di-tert-butylhydroquinone, or mixtures thereof; especially from the group of consisting of hydroquinone, 2-tert-butylhydroquinone, 2,5-di-tert-butylhydroquinone, 2,6-di-tert-butylhydroquinone, or mixtures thereof; especially from the group of consisting of hydroquinone, 2-tert-butylhydroquinone and 2-methylhydroquinone, or mixtures thereof.

Preferably, the amount of inhibitor in the thermosetting powder coating composition of the invention is at least 0.0001, more preferably is at least 0.0005, even more preferably is at least 0.0010, most preferably is at least 0.0025, especially is at least 0.0050, more especially is at least 0.010, most especially is at least 0.020, for example is at least 0.025, for example is at least 0.030, for example is at least 0.040, for example is at least 0.050, for example is at least 0.060, for example is at least 0.070, for example is at least 0.080, for example is at least 0.100 pph. The amount of inhibitor in the thermosetting powder coating composition of the invention is preferably at most 10, more preferably at most 5, even more preferably at most 2, most preferably at most 1, especially at most 0.75, more especially at most 0.50, most especially at most 0.25, for example is at most 0.20, for example is at most 0.150, for example is at most 0.125 pph. Preferably, the amount of inhibitor in the thermosetting powder coating composition of the invention is at least 0.025 and at most 0.125 pph.

The combination of first and optionally of a second thermal radical initiator(s) and/or optionally inhibitor(s) and/or optionally accelerator(s), and/or optionally co-accelerator(s) in the thermosetting powder coating composition suitable for use in the powder coating composition of the present invention can easily be determined by the person skilled in the art.

Unsaturated Resins Comprising Ethylenic Unsaturations

The unsaturated resins comprising ethylenic unsaturations may be linear or branched. Linear UR have a theoretical (targeted) functionality (f) equal to 2, whilst branched UR have a theoretical (targeted) functionality (f) higher than 2. When the UR is branched, then the UR's theoretical functionality (f) is preferably at least 2.01, more preferably at least 2.05, even more preferably at least 2.10, most preferably at least 2.12, especially at least 2.15, more especially at least 2.20, even more especially at least 2.30, most especially at least 2.35, for example at least 2.40. When the UR is branched, then the theoretical functionality (f) is preferably at most 10, more preferably at most 9, even more preferably at most 8, most preferably at most 7, especially at most 6, more especially at most 5, even more especially at most 5.50, most especially at most 5, for example at most 4.50, for example at most 4, for example at most 3.80, for example at most 3.50. When the UR is branched, then the UR's theoretical functionality (f) is at least 2.01 and at most 4.5, more preferably is at least 2.01 and at most 4, even more preferably is at least 2.01 and at most 3.5, most preferably is at least 2.01 and at most 3.

Preferably, the UR has a theoretical functionality (f) of at least 2 and at most 4.5.

Preferably, when the UR is amorphous then said UR has a theoretical functionality of at least 2 and at most 5.

Preferably, when the UR is crystalline then said UR has a theoretical functionality of at least 2 and at most 3.

The preferences for the theoretical functionality (f) of the UR apply equally to any one of the unsaturated resins encompassed by the definition of UR and these preferences can be combined with any one of the preferred elements and embodiments presented herein for the UR and/or for any one of the unsaturated resins encompassed by the definition of the UR.

Preferably, the ethylenic unsaturations of the unsaturated resin comprising ethylenic unsaturations are di-acid ethylenic unsaturations.

Preferably, the ethylenic unsaturations of the unsaturated resin comprising ethylenic unsaturations are 2-butenedioic acid ethylenic unsaturations.

Preferably, the unsaturated resin comprising ethylenic unsaturations is an unsaturated polyester resin comprising 2-butenedioic acid ethylenic unsaturations.

Preferably, the unsaturated resin comprising ethylenic unsaturations is selected from the group consisting of polyester resins, acrylic resins, polyurethanes, epoxy resins, polyamides, polyesteramides, polycarbonates, polyureas and mixtures thereof.

The amount of the unsaturated resin comprising ethylenic unsaturations (UR) in the thermosetting powder coating composition of the invention is preferably at least 40, more preferably at least 50, most preferably at least 55, most preferably at least 60, especially at least 65, more especially at least 69, most especially at least 70, for example at least 71, for example at least 72% w/w on total amount of UR and curing agent such as a VFUR. The amount of the unsaturated resin comprising ethylenic unsaturations in the thermosetting powder coating composition of the invention is preferably at most 99, more preferably at most 95, most preferably at most 90, most preferably at most 88, especially at most 86, more especially at most 84, most especially at most 82, for example at most 81, for example at most 80% w/w on total amount of UR and curing agent such as a VFUR. Preferably the amount of the unsaturated resin comprising ethylenic unsaturations in the thermosetting powder coating composition of the invention ranges from 69 to 84% w/w on total amount of UR and curing agent such as a VFUR.

Preferably, the unsaturated resin comprising ethylenic unsaturations (UR) has a $M_n$ of at least 800, more preferably of at least 1000, even more preferably of at least 1500, most preferably of at least 1800, especially of at least 2000, more especially of at least 2300 Da. Preferably, the unsaturated resin comprising ethylenic unsaturations (UR) has a $M_n$ of at most 20000, more preferably of at most 10000, even more preferably of at most 9000, most preferably of at most 8000, especially of at most 7000, more especially of at most 6000, most especially of at most 5000 Da. Preferably, the unsaturated resin comprising ethylenic unsaturations (UR) has a $M_n$ of at least 2000 and of at most 8000 Da.

Preferably, the unsaturated resin comprising ethylenic unsaturations (UR) has a theoretical WPU of at least 250, more preferably of at least 300, even more preferably of at least 350, most preferably of at least 400, most preferably of at least 450, especially of at least 500 g/mol. Preferably, the unsaturated resin comprising ethylenic unsaturations (UR) has a theoretical WPU of at most 2000, more preferably of at most 1500, even more preferably of at most 1300, most preferably of at most 1200, especially of at most 1100, more especially of at most 1000, most especially of at most 900, for example of at most 850, for example of at most 800 g/mol. Preferably the theoretical WPU of the unsaturated resin comprising ethylenic unsaturations ranges from 450 to 1200 g/mol.

Preferably, the unsaturated resin comprising ethylenic unsaturations has a WPU of at least 250, more preferably of at least 300, even more preferably of at least 350, most preferably of at least 400, most preferably of at least 450, especially of at least 500 g/mol. The unsaturated resin comprising ethylenic unsaturations has a WPU of at most 2200, more preferably of at most 1650, even more preferably of at most 1450, most preferably of at most 1350, especially of at most 1100, more especially of at most 1000, most especially of at most 950, for example of at most 900 g/mol. Preferably the WPU of the unsaturated resin comprising ethylenic unsaturations ranges from 450 to 1350 g/mol.

In case in which the unsaturated resin comprising ethylenic unsaturations has acid functional groups e.g. carboxyl groups, then the acid value (AV) of the unsaturated resin comprising ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50, for example at most 40, for example at most 30, for example at most 20, for example at most 10, for example at most 7, for example at most 5, for example at most 4 mgKOH/g unsaturated resin comprising ethylenic unsaturations. In case in which the unsaturated resin comprising ethylenic unsaturations has acid functional groups e.g. carboxyl groups, then the acid value (AV) of the unsaturated resin comprising ethylenic unsaturations is preferably at least 0, more preferably at least 0.001, even more preferably at least 0.01, most preferably at least 0.1, especially at least 0.5, more especially at least 1, most especially at least 2, for example at least 2.5, for example at least 3, for example at least 4, for example at least 5 for example at least 10, for example at least 15 mg KOH/g unsaturated resin comprising ethylenic unsaturations. Preferably the acid value (AV) of the unsaturated resin comprising ethylenic unsaturations ranges from 0.1 to 60, more preferably ranges from 0.1 to 50, even more preferably ranges from 0.1 to 10 mg KOH/g unsaturated resin comprising ethylenic unsaturations.

In case in which the unsaturated resin comprising ethylenic unsaturations has hydroxyl groups, then the hydroxyl value (OHV) of the unsaturated resin comprising ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50 mg KOH/g unsaturated resin comprising ethylenic unsaturations. The hydroxyl value (OHV) of the unsaturated resin comprising ethylenic unsaturations is preferably at least 0.1, more preferably at least 0.5, even more preferably at least 1, most preferably at least 2, especially at least 2.5, more especially at least 3, most especially at least 4, for example at least 5, for example at least 8, for example at least 10, for example at least 15 mg KOH/g unsaturated resin comprising ethylenic unsaturations. Preferably the hydroxyl value (OHV) of the unsaturated polyester resin comprising ethylenic unsaturations is from 0.1 to 70, more preferably from 10 to 70, even more preferably from 12 to 60 mg KOH/g unsaturated resin comprising ethylenic unsaturations.

The unsaturated resin comprising ethylenic unsaturations may be amorphous or crystalline.

In case in which the unsaturated resin comprising ethylenic unsaturations is amorphous, said resin has preferably a $M_n$ of at least 800, more preferably of at least 1000, even more preferably of at least 1500, most preferably of at least 1800, especially of at least 2000 Da. In case in which the unsaturated resin comprising ethylenic unsaturations is amorphous, said resin has preferably a $M_n$ of at most 20000, more preferably of at most 10000, even more preferably of at most 9000, most preferably of at most 8000, especially of at most 7000, more especially of at most 6000, most especially of at most 5000, for example of at most 4500 Da. Preferably, in case in which the unsaturated resin comprising ethylenic unsaturations is amorphous, said resin has preferably a $M_n$ of at least 2000 and of at most 8000 Da, more preferably of at least 2000 and of at most 5000 Da.

In case in which the unsaturated resin comprising ethylenic unsaturations is amorphous, said resin has preferably a theoretical WPU of at least 250, more preferably at least 350, for example at least 400, for example at least 450, for example at least 500 g/mol. In case in which the unsaturated resin comprising ethylenic unsaturations is amorphous, said resin has preferably a theoretical WPU of at most 2000, more preferably of at most 1500, even more preferably of at most 1300, most preferably of at most 1200, especially of at most 1100, more especially of at most 1000, most especially of at most 900, for example of at most 850, for example of at most 800 g/mol. Preferably the theoretical WPU of an amorphous unsaturated resin comprising ethylenic unsaturations ranges from 450 to 1200 g/mol.

In case in which the unsaturated resin comprising ethylenic unsaturations is amorphous, said resin has preferably a WPU of at least 250, more preferably at least 350, for example at least 400, for example at least 450, for example at least 500 g/mol. In case in which the unsaturated resin comprising ethylenic unsaturations is amorphous, said resin has preferably a WPU of at most 2200, more preferably of at most 1650, even more preferably of at most 1450, most preferably of at most 1350, especially of at most 1100, more especially of at most 1000, most especially of at most 950, for example of at most 900 g/mol. Preferably the WPU of the amorphous unsaturated resin comprising ethylenic unsaturations ranges from 450 to 1350 g/mol. In case in which the unsaturated resin comprising ethylenic unsaturations is amorphous, said resin has preferably a glass transition temperature ($T_g$) of at least 20, more preferably of at least 25, even more preferably of at least 30, most preferably of at least 40, especially of at least 45, more especially of at least 50.

In case in which the unsaturated resin comprising ethylenic unsaturations is amorphous, said resin has preferably a glass transition temperature ($T_g$) of at most 120, more preferably of at most 110, even more preferably of at most 100, most preferably of at most 90, especially of at most 80, more especially of at most 75, most especially of at most 70, for example of at most 65, for example of at most 60° C. Preferably, the amorphous unsaturated resin comprising ethylenic unsaturations has a glass transition temperature ($T_g$) of at least 20 and of at most 65° C.

In case in which the unsaturated resin comprising ethylenic unsaturations is amorphous, said resin has preferably a viscosity of at least 1, more preferably of at least 2, even more preferably of at least 5, most preferably of at least 10, especially of at least 15 Pa·s. In case in which the unsaturated resin comprising ethylenic unsaturations is amorphous, said resin has preferably a viscosity of at most 400, more preferably of at most 300, even more preferably of at most 200, most preferably of at most 150, especially of at most 100, more especially of at most 80, most especially of at most 50 Pa·s. In case in which the unsaturated resin comprising ethylenic unsaturations is amorphous, said resin has preferably a viscosity in the range of from 2 to 50 Pa·s.

In case in which the unsaturated resin comprising ethylenic unsaturations is crystalline, said resin has preferably a $M_n$ of at least 800, more preferably of at least 1000, even more preferably of at least 1500, most preferably of at least 1800, especially of at least 2000, more especially of at least 2300 Da. In case in which the unsaturated resin comprising ethylenic unsaturations is crystalline, said resin has preferably a $M_n$ of at most 20000, more preferably of at most 10000, even more preferably of at most 9000, most preferably of at most 8000, especially of at most 7000 Da. In case in which the unsaturated resin comprising ethylenic unsaturations is crystalline, said resin has preferably a $M_n$ of at least 2000 and of at most 8000 Da, more preferably of at least 2300 and of at most 8000 Da.

In case in which the unsaturated resin comprising ethylenic unsaturations is crystalline, said resin has preferably a theoretical WPU of at least 250, more preferably at least 350, for example at least 400, for example at least 450, for example at least 500 g/mol. In case in which the unsaturated resin comprising ethylenic unsaturations is crystalline, said resin has preferably a theoretical WPU of at most 2800, more preferably at most 2500, even more preferably at most 2000, most preferably at most 1600, especially at most 1400, more especially at most 1200, even more especially at most 1100, most especially at most 1000, for example at most 980, for example at most 950 g/mol.

In case in which the unsaturated resin comprising ethylenic unsaturations is crystalline, said resin has preferably a WPU of at least 250, more preferably at least 350, for example at least 400, for example at least 450, for example at least 500 g/mol. In case in which the unsaturated resin comprising ethylenic unsaturations is crystalline, said resin has preferably a WPU of at most 3000, more preferably of at most 2900, even more preferably of at most 2600, most preferably of at most 2000, especially of at most 1800, more especially of at most 1600, most especially of at most 1400, for example of at most 1350, for example of at most 1200, for example of at most 1100 g/mol. Preferably the WPU of the crystalline unsaturated resin comprising ethylenic unsaturations ranges from 450 to 3000, more preferably from 450 to 26000 g/mol.

In case in which the unsaturated resin comprising ethylenic unsaturations is crystalline, said resin has preferably a glass transition temperature ($T_g$) of at least −70° C., more preferably of at least −50° C., even more preferably of at least −40° C., even more preferably of at least −35° C., most preferably of at least −20° C., especially of at least −10° C., more especially of at least 0° C., even more especially of at least 10, most especially of at least 20° C. In case in which the unsaturated resin comprising ethylenic unsaturations is crystalline, said resin has preferably a glass transition temperature ($T_g$) of at most 120, more preferably of at most 110, even more preferably of at most 100, most preferably of at most 90, especially of at most 80, more especially of at most 75, most especially of at most 70, for example of at most 60, for example of at most 50° C.

In case in which the unsaturated resin comprising ethylenic unsaturations is crystalline, said resin has preferably a melting temperature ($T_m$) of at least 30, more preferably of at least 40, more preferably of at least 50, most preferably of at least 60° C. In case in which the unsaturated resin comprising ethylenic unsaturations is crystalline, said resin has preferably a melting temperature ($T_m$) of at most 200, more preferably at most 180, even more preferably at most 160, even more preferably at most 140, most preferably at most 130, especially at most 120, more especially at most 110, most especially at most 100° C.

In case in which the unsaturated resin comprising ethylenic unsaturations is crystalline, said resin has preferably a crystallization temperature ($T_c$) of at least 30, more preferably of at least 40° C. In case in which the unsaturated resin comprising ethylenic unsaturations is crystalline, said resin has preferably a crystallization temperature ($T_c$) of at most 200, more preferably of at most 180, even more preferably of at most 160, even more preferably of at most 140, most preferably at most 120, especially at most 100.

In case in which the unsaturated resin comprising ethylenic unsaturations is crystalline, said resin has preferably a melting enthalpy ($\Delta H_m$) of at least 35, more preferably of at least 38, even more preferably of at least 40, most preferably of at least 50, especially of at least 60 J/g. In case in which the unsaturated resin comprising ethylenic unsaturations is crystalline, said resin has preferably a melting enthalpy ($\Delta H_m$) of at most 400, more preferably of at most 300, most preferably of at most 260, especially of at most 240, more especially of at most 220, most especially of at most 200, for example of at most 180, for example of at most 160, for example of at most 140, for example of at most 130, for example at most 120 J/g. The melting enthalpy ($\Delta H_m$) is measured using DSC as described herein.

In case in which the unsaturated polyester resin comprising ethylenic unsaturations is crystalline, said polyester resin has preferably a viscosity of at least 0.001, more preferably of at least 0.01, even more preferably of at least 0.1, Pa·s. In case in which the unsaturated polyester resin comprising ethylenic unsaturations is crystalline, said polyester resin has preferably a viscosity of at most 100, more preferably of at most 50, even more preferably of at most 30, most preferably of at most 25, especially of at most 15, more especially of at most 10, most especially of at most 5, for example of at most 3 Pa·s. In case in which the unsaturated polyester resin comprising ethylenic unsaturations is crystalline, said polyester resin has preferably a viscosity in the range of from 0.01 to 5 Pa·s.

Preferably, the unsaturated resin comprising ethylenic unsaturations (UR) is selected from the group consisting of polyester resins, acrylic resins (polyacrylates), polyurethanes, epoxy resins, polyamides, polyesteramides, polycarbonates, polyureas and mixtures thereof; more preferably the UR is selected from the group consisting of polyester resins, polyurethanes, polyamides, polyesteramides, polyureas; most preferably the UR is selected from the group consisting of unsaturated polyester resins, acrylic resins (polyacrylates), unsaturated polyurethanes, unsaturated epoxy resins, unsaturated polyamides, unsaturated polyesteramides, unsaturated polycarbonates, unsaturated polyureas and mixtures thereof; especially the UR is selected from the group consisting of unsaturated polyester resins, unsaturated polyurethanes, unsaturated polyamides, unsaturated polyesteramides, unsaturated polyureas and mixtures thereof. For example the UR is a polyester resin; most preferably the UR is an unsaturated polyester resin; most preferably the UR is an unsaturated polyester resin comprising ethylenic unsaturations such as acrylated polyester resins, unsaturated polyester resins comprising di-acid ethylenic unsaturations, unsaturated polyester resins comprising 2-butenedioic acid ethylenic unsaturations; especially the UR is an unsaturated polyester resin comprising di-acid ethylenic unsaturations; more especially the UR is an unsaturated polyester resin comprising 2-butenedioic acid ethylenic unsaturations.

The UR may be a polyacrylate, also known as acrylic resin. Generally, an acrylic resin is based on alkyl esters of acrylic acid or methacrylic acid, optionally in combination with styrene. These alkyl esters of acrylic or methacrylic acid may be replaced by hydroxyl or glycidyl functional acrylic or methacrylic acids. Exemplary alkyl esters of acrylic or methacrylic acids include but are not limited to ethyl methacrylate, ethyl acrylate, isopropyl methacrylate, isopropyl acrylate, n-butyl methacrylate, n-butyl acrylate, n-propyl methacrylate, n-propyl acrylate, isobutyl methacrylate, isobutyl acrylate, ethylhexyl acrylate, cyclohexyl methacrylate, cyclohexyl acrylate and mixtures thereof. To obtain an acrylic resin having a hydroxyl functionality, the acrylic resin contains a hydroxyl functional (meth)acrylic acid [by the term "(meth)acrylic" is meant herein "methacrylic or acrylic"], preferably in combination with alkyl esters of (meth)acrylic acid. Examples of hydroxyl functional (meth) acrylic acid esters include hydroxyethyl (meth)acrylate, and hydroxypropyl (meth)acrylate etc. To obtain an acrylic resin having a glycidyl functionality, the acrylic resin contains a glycidyl functional (meth)acrylic acid esters, preferably in combination with alkyl esters of (meth)acrylic acid. Examples of glycidyl functional (meth)acrylic acid esters include glycidyl methacrylate, etc. It is also possible to synthesize acrylic resins with both hydroxyl and glycidyl functionality. The introduction of ethylenic unsaturations to an acrylic resin may be carried out by reacting the hydroxyl and/or glycidyl moieties on the acrylic resin with an unsaturated organic acid such as acrylic acid, methacrylic acid, 2-butenedioic acid.

The UR may be a polyurethane. Polyurethanes can for example be prepared using customary, generally known polyaddition reaction of a (poly)isocyanate with a (poly) alcohol in the presence of, if needed a catalyst and other additives. For example, if needed, customary catalysts such as, for example tertiary amines or organometallic compounds, such as for example monobutyltin, tris(2-ethylhexanoate), tetrabutyl titanate or dibutyl tin dilaurate can be used. Examples of amounts of these catalysts used are usually around 0.01 wt % based on the total weight of the resin. Examples of the (poly)alcohols that may be used in the preparation of polyurethanes are the same as those that can be used in the preparation of a polyester resin. Examples of isocyanates that may be used in the preparation of polyurethanes include but are not limited to those mentioned herein for the preparation of the VFUR. The introduction of ethylenic unsaturations to a polyurethane resin may be carried out by reacting the isocyanate moieties on the polyurethane resin with an unsaturated hydroxyl functional ester such as hydroxyl propyl methacrylate or hydroxyl ethyl acrylate or hydroxyl ethyl methacrylate; alternatively the introduction of ethylenic unsaturations to a polyurethane resin may be carried out by reacting the hydroxyl moieties on the polyurethane with an unsaturated organic acid such as acrylic acid, methacrylic acid, 2-butenedioic acid.

The UR may be an epoxy resin. Epoxy resins may for example be prepared from phenolic compounds in combination with epichlorohydrins resulting in epoxy resins like for example a bisphenol A diglycidyl ether such as is commercially available as Epikote™ 1001 or a Novolac epoxide. The introduction of ethylenic unsaturations to an epoxy resin may be carried out by reacting the epoxy moieties on the epoxy resin with an unsaturated organic acid such as acrylic acid, methacrylic acid, 2-butenedioic acid.

The UR may be a polyamide. Polyamides can for example be prepared by a polycondensation reaction of a diamine and a dicarboxylic acid. The dicarboxylic acids may be branched, non-linear or linear. Exemplary dicarboxylic acids include but are not limited to phthalic acid, isophthalic acid, terephthalic acid, 1,4-cyclohexanedicarboxylic acid, naphthalene-2,6-dicarboxylic acid, cyclohexanediacetic acid, diphenyl-4,4'-dicarboxylic acid, phenylenedi (oxyacetic acid), sebacic acid, succinic acid, adipic acid, glutaric acid and/or azelaic acid. Exemplary diamines include but are not limited to isophorondiamine, 1,2-ethylenediamine, 1,3-propylenediamine, 1,6-hexamethylenediamine, 1,12-dodecylenediamine, 1,4 cyclohexanebismethylamine, piperazine, p-xylylenediamine and/or m-xylylenediamine. The polyamide may also be branched using branching agents. Exemplary branching agents include but are not limited to amines for example di-alkylene-triamines, such as for example di-ethylene-triamine or di-hexamethylene-triamine; di-alkylene-tetramines or di-alkylene-pentamines; acids, for example 1,3,5-benzene tricarboxylic acid, trimellitic anhydride or pyromelitic anhydride; and poly-functional amino acids, such as for example aspartic acid or glutamic acid. The introduction of ethylenic unsaturations may be carried out by reacting the carboxyl moieties on a polyamide resin with an unsaturated organic alcohol, such as hydroxyethylacrylate, hydroxyethylmethacrylate.

The UR may be a polyesteramide. Polyesteramides are resins comprising both ester bonds (as in a polyester) and amide bonds (as in a polyamide) and may for example be prepared from mono-, di-, tri- or polyfunctional monomers, such as monomers with carboxylic acid functionality, monomers with hydroxyl functionality, monomers with amine functionality and/or monomers having a combination of any of these functionalities. The introduction of ethylenic unsaturations may be carried out by reacting the carboxyl moieties on a polyesteramide resin with an unsaturated organic alcohol, such as hydroxyethyl(meth)acrylate. The UR may be a polycarbonate. The introduction of ethylenic unsaturations to a polycarbonate may be carried out by reacting the hydroxyl moieties on the polycarbonate with an unsaturated organic acid such as acrylic acid, methacrylic acid, 2-butenedioic acid.

The UR may be a polyurea. Polyureas can for example be prepared using customary, generally known polyaddition reactions of a (poly)isocyanate with a (poly)amine in the presence of, if needed a catalyst and other additives similar to what is described above for polyurethanes. Suitable (poly)amines for the preparation of polyureas include those as are exemplified above for the polyamides. Suitable (poly)isocyanates for the preparation of polyureas include those as are exemplified above for the polyurethanes. The introduction of ethylenic unsaturations to a polyuria may be carried out by reacting the amine and/or isocyanate moieties in the polyurea with an unsaturated organic acid such as acrylic acid, methacrylic acid, 2-butenedioic acid.

The UR may be an unsaturated polyester resin such as an acrylated polyester resin or a polyester comprising ethylenic unsaturations in its backbone; preferably the UR is an unsaturated polyester resin comprising ethylenic unsaturations such as acrylated polyester resins, unsaturated polyester resins comprising di-acid ethylenic unsaturations, unsaturated polyester resins comprising 2-butenedioic acid ethylenic unsaturations; especially the UR is an unsaturated polyester resin comprising di-acid ethylenic unsaturations; more especially the UR is an unsaturated polyester resin comprising 2-butenedioic acid ethylenic unsaturations. The unsaturated polyester resins comprising ethylenic unsaturations may be amorphous or crystalline. The unsaturated polyester resin comprising di-acid ethylenic unsaturations may be amorphous or crystalline. The unsaturated polyester resins comprising 2-butenedioic acid ethylenic unsaturations may be amorphous or crystalline.

Polyesters (or commonly known in the art as polyester resins) are generally polycondensation products of polyols and polycarboxylic acids. According to the invention a polyester resin is preferably the polycondensation product of polyols and polycarboxylic acids, more preferably a polyester resin is the polycondensation product of dicarboxylic acids, di-alcohols (diols) and/or trifunctional alcohols and/or trifunctional carboxylic acids.

Examples of polycarboxylic acids, especially dicarboxylic acids which may be used in the preparation of a polyester resin include isophthalic acid, terephthalic acid, hexahydroterephthalic acid, 2,6-naphthalenedicarboxylic acid and 4,4'-oxybisbenzoic acid, 3,6-dichlorophthalic acid, tetrachlorophthalic acid, tetrahydrophthalic acid, hexahydroterephthalic acid, hexachloroendomethylenetetrahydrophthalic acid, endomethylenetetrahydrophthalic acid, phthalic acid, azelaic acid, sebacic acid, decanedicarboxylic acid, adipic acid, succinic acid and trimellitic acid. These illustrative polycarboxylic acids can be used in their acid form or where available, in the form of their anhydrides, acyl chlorides or lower alkyl esters. Mixtures of polycarboxylic acids can also be used. In addition hydroxycarboxylic acids and lactones can be used. Examples include hydroxypivalic acid and ε-caprolactone.

Polyols, in particular diols, can be reacted with the carboxylic acids or their analogues as described above to prepare the polyester resin. Examples of polyalcohols include aliphatic diols, for example, ethylene glycol, propane-1,2-diol, propane-1,3-diol, butane-1,2-diol, butane-1,4-diol, butane-1,3-diol, 2,2-dimethylpropane-1,3-diol (neopentyl glycol), hexane-2,5-diol, hexane-1,6-diol, 2,2-bis-(4-hydroxycyclohexyl)-propane (hydrogenated bisphenol-A), 1,4-dimethylolcyclohexane, diethylene glycol, dipropylene glycol and 2,2-bis[4-(2-hydroxyethoxy)-phenyl]propane, the hydroxypivalic ester of neopentylglycol and 4,8-bis-(hydroxymethyl)tricyclo[5,2,1,0]decane (=tricyclodecane dimethylol) and 2,3-butenediol.

Monofunctional carboxylic acids, for example para-tert-butyl benzoic acid, benzoic acid, methyl benzoic acid, cinnamic acid, crotonic acid may be used to block the polymer chain.

Trifunctional or more functional alcohols or carboxylic acids can be used to obtain branched polyester resins. Examples of suitable trifunctional or more functional alcohols or carboxylic acids include but not limited to glycerol, hexanetriol, trimethylol ethane, trimethylol propane, pentaerythritol and sorbitol, trimellitic acid, trimellitic acid anhydride, pyromellitic acid dimethylolpropionic acid (DMPA). To obtain branched polyester resins trifunctional monomers such as trimethylolpropane may be used.

The polyester resins can be prepared via customary, generally known polymerization methods by conventional esterification and/or transesterification or by esterification and/or transesterification via the use of an enzyme. For example, if needed, customary esterification catalysts such as, for example, butylchlorotindihydroxide, dibutyltin oxide, tetrabutyl titanate or butyl stannoic acid can be used. Examples of amounts of these esterification catalysts used are usually around 0.1 wt % based on the total weight of the polyester resin.

The conditions for preparing a polyester resin and the COOH/OH ratio can be chosen such that end products are obtained which have an acid value or hydroxyl value which is within the intended range of values.

The polyester resins used in the thermosetting powder coating compositions of the invention are unsaturated polyester resins comprising ethylenic unsaturations, preferably comprising di-acid ethylenic unsaturations, more preferably comprising 2-butenedioic acid ethylenic unsaturations; said ethylenic unsaturations may be present in the backbone of the polyester resin and/or pendant to the backbone of the polyester resin and/or at the terminus of the polyester resin. Preferably, said ethylenic unsaturations are in the backbone of the polyester resin and/or pendant to the backbone of the polyester resin, more preferably said ethylenic unsaturations are in the backbone of the polyester resin; said ethylenic unsaturations may be built into the polyester resin backbone, for instance by reacting a hydroxyl functional monomer (such as the polyalcohols mentioned before) with an unsaturated di-acid monomer as mentioned above. It is also possible to connect the di-acid ethylenic unsaturation to the terminus (or termini) of the polyester resin, for example by reacting a hydroxyl functional terminal group of the polyester resin with an unsaturated di-acid monomer or its corresponding anhydride as mentioned above.

Acrylated polyester resins are unsaturated polyester resins comprising ethylenic unsaturations said ethylenic unsaturations being derived from methacrylic acid, acrylic acid, ethylenically unsaturated glycidyl functional monomer, such as for example glycidyl methacrylate or glycidyl acrylate; in the acrylated polyester resins said ethylenic unsaturations are typically at the terminus (or termini) of the unsaturated polyester resin. Acrylated polyester resins may be prepared by reacting for example a hydroxyl or an epoxy or an amine functional (preferably also terminal) group of a polyester resin with methacrylic acid, acrylic acid, ethylenically unsaturated glycidyl functional monomer, such as for example glycidyl methacrylate or glycidyl acrylate. Alternatively, an acrylated polyester resin may be prepared by reacting a carboxyl functional (preferably also terminal) group of a polyester resin with an ethylenically unsaturated glycidyl functional monomer, such as for example glycidyl methacrylate or glycidyl acrylate.

Preferably polyester resins comprising di-acid ethylenic unsaturations have di-acids chosen from the group consisting of any isomer of 2-butenedioic acid, 2-methyl-2-butenedioic acid, itaconic acid and mixtures thereof. Derivatives of any isomer of unsaturated di-acids include esters, anhydrides, acid salts. Fumaric acid and maleic acid are isomers of 2-butenedioic acid, whereas citraconic acid and mesaconic acid are isomers of 2-methyl-2-butenedioic acid. For example "di-acid ethylenic unsaturations" may be obtainable from fumaric, maleic, itaconic, citraconic and/or mesaconic acids, derivatives thereof and/or mixtures thereof. Fumaric acid based unsaturation is an informal term used herein to denote unsaturation derived from fumaric acid, its isomers e.g. maleic acid and/or derivatives thereof. More preferably the di-acids are chosen from the group consisting of any isomer of 2-butenedioc acid, itaconic acid and mixtures thereof, even more the di-acids are chosen from the group consisting of any isomer of 2-butenedioc acid. Besides 2-butenedioic acid ethylenic unsaturations, the unsaturated polyester resin may of course also have other di-acid ethylenic unsaturations.

Preferably, the unsaturated polyester resin comprising ethylenic unsaturations such as di-acid ethylenic unsaturations such as 2-butenedioic acid ethylenic unsaturations is obtainable from at least the following monomers: unsaturated di-acid for example any isomer of 2-butenedioic acid, 2-methyl-2-butenedioic acid, itaconic acid, derivatives thereof and/or mixtures thereof, terephthalic acid, neopentylglycol and/or propylene glycol. Trifunctional monomers such as trimethylolpropane may be used in order to obtain branched unsaturated polyester resin comprising ethylenic unsaturations such as di-acid ethylenic unsaturations such as 2-butenedioic acid ethylenic unsaturations.

The amount of the unsaturated polyester resin comprising ethylenic unsaturations such as di-acid ethylenic unsaturations such as 2-butenedioic acid ethylenic unsaturations is preferably at least 40, more preferably at least 50, most preferably at least 55, most preferably at least 60, especially at least 65, more especially at least 69, most especially at least 70, for example at least 71, for example at least 72% w/w on total amount of UR and curing agent such as a VFUR. The amount of the unsaturated polyester resin comprising ethylenic unsaturations such as di-acid ethylenic unsaturations such as 2-butenedioic acid ethylenic unsaturations is preferably at most 99, more preferably at most 95, most preferably at most 90, most preferably at most 88, especially at most 86, more especially at most 84, most especially at most 82, for example at most 81, for example at most 80% w/w on total amount of UR and curing agent such as a VFUR. Preferably the amount of the unsaturated polyester resin comprising ethylenic unsaturations such as di-acid ethylenic unsaturations such as 2-butenedioic acid ethylenic unsaturations in a thermosetting powder coating composition ranges from 69 to 84% w/w on total amount of UR and curing agent such as a VFUR.

The $M_n$ of the unsaturated polyester resin comprising ethylenic unsaturations such as di-acid ethylenic unsaturations such as 2-butenedioic acid ethylenic unsaturations is preferably at least 800, more preferably of at least 1000, even more preferably of at least 1500, most preferably of at least 1800, especially of at least 2000, more especially of at least 2300 Da. The $M_n$ of the unsaturated polyester resin comprising ethylenic unsaturations such as di-acid ethylenic unsaturations such as 2-butenedioic acid ethylenic unsaturations is preferably at most 20000, more preferably at most 10000, even more preferably at most 9000, most preferably at most 8000, especially at most 7000, more especially at most 6000, most especially at most 5000 Da. Preferably, the unsaturated polyester resin comprising ethylenic unsaturations such as di-acid ethylenic unsaturations such as 2-butenedioic acid ethylenic unsaturations has a $M_n$ of at least 2000 and of at most 8000 Da.

The theoretical WPU of the unsaturated polyester resin comprising ethylenic unsaturations such as di-acid ethylenic unsaturations such as 2-butenedioic acid ethylenic unsaturations is preferably at least 250, more preferably at least 300, even more preferably at least 350, most preferably at least 400, most preferably at least 450, especially at least 500 g/mol. Preferably, the theoretical WPU of the unsaturated polyester resin comprising ethylenic unsaturations such as di-acid ethylenic unsaturations such as 2-butenedioic acid ethylenic unsaturations is at most 2000, more preferably at most 1500, even more preferably at most 1300, most preferably at most 1200, especially of at most 1100, more especially of at most 1000, most especially of at most 900, for example of at most 850, for example of at most 800 g/mol. Preferably the theoretical WPU of the unsaturated polyester resin comprising ethylenic unsaturations such as di-acid ethylenic unsaturations such as 2-butenedioic acid ethylenic unsaturations ranges from 450 to 1200 g/mol.

The WPU of the unsaturated polyester resin comprising ethylenic unsaturations such as di-acid ethylenic unsaturations such as 2-butenedioic acid ethylenic unsaturations is preferably at least 250, more preferably at least 300, even more preferably at least 350, most preferably at least 400, most preferably at least 450, especially at least 500 g/mol. Preferably, the WPU of the unsaturated polyester resin comprising ethylenic unsaturations such as di-acid ethylenic unsaturations such as 2-butenedioic acid ethylenic unsaturations is at most 2200, more preferably of at most 1650, even more preferably of at most 1450, most preferably of at most 1350, especially of at most 1100, more especially of at most 1000, most especially of at most 950, for example of at most 900 g/mol. Preferably the WPU of the unsaturated polyester resin comprising ethylenic unsaturations such as di-acid ethylenic unsaturations such as 2-butenedioic acid ethylenic unsaturations ranges from 450 to 1350 g/mol.

The acid value (AV) of the unsaturated polyester resin comprising ethylenic unsaturations such as di-acid ethylenic unsaturations such as 2-butenedioic acid ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50, for example at most 40, for example at most 30, for example at most 20, for example at most 10, for example at most 7, for example at most 5, for example at most 4 mgKOH/g unsaturated resin comprising ethylenic unsaturations such as di-acid ethylenic unsaturations such as 2-butenedioic acid ethylenic unsaturations. The acid value (AV) of the unsaturated polyester resin comprising ethylenic unsaturations such as di-acid ethylenic unsaturations such as 2-butenedioic acid ethylenic unsaturations is preferably at least 0, more preferably at least 0.001, even more preferably at least 0.01, most preferably at least 0.1, especially at least 0.5, more especially at least 1, most especially at least 2, for example at least 2.5, for example at least 3, for example at least 4, for example at least 5 for example at least 10, for example at least 15 mg KOH/g unsaturated polyester resin comprising ethylenic unsaturations such as di-acid ethylenic unsaturations such as 2-butenedioic acid ethylenic unsaturations. Preferably, the acid value (AV) of an unsaturated polyester resin comprising ethylenic unsaturations such as di-acid ethylenic unsaturations such as 2-butenedioic acid ethylenic unsaturations from 0.1 to 60, more preferably ranges from 0.1 to 50, even more preferably ranges from 0.1 to 10 mg KOH/g unsaturated polyester resin comprising ethylenic unsaturations such as di-acid ethylenic unsaturations such as 2-butenedioic acid ethylenic unsaturations.

The hydroxyl value (OHV) of the unsaturated polyester resin comprising ethylenic unsaturations such as di-acid ethylenic unsaturations such as 2-butenedioic acid ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50 mg KOH/g unsaturated polyester resin comprising ethylenic unsaturations such as di-acid ethylenic unsaturations such as 2-butenedioic acid ethylenic unsaturations. The hydroxyl value (OHV) of the unsaturated polyester resin comprising ethylenic unsaturations such as di-acid ethylenic unsaturations such as 2-butenedioic acid ethylenic unsaturations is preferably at least 0.1, more preferably at least 0.5, even more preferably at least 1, most preferably at least 2, especially at least 2.5, more especially at least 3, most especially at least 4, for example at least 5, for example at least 8, for example at least 10, for example at least 15 mg KOH/g unsaturated polyester resin comprising ethylenic unsaturations such as di-acid ethylenic unsaturations such as 2-butenedioic acid ethylenic unsaturations. Preferably the hydroxyl value (OHV) of the unsaturated polyester resin comprising ethylenic unsaturations such as di-acid ethylenic unsaturations such as 2-butenedioic acid ethylenic unsaturations is from 0.1 to 70, more preferably from 10 to 70, even more preferably from 12 to 60 mg KOH/g unsaturated polyester resin comprising ethylenic unsaturations such as di-acid ethylenic unsaturations such as 2-butenedioic acid ethylenic unsaturations.

The acid value of a polyester resin is a measure for the amount of carboxyl (acid) groups in the polyester resin whereas the hydroxyl value of a polyester resin is a measure for the amount of hydroxyl groups in the polyester resin.

The unsaturated polyester resins comprising ethylenic unsaturations may be amorphous or crystalline.

The unsaturated polyester resin comprising di-acid ethylenic unsaturations may be amorphous or crystalline.

The unsaturated polyester resins comprising 2-butenedioic acid ethylenic unsaturations may be amorphous or crystalline.

In case in which the unsaturated polyester resin comprising ethylenic unsaturations such as di-acid ethylenic unsaturations such as 2-butenedioic acid ethylenic unsaturations, is amorphous, said polyester resin has preferably a theoretical WPU of at least 250, more preferably at least 350, for example at least 400, for example at least 450, for example at least 500 g/mol. In case in which the unsaturated polyester resin comprising ethylenic unsaturations such as di-acid ethylenic unsaturations such as 2-butenedioic acid ethylenic unsaturations, is amorphous, said polyester resin has preferably a theoretical WPU of at most 2000, more preferably of at most 1500, even more preferably of at most 1300, most preferably of at most 1200, especially of at most 1100, more especially of at most 1000, most especially of at most 900, for example of at most 850, for example of at most 800 g/mol. Preferably the theoretical WPU of an amorphous unsaturated polyester resin comprising ethylenic unsaturations such as di-acid ethylenic unsaturations such as 2-butenedioic acid ethylenic unsaturations, ranges from 450 to 1200 g/mol.

In case in which the unsaturated polyester resin comprising ethylenic unsaturations such as di-acid ethylenic unsaturations such as 2-butenedioic acid ethylenic unsaturations, is amorphous, said polyester resin has preferably a WPU of at least 250, more preferably at least 350, for example at least 400, for example at least 450, for example at least 500 g/mol. In case in which the unsaturated polyester resin comprising ethylenic unsaturations such as di-acid ethylenic unsaturations such as 2-butenedioic acid ethylenic unsaturations, is amorphous, said polyester resin has preferably a WPU of at most 2200, more preferably of at most 1650, even more preferably of at most 1450, most preferably of at most 1350, especially of at most 1100, more especially of at most 1000, most especially of at most 950, for example of at most 900 g/mol. Preferably the WPU of the unsaturated polyester resin comprising ethylenic unsaturations such as di-acid ethylenic unsaturations such as 2-butenedioic acid ethylenic unsaturations, ranges from 450 to 1350 g/mol.

In case in which the unsaturated polyester resin comprising ethylenic unsaturations such as di-acid ethylenic unsaturations such as 2-butenedioic acid ethylenic unsaturations, is amorphous, said polyester resin has preferably a glass transition temperature ($T_g$) of at least 20, more preferably of at least 25, even more preferably of at least 30, most preferably of at least 40, especially of at least 45, more especially of at least 50. In case in which the unsaturated polyester resin comprising ethylenic unsaturations such as di-acid ethylenic unsaturations such as 2-butenedioic acid ethylenic unsaturations, is amorphous, said polyester resin has preferably a glass transition temperature ($T_g$) of at most 120, more preferably of at most 110, even more preferably of at most 100, most preferably of at most 90, especially of at most 80, more especially of at most 75, most especially of at most 70, for example of at most 65, for example of at most 60° C. Preferably, the amorphous unsaturated polyester resin comprising ethylenic unsaturations such as di-acid ethylenic unsaturations such as 2-butenedioic acid ethylenic unsaturations has a glass transition temperature ($T_g$) of at least 20 and of at most 65° C.

The acid value (AV) of the amorphous unsaturated polyester resin comprising ethylenic unsaturations such as di-acid ethylenic unsaturations such as 2-butenedioic acid ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50, for example at most 40, for example at most 30, for example at most 20, for example at most 10, for example at most 7, for example at most 5, for example at most 4 mgKOH/g amorphous unsaturated resin comprising ethylenic unsaturations such as di-acid ethylenic unsaturations such as 2-butenedioic acid ethylenic unsaturations. The acid value (AV) of the amorphous unsaturated polyester resin comprising ethylenic unsaturations such as di-acid ethylenic unsaturations such as 2-butenedioic acid ethylenic unsaturations is preferably at least 0, more preferably at least 0.001, even more preferably at least 0.01, most preferably at least 0.1, especially at least 0.5, more especially at least 1, most especially at least 2, for example at least 2.5, for example at least 3, for example at least 4, for example at least 5 for example at least 10, for example at least 15 mg KOH/g amorphous unsaturated polyester resin comprising ethylenic unsaturations such as di-acid ethylenic unsaturations such as 2-butenedioic acid ethylenic unsaturations. Preferably, the acid value (AV) of the amorphous unsaturated polyester resin comprising ethylenic unsaturations such as di-acid ethylenic unsaturations such as 2-butenedioic acid ethylenic unsaturations from 0.1 to 60, more preferably ranges from 0.1 to 50, even more preferably ranges from 0.1 to 10 mg KOH/g amorphous unsaturated polyester resin comprising ethylenic unsaturations such as di-acid ethylenic unsaturations such as 2-butenedioic acid ethylenic unsaturations.

The hydroxyl value (OHV) of the amorphous unsaturated polyester resin comprising ethylenic unsaturations such as di-acid ethylenic unsaturations such as 2-butenedioic acid ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50 mg KOH/g amorphous unsaturated polyester resin comprising ethylenic unsaturations such as di-acid ethylenic unsaturations such as 2-butenedioic acid ethylenic unsaturations. The hydroxyl value (OHV) of the amorphous unsaturated polyester resin comprising ethylenic unsaturations such as di-acid ethylenic unsaturations such as 2-butenedioic acid ethylenic unsaturations is preferably at least 0.1, more preferably at least 0.5, even more preferably at least 1, most preferably at least 2, especially at least 2.5, more especially at least 3, most especially at least 4, for example at least 5, for example at least 8, for example at least 10, for example at least 15 mg KOH/g amorphous unsaturated polyester resin comprising ethylenic unsaturations such as di-acid ethylenic unsaturations such as 2-butenedioic acid ethylenic unsaturations. Preferably the hydroxyl value (OHV) of the amorphous unsaturated polyester resin comprising ethylenic unsaturations such as di-acid ethylenic unsaturations such as 2-butenedioic acid ethylenic unsaturations is from 0.1 to 70, more preferably from 10 to 70, even more preferably from 12 to 60 mg KOH/g amorphous unsaturated polyester resin comprising ethylenic unsaturations such as di-acid ethylenic unsaturations such as 2-butenedioic acid ethylenic unsaturations.

In case in which the unsaturated polyester resin comprising ethylenic unsaturations such as di-acid ethylenic unsaturations such as 2-butenedioic acid ethylenic unsaturations, is amorphous, said polyester resin has preferably a glass transition temperature ($T_g$) of at least 20, more preferably of at least 25, even more preferably of at least 30, most preferably of at least 40, especially of at least 45, more especially of at least 50. In case in which the unsaturated polyester resin comprising ethylenic unsaturations such as di-acid ethylenic unsaturations such as 2-butenedioic acid ethylenic unsaturations, is amorphous, said polyester resin has preferably a glass transition temperature ($T_g$) of at most 120, more preferably of at most 110, even more preferably of at most 100, most preferably of at most 90, especially of at most 80, more especially of at most 75, most especially of at most 70, for example of at most 65, for example of at most 60° C. Preferably, the amorphous unsaturated polyester resin comprising ethylenic unsaturations such as di-acid ethylenic unsaturations such as 2-butenedioic acid ethylenic unsaturations has a glass transition temperature ($T_g$) of at least 20 and of at most 65° C.

In case in which the unsaturated polyester resin comprising ethylenic unsaturations such as di-acid ethylenic unsaturations such as 2-butenedioic acid ethylenic unsaturations, is amorphous, said polyester resin has preferably a viscosity of at least 1, more preferably of at least 2, even more preferably of at least 5, most preferably of at least 10, especially of at least 15 Pa·s. In case in which the unsaturated polyester resin comprising ethylenic unsaturations such as di-acid ethylenic unsaturations such as 2-butenedioic acid ethylenic unsaturations, is amorphous, said polyester resin has preferably a viscosity of at most 400, more preferably of at most 300, even more preferably of at most 200, most preferably of at most 150, especially of at most 100, more especially of at most 80, most especially of at most 50 Pa·s. In case in which the unsaturated polyester resin comprising ethylenic unsaturations such as di-acid ethylenic unsaturations such as 2-butenedioic acid ethylenic unsaturations, is amorphous, said polyester resin has preferably a viscosity in the range of from 2 to 50 Pa·s.

In case in which the unsaturated polyester resin comprising ethylenic unsaturations such as di-acid ethylenic unsaturations such as 2-butenedioic acid ethylenic unsaturations, is amorphous said polyester resin has preferably a $M_n$ of at least 800, more preferably of at least 1000, even more preferably of at least 1500, most preferably of at least 1800, especially of at least 2000, more especially of at least 2300 Da. In case in which the unsaturated polyester resin comprising ethylenic unsaturations such as di-acid ethylenic unsaturations such as 2-butenedioic acid ethylenic unsaturations, is amorphous said polyester resin has preferably a $M_n$ of at most 20000, more preferably of at most 10000, even more preferably of at most 9000, most preferably of at most 8000, especially of at most 7000, more especially of at most 6000 Da, most especially of at most 5000 Da. In case in which the unsaturated polyester resin comprising ethylenic unsaturations such as di-acid ethylenic unsaturations such as 2-butenedioic acid ethylenic unsaturations, is amorphous, said polyester resin has preferably a $M_n$ of at least 2000 and of at most 8000 Da, more preferably of at least 2000 and of at most 5000 Da.

In case in which the unsaturated polyester resin comprising ethylenic unsaturations such as di-acid ethylenic unsaturations such as 2-butenedioic acid ethylenic unsaturations, is crystalline, said polyester resin has preferably a theoretical WPU of at least 250, more preferably at least 350, for example at least 400, for example at least 450, for example at least 500 g/mol. In case in which the unsaturated polyester resin comprising ethylenic unsaturations such as di-acid ethylenic unsaturations such as 2-butenedioic acid ethylenic unsaturations, is crystalline, said polyester resin has preferably a theoretical WPU of at most 2800, more preferably at most 2500, even more preferably at most 2000, most preferably at most 1600, especially at most 1400, more especially at most 1200, even more especially at most 1100, most especially at most 1000, for example at most 980, for example at most 950 g/mol.

In case in which the unsaturated polyester resin comprising ethylenic unsaturations such as di-acid ethylenic unsaturations such as 2-butenedioic acid ethylenic unsaturations, is crystalline, said polyester resin has preferably a WPU of at least 250, more preferably at least 350, for example at least 400, for example at least 450, for example at least 500 g/mol. In case in which the unsaturated polyester resin comprising ethylenic unsaturations such as di-acid ethylenic unsaturations such as 2-butenedioic acid ethylenic unsaturations, is crystalline, said polyester resin has preferably a WPU of at most 3000, more preferably of at most 2900, even more preferably of at most 2600, most preferably of at most 2000, especially of at most 1800, more especially of at most 1600, most especially of at most 1400, for example of at most 1350, for example of at most 1200, for example of at most 1100 g/mol. Preferably the WPU of the crystalline unsaturated resin comprising ethylenic unsaturations ranges from 450 to 3000, more preferably from 450 to 2600 g/mol.

In case in which the unsaturated polyester resin comprising ethylenic unsaturations such as di-acid ethylenic unsaturations such as 2-butenedioic acid ethylenic unsaturations, is crystalline, said resin has preferably a glass transition temperature ($T_g$) of at least −70° C., more preferably of at least −50° C., even more preferably of at least −40° C., even more preferably of at least −35° C., most preferably of at least −20° C., especially of at least −10° C., more especially of at least 0° C., even more especially of at least 10, most especially of at least 20° C. In case in which the unsaturated polyester resin comprising ethylenic unsaturations such as di-acid ethylenic unsaturations such as 2-butenedioic acid ethylenic unsaturations, is crystalline, said resin has preferably a glass transition temperature ($T_g$) of at most 120, more preferably of at most 110, even more preferably of at most 100, most preferably of at most 90, especially of at most 80, more especially of at most 75, most especially of at most 70, for example of at most 65, for example of at most 60° C. Preferably, the amorphous unsaturated resin comprising ethylenic unsaturations has a glass transition temperature ($T_g$) of at least 20 and of at most 65° C.

In case in which the unsaturated polyester resin comprising ethylenic unsaturations such as di-acid ethylenic unsaturations such as 2-butenedioic acid ethylenic unsaturations, is crystalline, said polyester resin has preferably a melting temperature ($T_m$) of at least 30, more preferably of at least 40, more preferably of at least 50, most preferably of at least 60° C. In case in which the unsaturated polyester resin comprising ethylenic unsaturations such as di-acid ethylenic unsaturations such as 2-butenedioic acid ethylenic unsaturations, is crystalline, said polyester resin has preferably a melting temperature ($T_m$) of at most 200, more preferably at most 180, even more preferably at most 160, even more preferably at most 140, most preferably at most 130, especially at most 120, more especially at most 110, most especially at most 100° C.

In case in which the unsaturated polyester resin comprising ethylenic unsaturations such as di-acid ethylenic unsaturations such as 2-butenedioic acid ethylenic unsaturations, is crystalline, said polyester resin has preferably a crystallization temperature ($T_c$) of at least 30, more preferably of at least 40° C. In case in which the unsaturated polyester resin comprising ethylenic unsaturations such as di-acid ethylenic unsaturations such as 2-butenedioic acid ethylenic unsaturations, is crystalline, said polyester resin has preferably a crystallization temperature ($T_c$) of at most 200, more preferably of at most 180, even more preferably of at most 160, even more preferably of at most 140, most preferably at most 120, especially at most 100° C.

In case in which the unsaturated polyester resin comprising ethylenic unsaturations such as di-acid ethylenic unsaturations such as 2-butenedioic acid ethylenic unsaturations, is crystalline, said polyester resin has preferably a melting enthalpy ($\Delta H_m$) of at least 35, more preferably of at least 38, even more preferably of at least 40, most preferably of at least 50, especially of at least 60 J/g. In case in which the unsaturated polyester resin comprising ethylenic unsaturations such as di-acid ethylenic unsaturations such as 2-butenedioic acid ethylenic unsaturations, is crystalline, said polyester resin has preferably a melting enthalpy ($\Delta H_m$) of at most 400, more preferably of at most 300, most preferably of at most 260, especially of at most 240, more especially of at most 220, most especially of at most 200, for example of at most 180, for example of at most 160, for example of at most 140, for example of at most 130, for example of at most 120 J/g. The melting enthalpy ($\Delta H_m$) is measured using DSC as described herein.

The acid value (AV) of the crystalline unsaturated polyester resin comprising ethylenic unsaturations such as di-acid ethylenic unsaturations such as 2-butenedioic acid ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50, for example at most 40, for example at most 30, for example at most 20, for example at most 10, for example at most 7, for example at most 5, for example at most 4 mgKOH/g crystalline unsaturated resin comprising ethylenic unsaturations such as di-acid ethylenic unsaturations such as 2-butenedioic acid ethylenic unsaturations. The acid value (AV) of the crystalline unsaturated polyester resin comprising ethylenic unsaturations such as di-acid ethylenic unsaturations such as 2-butenedioic acid ethylenic unsaturations is preferably at least 0, more preferably at least 0.001, even more preferably at least 0.01, most preferably at least 0.1, especially at least 0.5, more especially at least 1, most especially at least 2, for example at least 2.5, for example at least 3, for example at least 4, for example at least 5 for example at least 10, for example at least 15 mg KOH/g crystalline unsaturated polyester resin comprising ethylenic unsaturations such as di-acid ethylenic unsaturations such as 2-butenedioic acid ethylenic unsaturations. Preferably, the acid value (AV) of the crystalline unsaturated polyester resin comprising ethylenic unsaturations such as di-acid ethylenic unsaturations such as 2-butenedioic acid ethylenic unsaturations from 0.1 to 60, more preferably ranges from 0.1 to 50, even more preferably ranges from 0.1 to 10 mg KOH/g crystalline unsaturated polyester resin comprising ethylenic unsaturations such as di-acid ethylenic unsaturations such as 2-butenedioic acid ethylenic unsaturations.

The hydroxyl value (OHV) of the crystalline unsaturated polyester resin comprising ethylenic unsaturations such as di-acid ethylenic unsaturations such as 2-butenedioic acid ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50 mg KOH/g crystalline unsaturated polyester resin comprising ethylenic unsaturations such as di-acid ethylenic unsaturations such as 2-butenedioic acid ethylenic unsaturations. The hydroxyl value (OHV) of the crystalline unsaturated polyester resin comprising ethylenic unsaturations such as di-acid ethylenic unsaturations such as 2-butenedioic acid ethylenic unsaturations is preferably at least 0.1, more preferably at least 0.5, even more preferably at least 1, most preferably at least 2, especially at least 2.5, more especially at least 3, most especially at least 4, for example at least 5, for example at least 8, for example at least 10, for example at least 15 mg KOH/g crystalline unsaturated polyester resin comprising ethylenic unsaturations such as di-acid ethylenic unsaturations such as 2-butenedioic acid ethylenic unsaturations. Preferably the hydroxyl value (OHV) of the crystalline unsaturated polyester resin comprising ethylenic unsaturations such as di-acid ethylenic unsaturations such as 2-butenedioic acid ethylenic unsaturations is from 0.1 to 70, more preferably from 10 to 70, even more preferably from 12 to 60 mg KOH/g crystalline unsaturated polyester resin comprising ethylenic unsaturations such as di-acid ethylenic unsaturations such as 2-butenedioic acid ethylenic unsaturations.

In case in which the unsaturated polyester resin comprising ethylenic unsaturations such as di-acid ethylenic unsaturations such as 2-butenedioic acid ethylenic unsaturations, is crystalline, said polyester resin has preferably a viscosity of at least 0.001, more preferably of at least 0.01, even more preferably of at least 0.1, Pa·s. In case in which the unsaturated polyester resin comprising ethylenic unsaturations such as di-acid ethylenic unsaturations such as 2-butenedioic acid ethylenic unsaturations, is crystalline, said polyester resin has preferably a viscosity of at most 100, more preferably of at most 50, even more preferably of at most 30, most preferably of at most 25, especially of at most 15, more especially of at most 10, most especially of at most 5, for example of at most 3 Pa·s. In case in which the unsaturated polyester resin comprising ethylenic unsaturations such as di-acid ethylenic unsaturations such as 2-butenedioic acid ethylenic unsaturations, is crystalline, said polyester resin has preferably a viscosity in the range of from 0.01 to 5 Pa·s.

In case in which the unsaturated polyester resin comprising ethylenic unsaturations such as di-acid ethylenic unsaturations such as 2-butenedioic acid ethylenic unsaturations, is crystalline, said polyester resin has preferably a $M_n$ of at least 800, more preferably of at least 1000, even more preferably of at least 1500, most preferably of at least 1800, especially of at least 2000, more especially of at least 2300 Da. In case in which the unsaturated polyester resin comprising ethylenic unsaturations such as di-acid ethylenic unsaturations such as 2-butenedioic acid ethylenic unsaturations, is crystalline, said polyester resin has preferably a $M_n$ of at most 20000, more preferably of at most 10000, even more preferably of at most 9000, most preferably of at most 8000, especially of at most 7000 Da In case in which the unsaturated polyester resin comprising ethylenic unsaturations such as di-acid ethylenic unsaturations such as 2-butenedioic acid ethylenic unsaturations, is crystalline, said polyester resin has preferably a $M_n$ of at least 2000 and of at most 8000 Da, more preferably of at least 2300 and of at most 8000 Da.

The crystallinity of the unsaturated polyester resin comprising ethylenic unsaturations such as di-acid ethylenic unsaturations such as 2-butenedioic acid ethylenic unsaturations, may be introduced by using one or more of the following diacids: succinic acid, adipic acid, sebasic acid or dodecanedioc acid, and/or one or more of the following diols: ethyleneglycol, hexanediol, butanediol in the synthesis of said unsaturated polyester resin resins.

All preferred elements and embodiments presented herein for the UR and/or for any one of the unsaturated resins encompassed by the definition of the UR apply equally to each other.

Curing Agents

The curing agent is able to react and crosslink with the unsaturated resin comprising ethylenic unsaturations, said curing agent comprising unsaturations as reactive moieties that are reactable with the ethylenic unsaturations of the unsaturated resin comprising ethylenic unsaturations and said unsaturations of the curing agent are different from those of the unsaturated resin comprising ethylenic unsaturations.

The curing agent may be a solid or a liquid at room temperature and at atmospheric pressure; more preferably the curing agent is non-volatile at the temperatures and pressures used when processing, applying and storing the powder coating composition; more preferably the curing agent is a solid at room temperature and at atmospheric pressure.

An example of a liquid curing agent is hexanediol divinylether.

An example of a curing agent that is a resin is a methacylate functional polyacrylate.

The curing agent may be amorphous or crystalline. VFUR3 (see Examples, Table 2) is an example of an amorphous curing agent; VFUR1 and VFUR2 and URACROSS® P3307 are examples of crystalline curing agents.

The curing agent can be a mixture of curing agents as these are defined herein. For example, the curing agent can be a mixture of an amorphous with a crystalline and/or even with a liquid component.

In case in which the curing agent is amorphous, said curing agent has preferably a glass transition temperature ($T_g$) of at least 20, more preferably of at least 25, even more preferably of at least 30, most preferably of at least 40, especially of at least 45, more especially of at least 50. In case in which the curing agent is amorphous, said curing agent has preferably a glass transition temperature ($T_g$) of at most 120, more preferably of at most 110, even more preferably of at most 100, most preferably of at most 90, especially of at most 80, more especially of at most 75, most especially of at most 70, for example of at most 65, for example of at most 60° C.

In case the curing agent is crystalline then it has preferably a melting enthalpy ($\Delta H_m$) of at least 35, more preferably of at least 38, even more preferably of at least 40, most preferably of at least 50, especially of at least 60 J/g. In case the curing agent is crystalline then it has preferably a melting enthalpy ($\Delta H_m$) of at most 400, more preferably of at most 300, even more preferably of at most 260, most preferably of at most 240, especially of at most 220, more especially of at most 210, most especially of at most 200, for example of at most 180, for example of at most 170 J/g.

The curing agent has an $M_n$ ranging from at least 100 to at most 20,000 Da. Preferably a curing agent has a $M_n$ of at least 200, more preferably of at least 205, even more preferably of at least 210, most preferably of at least 215, especially of at least 220, more especially of at least 250, most especially of at least 300, for example of at least 310, for example of at least 315, for example of at least 350, for example of at least 400, for example of at least 450, for example of at least 500, for example of at least 600, for example of at least 700, for example of at least 800. Preferably, a curing agent has a $M_n$ of at most 20000, more preferably of at most 10000, even more preferably of at most 9000, most preferably of at most 8000, especially of at most 7000, more especially of at most 6000, most especially of at most 5000, for example of at most 4000, for example of at most 3500, for example of at most 3000, for example of at most 2500, for example of at most 2200 Da, for example of at most 2180, for example of at most 2000, for example of at most 1800, for example of at most 1600, for example of at most 1500, for example of at most 1300, for example of at most 1200 Da.

Preferably, the theoretical WPU of the curing agent is at least 80, more preferably at least 90, even more preferably at least 100, most preferably at least 120, especially at least 140, more especially at least 150, most especially at least 155, for example at least 157, for example at least 170, for example at least 190, for example at least 200 g/mol. Preferably the theoretical WPU of the curing agent is at most 2000, more preferably at most 1500, even more preferably at most 1200, most preferably at most 1100, especially at most 1000, more especially at most 900, most especially at most 800, for example at most 700, for example at most 680, for example at most 650, for example at most 630, for example at most 600, for example at most 500, for example at most 400 for example at most 350 g/mol.

Preferably, the WPU of the curing agent is at least 80, more preferably at least 100, even more preferably at least 120, most preferably at least 140, especially at least 150, more especially at least 155, most especially at least 157, for example at least 170, for example at least 190, for example at least 200 g/mol. Preferably the WPU of the curing agent is at most 2000, more preferably at most 1500, even more preferably at most 1200, most preferably at most 1100, especially at most 1000, more especially at most 900, most especially at most 800, for example at most 700, for example at most 680, for example at most 650, for example at most 630, for example at most 600, for example at most 500, for example at most 400 for example at most 350 g/mol.

In case in which the curing agent is amorphous, said curing agent has preferably a viscosity of at least 1, more preferably of at least 5, even more preferably of at least 10, most preferably of at least 15 Pa·s. In case in which the curing agent is amorphous, said curing agent has preferably a viscosity of at most 400, more preferably of at most 300, even more preferably of at most 200, most preferably of at most 150, especially of at most 100, more especially of at most 80, most especially of at most 50 Pa·s. In case in which the curing agent is amorphous, said curing agent has preferably a viscosity in the range of from 1 to 30 Pa·s.

In case in which the curing agent is crystalline, said curing agent has preferably a viscosity of at least 0.0001, more preferably at least 0.001, even more preferably at least 0.005, most preferably at least 0.008, especially at least 0.009, more especially at least 0.01 Pa·s. In case in which the curing agent is crystalline, said curing agent has preferably a viscosity of at most 30, more preferably at most 25, even more preferably at most 20, most preferably at most 15, especially at most 10, more especially at most 8, most especially at most 6, for example at most 5, for example at most 4, for example at most 3, for example at most 2 Pa·s. In case in which the curing agent is crystalline, said curing agent has preferably a viscosity in the range of from 0.1 to 30 Pa·s, more preferably, in the range of from 0.01 to 2 Pa·s.

Preferably, the amount of curing agent is at least 4, more preferably at least 4.5, even more preferably at least 6, most preferably at least 7, especially at least 10, more especially at least 15, even more especially at least 16, most especially at least 17.5, for example at least 19, for example at least 20, for example at least 30 wt % based on the total amount of UR and curing agent. Preferably the amount of curing agent is at most 85, more preferably at most 70, even more preferably at most 65, most preferably at most 60, especially at most 55, more especially at most 50, even more especially at most 45, for example at most 40 wt % based on the total amount of UR and curing agent.

Preferably, the molar ratio of the unsaturations in the curing agent and the ethylenic unsaturations in the UR, herein mentioned as K (=mol of the unsaturations in the curing agent/mol of the ethylenic unsaturations in the UR) may be at most 9, preferably at most 8, more preferably at most 7, even more preferably at most 6, most preferably at most 5, especially at most 4, more especially at most 3, even more especially at most 2, most especially at most 1.5, for example at most 1.4, for example at most 1.3, for example at most 1.2, for example at most 1.15, for example at most 1.10, for example at most 1.05 for example at most 1.02, for example at most 1. Preferably, the molar ratio of the unsaturations in the curing agent and the ethylenic unsaturations in the UR, herein mentioned as K (=mol of the unsaturations in the curing agent/mol of the ethylenic unsaturations in the UR) may be at least 0.1, preferably at least 0.2, more preferably at least 0.3, even more preferably at least 0.4, most preferably at least 0.5, especially at least 0.695, more especially at least 0.7, even more especially at least 0.8, most especially at least 0.9, for example at least 0.95. Preferably, K is equal to 1.

Preferably, the curing agent is chosen from the group consisting of vinyl functionalized urethane resins, vinylesters, vinylethers, acrylates, methacrylates, vinyl amides, alkyne ethers, alkyne esters, alkyne amides, alkyne amines, propargyl ethers, propargyl esters, itaconates, enamines, thiols, allyls and mixtures thereof; more preferably the curing agent is chosen from the group consisting of vinyl functionalized urethane resins, vinylesters, vinylethers, acrylates, methacrylates, vinyl amides, alkyne ethers, alkyne esters, alkyne amides, alkyne amines, propargyl ethers, propargyl esters, itaconates, enamines, allyls and mixtures thereof; even more preferably the curing agent is chosen from the group consisting of vinyl functionalized urethane resins, vinylesters, vinylethers, allyls; most preferably the curing agent is a vinyl functionalized urethane resin.

Exemplary vinyl ethers include but are not limited to mono (alcohol) functionalized vinyl ethers, for example 6-hydroxyhexyl vinyl ether, 4-hydroxybutyl vinyl ether, 2-hydroxyethyl vinyl ether, hydroxybutyl vinyl ether, hydroxyethyl vinyl ether, diethylene glycol monovinyl ether or 4-(hydroxyl methyl) cyclohexyl methyl vinyl ether (1,4-cyclohexanedimethanol vinyl ether); vinyl ether polyester resins that can be prepared via transesterification of hydroxyl functional polyester resins with hydroxyl functional vinyl ethers.

Exemplary vinyl esters include but are not limited to hydroxyl vinyl esters and to those prepared by any of the methods well known to those of ordinary skill in the art. The hydroxyl vinyl esters are usually prepared by the reaction of acetaldehyde with acid chlorides in the presence of tertiary amines; methods for the preparation of hydroxyl vinyl esters are known in the art.

VFUR are particularly useful as curing agents in the thermosetting powder coating compositions of the invention. Preferably, the curing agent is a VFUR selected from the group consisting of vinyl ether functionalized urethane resin (VEFUR), vinyl ester functionalized urethane resin (VESFUR) and mixtures thereof; more preferably the VFUR is a vinyl ether functionalized urethane resin (VEFUR).

In case the VFUR is crystalline, then the VFUR has preferably a melting enthalpy ($\Delta H_m$) of at least 35, more preferably of at least 38, even more preferably of at least 40, most preferably of at least 50, especially of at least 60 J/g. In case the VFUR is crystalline then the VFUR has preferably a melting enthalpy ($\Delta H_m$) of at most 400, more preferably of at most 300, even more preferably of at most 260, most preferably of at most 240, especially of at most 220, more especially of at most 210, most especially of at most 200, for example of at most 180, for example of at most 160, for example of at most 140, for example of at most 130 J/g.

Preferably, the VFUR has an $M_n$ ranging from at least 100 to at most 20,000 Da. Preferably the VFUR has a $M_n$ of at least 120, more preferably of at least 140, even more preferably of at least 145, most preferably of at least 160, especially of at least 180, more especially of at least 200, most especially of at least 205, for example of at least 210, for example of at least 215, for example of at least 220, for example of at least 250, for example of at least 300, for example of at least 310, for example of at least 315, for example of at least 350, for example of at least 400, for example of at least 400. for example of at least 400, for example of at least 400. for example of at least 450, for example of at least 500 for example of at least 550, for example of at least 600, for example of at least 650, for example of at least 700, for example of at least 750, for example of at least 800. Preferably, the VFUR has a $M_n$ of at most 20000, more preferably of at most 10000, even more preferably of at most 9000, most preferably of at most 8000, especially of at most 7000, more especially of at most 6000, most especially of at most 5000, for example of at most 4000, for example of at most 3500, for example of at most 3000, for example of at most 2500, for example of at most 2200 Da, for example of at most 2180 Da.

Preferably, the theoretical WPU of the VFUR is at least 80, more preferably at least 100, even more preferably at least 120, most preferably at least 140, especially at least 150, more especially at least 155, most especially at least 157, for example at least 170, for example at least 190, for example at least 200 g/mol.

Preferably the theoretical WPU of the VFUR is at most 2000, more preferably at most 1500, even more preferably at most 1200, most preferably at most 1100, especially at most 1000, more especially at most 900, most especially at most 800, for example at most 700, for example at most 680, for example at most 650, for example at most 630, for example at most 600, for example at most 500, for example at most 400 for example at most 350 g/mol.

Preferably, the WPU of the VFUR is at least 80, more preferably at least 100, even more preferably at least 120, most preferably at least 140, especially at least 150, more especially at least 155, most especially at least 157, for example at least 170, for example at least 190, for example at least 200 g/mol. Preferably the WPU of the VFUR is at most 2000, more preferably at most 1500, even more preferably at most 1200, most preferably at most 1100, especially at most 1000, more especially at most 900, most especially at most 800, for example at most 700, for example at most 680, for example at most 650, for example at most 630, for example at most 600, for example at most 500, for example at most 400 for example at most 350 g/mol.

Preferably the viscosity of the VFUR is at least 0.0001, more preferably at least 0.001, even more preferably at least 0.005, most preferably at least 0.008, especially at least 0.009, more especially at least 0.01 Pa·s. Preferably the viscosity of the VFUR is at most 30, more preferably at most 25, even more preferably at most 20, most preferably at most 15, especially at most 10, more especially at most 8, most especially at most 6, for example at most 5, for example at most 4, for example at most 3, for example at most 2 Pa·s. Preferably, the viscosity of the VFUR ranges from 0.1 to 30 Pa·s. Most preferably, the viscosity of the VFUR ranges from 0.01 to 2 Pa·s.

Preferably, the VFUR of the invention has a $T_g$ of at least −200, more preferably of at least −180, even more preferably of at least −150, most preferably of at least −125, especially of at least −100, more especially of at least −80, even more especially of at least −70, most especially of at least −50, for example of at least −40, for example of at least −35, for example of at least −20, for example of at least 0, for example of at least 10, for example of at least 20, for example of at least 30, for example of at least 35° C. Preferably, the VFUR of the invention has a $T_g$ of at most 100, more preferably of at most 90, even more preferably of at most 80, most preferably of at most 60, especially of at most 50, more especially of at most 40, most especially of at most 30, for example of at most 20, for example of at most 10, for example of at most 0, for example of at most −10, for example of at most −20, for example of at most −30° C.

Preferably the VFUR of the invention has a melting temperature ($T_m$) of at least 30, more preferably of at least 40° C. Preferably, the VFUR of the invention has a $T_m$ of at most 200, more preferably of at most 180, even more preferably of at most 160, most preferably of at most 140, especially of at most 120, more especially of at most 110, most especially of at most 100° C.

Preferably the VFUR of the invention has a crystallization temperature ($T_c$) of at least 30, more preferably of at least 40° C. Preferably, the VFUR of the invention has a $T_m$ of at most 200, more preferably of at most 180, even more preferably of at most 160, most preferably of at most 140, especially of at most 120, more especially of at most 100, most especially of at most 90° C.

In the composition of the invention, the amount of VFUR is preferably at least 4, more preferably at least 4.5, even more preferably at least 6, most preferably at least 7, especially at least 10, more especially at least 15, even more especially at least 16, most especially at least 17.5, for example at least 19, for example at least 20, for example at least 30 wt % based on the total amount of UR and curing agent. Preferably the amount of VFUR is at most 85, more preferably at most 70, even more preferably at most 65, most preferably at most 60, especially at most 55, more especially at most 50, even more especially at most 45, for example at most 40 wt % based on the total amount of UR and curing agent.

Preferably, the molar ratio of the unsaturations in the VFUR such as a VEFUR, VESFUR and the ethylenic unsaturations in the UR, herein mentioned as $K_1$ (=mol of the unsaturations in the VFUR/mol of the ethylenic unsaturations in the UR) may be at most 9, preferably at most 8, more preferably at most 7, even more preferably at most 6, most preferably at most 5, especially at most 4, more especially at most 3, even more especially at most 2, most especially at most 1.5, for example at most 1.4, for example at most 1.3, for example at most 1.2, for example at most 1.15, for example at most 1.10, for example at most 1.05 for example at most 1.02, for example at most 1. Preferably, the molar ratio of the unsaturations in the VFUR such as a VEFUR, VESFUR and the ethylenic unsaturations in the UR, herein mentioned as $K_1$ (=mol of the unsaturations in the VFUR/mol of the ethylenic unsaturations in the UR) may be at least 0.1, preferably at least 0.2, more preferably at least 0.3, even more preferably at least 0.4, most preferably at least 0.5, especially at least 0.695, more especially at least 0.7, even more especially at least 0.8, most especially at least 0.9, for example at least 0.95. Preferably, $K_1$ is equal to 1.

In case, the curing agent is a VFUR such as a VEFUR, VESFUR, or a vinylester or a vinylether or mixtures thereof, the acid value of the polyester comprising di-acid ethylenic unsaturations is preferably less than 5 mg KOH per g polyester, more preferably less than 2 mg KOH per g polyester. In case the curing agent in the composition of the invention is different from a VFUR such as a VEFUR, VESFUR or a vinylester or a vinylether or mixtures thereof, then the polyester comprising di-acid ethylenic unsaturations may have an acid value as described herein. These preferred combinations of features may result in a powder coating having a better adhesion, especially to metal substrates.

The TPCC of the present invention comprising a first thermal radical initiator as defined herein and a crystalline unsaturated resin comprising ethylenic unsaturations may have enhanced PSS upon storage at 30° C. for 7 weeks when compared to the PSS of a comparable TPCC comprising BPO instead of MBPO as a first thermal radical initiator (PSS is assessed as disclosed in the Examples taking into account that the storage temperature is 30° C.).

The TPCC of the present invention comprising a first thermal radical initiator as defined herein and an unsaturated resin comprising ethylenic unsaturations and a curing agent wherein either
- a) the unsaturated resin comprising ethylenic unsaturations; or
- b) the curing agent; or
- c) both the unsaturated resin comprising ethylenic unsaturations and the curing agent, is/are crystalline, may have enhanced PSS upon storage at 30° C. for 7 weeks when compared to the PSS of a comparable TPCC comprising BPO instead of MBPO as a first thermal radical initiator (PSS is assessed as disclosed in the Examples taking into account that the storage temperature is 30° C.).

Other Components of the Thermosetting Powder Coating Compositions of the Invention The thermosetting powder coating composition of the invention may optionally further comprise waxes, pigments, fillers, degassing agents, flow (smoothness) agents, appearance enhancing agents, photoinitiators, stabilizers such as light stabilizers. It should be noted that none of these usual additives are considered to be transition metal compounds. The pigments may be inorganic or organic. Suitable inorganic pigments include for example, titanium dioxide, zinc sulphide, zinc phosphate, mica, iron oxide and/or chromium oxide. Suitable organic pigments include for example azo compounds. Suitable fillers include for example metal oxides, silicates, carbonates and sulphates. Suitable stabilizers include for example primary and/or secondary anti-oxidants and UV stabilizers for example quinones, (sterically hindered) phenolic compounds, phosphonites, phosphites, thioethers and HALS (hindered amine light stabilizers). Examples of suitable degassing agents include cyclohexane dimethanol bisbenzoate, benzoin and benzoin derivatives such as for example those described in WO02/50194, the relevant passages of which are incorporated herein by reference. Examples of flow agents include Byk® 361 N and Resiflow® PV-5.

Photoinitiators that may be incorporated in the TPCC of the invention are well known in the art. Suitable photoinitiators can be acyl phosphines such as 2,4,6-trimethylbenzoyl diphenyl phosphine oxide or they may have ketone functionalities and can be aromatic such as for example benzophenone. Examples of suitable photoinitiators, which are known as alpha-cleavage free radical photoinitiators, include benzoin and its derivatives, for example, benzoin ethers, such as isobutyl benzoin ether and benzyl ketals, such as benzyl dimethyl ketal, 2-hydroxy-2-methyl-1-phenylpropan-1-one and 4-(2-hydroxyethoxy)phenyl-2-hydroxy-2-propyl ketone. Others include acyl phosphines, such as 2,4,6-trimethylbenzoyl diphenylphosphine oxide. Aryl ketones can also be used, such as 1-hydroxycyclohexyl phenyl ketone, 2-benzyl-2-dimethylamino-1-(4-morpholinophenyl)-butan-1-one, 2,2-dimethoxy-2-phenylacetophenone, mixture of benzophenone and 1-hydroxycyclohexyl phenyl ketone, perfluorinated diphenyl titanocene, and 2-methyl-1-(4-(methylthiophenyl)-2-(4-morpholinyl))-1-propanone. Hydrogen abstraction type of photoinitiators can be used in combination with the above or alone such as Michler's ketone (4,4'-bisdimethylamino benzophenone), Michler's ethyl ketone (4,4'-bisdiethylamino benzophenone ethyl ketone), benzophenone, thioxanthone, anthroquinone, d,l-camphorquinone, ethyl d,l-camphorquinone, ketocoumarin, anthracene, or derivatives thereof, and the like. Cationic polymerization, especially with vinyl ether containing crosslinkers, can proceed via cationic cure using cationic photoinitiators. Major classes of ionic photoinitiators are diaryliodonium salts and copper synergists, such as diphenyl iodonium hexafluorophosphate, dibenzyl iodonium hexaflouroarsinate and copper acetate, triarylsulfonium salts, such as triphenyl sulphonium hexafluorophosphate, triphenyl sulphonium tertafluoroborate. Dialkylphenacylsulfonium salts, ferrocenium salts, such as cyclopentadienyl iron(II) hexafluorophosphate, alpha-sulfonyloxy ketone, and silyl benzyl ethers can be used as well. Preferably, the photoinitiators used herein are solids. If liquid initiators are used, however, preferably they are absorbed on solid carriers, such as fumed silica, prior to incorporation in the TPCC of the invention. In general, the amount of photoinitiator used in the TPCC of the invention ranges from 0.1 to 10, preferably from 1 to 5 pph. Exemplary photoinitiators include but are not limited to 1-hydroxy-cyclohexyl ketone (Irgacure® 184), 2-hydroxy-2-methyl-1-phenyl-propanone (Darocur® 1173), α,α-dimethoxy-α-phenylacetophenone (Irgacure® 651), phenyl bis(2,4,6-trimethylbenzoyl) phosphineoxide, (Irgacure® 819), and diphenyl (2,4,6-trimethylbenzoyl) phosphine oxide (Darocur® TPO). It should be noted that Irgacure®, and Darocur® are trademarks of BASF. Preferably the TPPC of the invention does not comprise photoinitiators.

The thermosetting powder coating composition of the invention can be cured via heat (heat-curable thermosetting powder coating composition) and/or radiation (radiation curable thermosetting powder coating composition). Preferably, the thermosetting powder coating composition of the invention is heat-curable without being necessary to use radiation for curing. Heat curing has the advantage that it does not require the use of additional and rather expensive equipment, for instance equipment that generates UV light or accelerated electrons and in only one step involving heating of the thermosetting powder coating composition the latter is melted and cured onto a substrate. In contrast to that, a thermosetting powder coating composition that requires radiation curing, the curing of said composition requires two steps, one to melt (heating step) and one to cure (radiation cure typically induced via UV light or electron beam irradiation) the composition. Heat curing is especially desirable for coating 3D objects.

Other additives, such as additives for improving tribochargeability may also be added as well as nucleating agents may also be present in the composition of the invention in order to facilitate the crystallization of a crystalline VFUR and/or that of a crystalline UR.

Process for Making the Thermosetting Powder Coating Compositions of the Invention The thermosetting powder coating compositions of the invention may be prepared by mixing the separately weighed-out components in a premixer, heat the obtained premix, for example in a kneader, preferably in an extruder to obtain an extrudate, cool down the obtained extrudate until it solidifies and grind it into granules or flakes that are further ground to reduce the particle size followed by appropriate classification to obtain a powder coating composition of the right particle size.

Alternatively, the thermosetting powder coating compositions of the invention may be prepared by mixing the separately weighed-out curing agent with the UR in a premixer, heat the obtained premix, for example in a kneader, preferably in an extruder to obtain an extrudate, cool down the obtained extrudate until it solidifies and grind it into granules or flakes that are further ground to reduce the particle size. Subsequently, mixing the rest of the separately weighed-out components and the extrudate of curing agent with the UR, in a premixer, heat the obtained premix, for example in a kneader, preferably in an extruder to obtain an extrudate, cool down the obtained extrudate until it solidifies and grind it into granules or flakes that are further ground to reduce the particle size followed by appropriate classification to obtain a powder coating composition of the right particle size.

Preferably, the thermosetting powder coating composition of the invention is prepared by a process comprising the steps of:
 a. mixing the components of the thermosetting powder coating composition according to the invention to obtain a premix;
 b. heating the premix, preferably in an extruder, to obtain an extrudate;
 c. cooling down the extrudate to obtain a solidified extrudate; and
 d. grinding the solidified extrudate into smaller particles to obtain the thermosetting powder coating composition.

Preferably, the premix is heated to a temperature at least 5° C., more preferably at least 10° C. below the temperature at which it is intended to cure the powder coating composition. If the premix is heated in an extruder, it is preferred to use a temperature control in order to avoid too high temperatures that could lead to curing of the composition of the invention in the extruder.

Preferably, the thermosetting powder coating composition of the invention is prepared by a process comprising the steps of:
 a. mixing the curing agent with the UR to obtain a premix 1;
 b. heating the premix 1, preferably in an extruder, to obtain an extrudate of curing agent with the UR, namely extrudate 1;
 c. cooling down the extrudate 1 to obtain a solidified extrudate 1; and
 d. grinding the solidified extrudate 1 into smaller particles to obtain a mixture of curing agent with the UR, namely mixture 1; and
 e. mixing the rest of the components of the thermosetting powder coating composition of the invention with the mixture 1, to obtain a premix 2;
 f. heating the premix 2, preferably in an extruder, to obtain an extrudate 2;
 g. cooling down the extrudate 2 to obtain a solidified extrudate 2; and
 h. grinding the solidified extrudate 2 into smaller particles to obtain the thermosetting powder coating composition.

Preferably, the premix 1 and/or 2 is/are heated to a temperature at least 5, more preferably at least 10° C. below the temperature at which it is intended to cure the thermosetting powder coating composition. If the premix 1 and/or 2 is/are heated in an extruder, it is preferred to use a temperature control in order to avoid too high temperatures that could lead to curing of the thermosetting powder coating composition of the invention in the extruder.

The thermosetting powder coating composition of the invention may be a one component (1K) system, but may also be a two component (2K) system. Preferably, the composition of the invention is one component (1K) system. With a 'one component system', also called a 1K system, is meant that all (reactive) components of the thermosetting powder coating composition form part of one powder. In a two component system, also called 2K system, a thermosetting powder coating composition is composed of at least two different powders with different chemical compositions, which keeps the reactive components physically separated. The at least two different powders may be mixed in a physical blend before the composition of the invention is put in a storage container or may be mixed just before applying the 2K system to a substrate to let a curing reaction take place. The compositions of the at least two different powders in the 2K system are usually selected such that each powder contains a component which is needed for curing but is absent from the other powder(s). This separation allows preparation of the individual powder composition in a heated state (such as by melt mixing) without the initiation of the cure reaction.

Processes for Coating an Article with the Thermosetting Powder Coating Composition of the Invention In another aspect, the invention relates to a process for coating a substrate comprising the steps of:
 a. applying the thermosetting powder coating composition of the invention to an article as said article is defined herein;
 b. heating and/or radiating the thermosetting powder coating composition for enough time (curing time) and at a suitable temperature to cure (curing temperature) the thermosetting powder coating composition to obtain the coated article.

The composition of the invention may be applied using the techniques known to the person skilled in the art, for example using electrostatic spray or electrostatic fluidized bed or flame spray.

Heating of the coated substrate may be done using conventional methods, such as with an infrared (IR) oven, convection oven and/or with an (N)IR lamp. Even microwave equipment may be used to heat the substrate.

The temperature, at which the thermosetting powder coating compositions of the invention are cured, is preferably in the range of 80 to 225° C., more preferably in the range 80 to 150° C., even more preferably from 80 to 140° C., most preferably from 80 to 130° C., especially from 90 to 130° C., more especially from 100 to 130° C. Preferably, the temperature at which the thermosetting powder coating compositions of the invention are cured, is preferably at most 160, more preferably at most 150, even more preferably at most 140, most preferably at most 130, most preferably at most 120, especially at most 110, more especially at most 100° C. Preferably, the temperature at which the thermosetting powder coating compositions of the invention are cured, is preferably at least 60, more preferably at least 70, even more preferably at least 75, most preferably at least 80, most preferably at least 85, especially at least 90, more especially at least 100° C.

The curing time of the thermosetting powder coating compositions of the invention is at most 60 minutes, more preferably is at most 45 minutes, even more preferably is at most 30 minutes, most preferably is at most 20 minutes, especially is at most 10 minutes, more especially is at most 5 minutes.

Preferably the thermosetting powder coating compositions of the invention are heat-cured at a temperature in the range of 80-150° C. for a time in the range of 5-30 minutes.

Other Aspects and Embodiments of the Invention

In another aspect the invention provides for a process for making a cured thermosetting powder coating composition comprising the step of curing the thermosetting powder coating composition of the invention.

In another aspect, the invention provides for a cured thermosetting powder coating composition derived upon curing of the thermosetting powder coating composition of the invention; preferably the cured thermosetting powder coating composition is obtainable by the process for making the cured thermosetting powder coating composition. For example, the cured thermosetting powder coating composition may be derived or is obtainable by a 3D-printing process.

In another aspect, the invention relates to an article of any shape, size or form, for example a substrate, having coated and cured thereon a thermosetting powder coating composition as defined herein. Preferably, said article is selected from the group consisting of heat-sensitive articles and non-heat sensitive articles; more preferably said article is selected from the group consisting of wood for example low density fibre board, medium density fibreboard and high density fibreboard, plastic, thermoplastic composite, thermoset composite, fibre reinforced composites, sandwich materials e.g. sandwich materials comprising heat sensitive foam core, metal and combinations thereof.

Heat-sensitive articles for example heat-sensitive substrates, include plastic articles, wood articles for example solid wood, such as for example: hard wood, soft wood, plywood; veneer, particle board, low density fibre board, medium density fibreboard and high density fibreboard, OSB (Oriented Strand Board) wood laminates, chipboard and other articles in which wood is an important constituent, such as for example foil covered wooden articles, engineered wood, plastic modified wood, plastic articles or wood plastic compounds (WPC); articles with cellulosic fibres, for example cardboard or paper articles; textile and leather articles. Examples of plastic articles include unsaturated polyester resinbased compositions, ABS (acrylonitril butadiene styrene), melamine-formaldehyde resins, polycarbonate, polyethylene, polypropylene, ethylene-propylene-diene monomer (EPDM), thermoplastic olefin (TPO), polyurethane (PU), polypropylene oxide (PPO), polyethylene oxide (PEO), polyethyleneterephthalate and nylon, for example polyamide 6,6 and mixtures thereof, for example polycarbonate-ABS. Other heat-sensitive articles include objects that are a combination of a non-heat-sensitive part such as metal parts with a heat-sensitive part, such as any one of the aforementioned for example plastic hosing with heavy metal parts, strips for example aluminium frames with heat strips etc.

Specific wood coating markets where the thermosetting powder coating compositions of the invention may be used include domestic furniture, such as tables, chairs, cabinets, etc., bedroom and bathroom furniture, office furniture, contract furniture such as school and child furniture, hospital furniture, restaurant and hotel furniture, kitchen cabinets and furniture, (flat) panels for interior design, interior and exterior windows and doors, interior and exterior window frames and door frames, exterior and interior sidings and wooden flooring.

Specific plastic coating markets where thermosetting powder coating compositions of the invention may be used include automotive applications, such as interior car parts, wheel covers, bumpers, under the hood parts etc., flexible flooring, sporting goods, cosmetics, audio-visual applications, such as TV sets, computer housing, phones, etc., household appliances and satellite dishes.

Typical examples of non-heat-sensitive articles include glass, ceramic, composite, fibre cement board, or metal, for example aluminum, copper or steel articles, for instance carbon steel, where the main alloying constituent is carbon. Carbon steel usually contains carbon 0.2 and 1.5% w/w based on the total alloy composition and often contains other constituents such as manganese, chromium, nickel, molybdenum, copper, tungsten, cobalt, or silicon, depending on the desired steel properties. Steel has properties similar to iron if the amount of carbon is not too high, for example not more than 1.5% w/w based on the total alloy composition. The steel may be surface treated (treatment with zinc, or zinc phosphate or iron phosphate etc.) or non-surface treated.

In another aspect, the invention relates to a powder coating derived upon partial or full cure of the thermosetting powder coating composition of the invention. The powder coating can be a primer, top coat or an intermediate coating.

In another aspect, the invention relates to the use of any one of the compositions according to the invention to fully or partially coat an article.

In another embodiment the invention relates to the use of any one of the compositions of the invention to coat a heat-sensitive article preferably wood for example low density fibre board, medium density fibreboard and high density fibreboard, plastic, etc., or combinations thereof.

In another aspect, the invention relates to an article that is fully or partially coated with any one of the compositions of the invention.

In one embodiment of the invention the substrate is a non-heat-sensitive substrate, for example glass, ceramic, fibre cement board, or metal, for example aluminum, copper or steel, preferably metal.

In yet another embodiment, the invention provides for a use of the composition of the invention to coat a heat-sensitive article as defined herein and/or a non-heat-sensitive article as defined herein.

In yet another embodiment, the invention provides for a use of the thermosetting powder coating compositions of the invention to coat an article wherein the article is a heat-sensitive article for example wood such as low density fibre board, medium density fibreboard and high density fibreboard, plastic and combinations thereof.

In yet another embodiment, the invention provides for a use of the thermosetting powder coating compositions of the invention to coat an article wherein the article is a non-heat-sensitive article for example glass, ceramic, composite, fibre cement board, or metal, for example aluminum, copper or steel articles, for instance carbon steel.

In yet another embodiment, the invention provides for a use of the thermosetting powder coating compositions of the invention to coat an article wherein the article is a heat-sensitive article for example wood such as low density fibre board, medium density fibreboard and high density fibreboard, plastic and combinations thereof and also to coat an article wherein the article is a non-heat-sensitive article for example glass, ceramic, composite, fibre cement board, or metal, for example aluminum, copper or steel articles, for instance carbon steel.

In another aspect of the invention there is provided a use of:
   a thermosetting powder coating composition of the invention; or
   a cured thermosetting powder coating composition (or equally a form of any shape or size, said form comprising the cured thermosetting powder coating composition); or
   an article as defined herein;
   in powder coatings, powder coatings for heat-sensitive articles, powder coatings for non-heat-sensitive articles, 3D-printing, automotive applications (car parts, agricultural machines, composite structures, ceramic structures, etc.), marine applications (ships, boats), aerospace applications (planes, helicopters, composite structures, ceramic structures, etc.), medical applications (artificial joints, meshes, woven or nonwoven sheets, tapes, ribbons, bands, cables, tube-like products for e.g. ligament replacement, composite structures, ceramic structures, etc.), defense applications (ballistic protection, body armor, ballistic vests, ballistic helmets, ballistic vehicle protection, composite structures, ceramic structures, etc.), sports/recreational applications (fencing, skates, skateboarding, snowboarding, suspension lines on sport parachutes, paragliders, kites, kite lines for kite sports, climbing equipment, composite structures, ceramic structures, etc.), architectural applications (windows, doors, (pseudo-) walls, cables, etc.), bottling applications, household applications (household appliances, whitegoods, furniture, computer housings, etc.), machinery applications (can and bottle handling machine parts, moving parts on weaving machines, bearings, gears, composite structures, ceramic structures, computer housings, etc.), can applications, coil applications, energy applications for e.g. generators for wind, tide or solar energy, textile applications for e.g. fabrics, this can be very broad from impregnation technical textiles to for example complete composites both as coating and as a binder for composites, and electrical applications for e.g. cabinets for electrical wire or switch boards.

In another aspect the invention further relates to the use of MBPO for thermosetting powder coating compositions (TPCC).

Preferably, in respect to the use of MBPO for thermosetting powder coating compositions (TPCC), said MBPO is used to render said TPCC less susceptible to surface air inhibition (see definition for "less susceptible to surface air inhibition").

Preferably, in respect to the use of MBPO for thermosetting powder coating compositions (TPCC), said MBPO is used to enhance the physical storage stability of said TPCC (see definition for "enhanced physical storage stability").

Preferably, in respect to the use of MBPO for thermosetting powder coating compositions (TPCC), said MBPO is used to enhance the reactivity of said TPCC (see definition for "enhanced reactivity").

Preferably, in respect to the use of MBPO for thermosetting powder coating compositions (TPCC), said MBPO is used to:
i) render said TPCC less susceptible to surface air inhibition (see definition for "less susceptible to surface air inhibition"); and/or
ii) enhance the physical storage stability of said TPCC (see definition for "enhanced physical storage stability") and/or
iii) enhance the reactivity of said TPCC (see definition for "enhanced reactivity").

Preferably, in respect to the use of MBPO for thermosetting powder coating compositions (TPCC), said TPPC are heat- and/or radiation curable.

Preferably, in respect to the use of MBPO for thermosetting powder coating compositions (TPCC), said TPCC are heat curable at low temperature, more preferably said low temperature is at least 80 and at most 130° C.

Preferably, in respect to the use of MBPO for thermosetting powder coating compositions (TPCC), said TPCC is heat-curable on heat-sensitive articles as the latter are defined herein.

Preferably, in respect to the use of MBPO for thermosetting powder coating compositions (TPCC), said TPCC is heat-curable at low temperatures on heat-sensitive articles as the latter are defined herein.

Preferably, in respect to the use of MBPO for thermosetting powder coating compositions (TPCC), said TPCC is radiation curable on heat-sensitive articles as the latter are defined herein.

Preferably, in respect to the use of MBPO for thermosetting powder coating compositions (TPCC), said TPCC is heat- and/or radiation curable on heat-sensitive articles as the latter are defined herein.

Preferably, in respect to the use of MBPO for thermosetting powder coating compositions (TPCC), said TPCC is heat- and/or radiation curable at low temperatures on heat-sensitive articles as the latter are defined herein.

Preferably, in respect to the use of MBPO for thermosetting powder coating compositions (TPCC), said TPCC comprises an unsaturated resin comprising ethylenic unsaturations; more preferably said TPCC further comprises a curing agent.

Preferably, in respect to the use of MBPO for thermosetting powder coating compositions (TPCC), said TPCC comprises an unsaturated resin comprising ethylenic unsaturations, said resin is selected from the group consisting of polyester resins, acrylic resins, polyurethanes, epoxy resins, polyamides, polyesteramides, polycarbonates, polyureas and mixtures thereof.

Preferably, in respect to the use of MBPO for thermosetting powder coating compositions (TPCC), said TPCC comprises an unsaturated resin comprising ethylenic unsaturations, wherein the ethylenic unsaturations are di-acid ethylenic unsaturations.

Preferably, in respect to the use of MBPO for thermosetting powder coating compositions (TPCC), said TPCC comprises an unsaturated resin comprising ethylenic unsaturations, wherein the ethylenic unsaturations are 2-butenedioic acid ethylenic unsaturations.

Preferably, in respect to the use of MBPO for thermosetting powder coating compositions (TPCC), said TPCC comprises an unsaturated resin comprising ethylenic unsaturations, said resin is an unsaturated polyester resin comprising ethylenic unsaturations.

Preferably, in respect to the use of MBPO for thermosetting powder coating compositions (TPCC), said TPCC comprises an unsaturated resin comprising ethylenic unsaturations, said resin is an unsaturated polyester resin comprising di-acid ethylenic unsaturations.

Preferably, in respect to the use of MBPO for thermosetting powder coating compositions (TPCC), said TPCC comprises an unsaturated resin comprising ethylenic unsaturations, said resin is an unsaturated polyester resin comprising 2-butenedioic acid ethylenic unsaturations.

Preferably, in respect to the use of MBPO for thermosetting powder coating compositions (TPCC), said MBPO is selected from the group consisting of bis-(2-methylbenzoyl)-peroxide, bis-(3-methylbenzoyl)-peroxide, bis-(4-methylbenzoyl)-peroxide, (2-methylbenzoyl, 3-methylbenzoyl)-peroxide, (2-methylbenzoyl, 4-methylbenzoyl)-peroxide, (3-methylbenzoyl, 4-methylbenzoyl)-peroxide and mixtures thereof.

Preferably, in respect to the use of MBPO for thermosetting powder coating compositions (TPCC), said MBPO is bis-(4-methylbenzoyl)-peroxide. All preferred elements and embodiments presented herein for the use of MBPO for thermosetting powder coating compositions (TPCC) may be combined.

In another aspect of the invention there is provided a method (herein mentioned as "method X") for
i) rendering a thermosetting powder coating composition less susceptible to surface air inhibition (see definition for "less susceptible to surface air inhibition"); and/or
ii) enhancing the physical storage stability of a thermosetting powder coating composition (see definition for "enhanced physical storage stability") and/or
iii) enhancing the reactivity of a thermosetting powder coating composition (see definition for "enhanced reactivity"), comprising the step of mixing into the thermosetting powder coating composition MBPO.

Preferably, in respect to the method X, the thermosetting powder coating composition is a TPCC according to the invention.

All preferred elements and embodiments presented herein for the use of MBPO for thermosetting powder coating compositions (TPCC) may be combined with/applied for the method X.

Yet, another aspect of the invention is a thermosetting powder coating composition chosen from the group of thermosetting powder coating compositions according to InvPCC1-5.

Yet, another aspect of the invention is a powder coating chosen from the group of powder coatings according to InvPC1-5.

Many other variations and embodiments of the invention will be apparent to those skilled in the art and such variations are contemplated within the broad scope of the present invention.

All embodiments disclosed herein may be combined with each other and/or with preferred elements of the invention.

Further aspects of the invention and preferred features thereof are given in the claims herein.

The invention will now be described in detail with reference to the following non limiting examples which are by way of illustration only.

EXAMPLES

The invention is explained in more detail with reference to the following non-limiting examples.

In the Examples section, the abbreviation UR represents unsaturated resin comprising ethylenic unsaturations, the abbreviation VFUR represents vinyl functionalized urethane resins used as curing agents, the abbreviation PCC represents thermosetting powder coating composition and the abbreviation PC represents powder coating.

In all the examples the unsaturated resins comprising ethylenic unsaturations (UR) were unsaturated polyester resins comprising 2-butenedioic acid ethylenic unsaturations.

In all the examples the vinyl functionalized urethane resins (VFUR) used as curing agent were vinyl ether functionalized urethane resins (VEFUR).

All powder coating compositions presented in the Examples were thermosetting powder coating compositions (TPCC).

In the Examples section the abbreviation "Comp" denotes a Comparative Example of either a thermosetting powder coating composition e.g. CompPCC1, or a powder coating e.g. CompPC1.

In the Examples section the abbreviation "Inv" denotes an Inventive Example of a thermosetting powder coating composition e.g. InvPCC1, or a powder coating e.g. InvPC1.

In the Examples the abbreviation "n.m." denotes "not measured".

In the Examples the abbreviation "n.a." denotes "not applicable".

In the Examples the abbreviation "n.r." denotes not recorded with the method applied.

Analytical Methods and Techniques for the Measurement of the Properties of the Unsaturated Polyester Resins Comprising Ethylenic Unsaturations and the Vinyl Functionalized Urethane Resins Used as Curing Agents in the Thermosetting Powder Coating Compositions Unless otherwise stated the theoretical number average molecular weight ($M_n$) is defined as follows:

$$M_n = (\Sigma_i N_i M_i)/(\Sigma_i N_i)$$

where $N_i$ is the number of molecules of molecular weight $M_i$.

In the case of the UR, the $M_n$ was calculated by multiplying the theoretical (targeted) functionality (f) with 56110 and dividing the outcome thereof by the sum of the theoretical (targeted) acid value (AV) (mg KOH/g UR) and the theoretical (targeted) hydroxyl value (OHV) (mg KOH/g UR) according to the following equation EX1a:

$$M_n = (56110 \times f)/(AV+OHV) \quad \text{(EX1a)}$$

EX1a applies analogously for the calculation of the $M_n$ of any UR as described herein when the theoretical f, theoretical AV and theoretical OHV are available. If the theoretical values of AV, OHV are not available, then the $M_n$ can be calculated according to EX1a by factoring in EX1a the measured values of AV and OHV and wherein in this case f is calculated from analytical data on the chemical composition of the UR, said analytical data being obtained from analytical techniques e.g. NMR spectroscopy, well-known to one skilled in the art.

In the case of the VFUR, the $M_n$ was calculated by the following equation EX1:

$$M_n = \frac{\sum_{i=1}^{n}(N_i * MW_i) - M_{H2O}}{N_{VFUR}} \quad \text{(EX1)}$$

whereas
$N_i$=mol of each monomer used for the preparation of the VFUR;
$MW_i$=$M_n$ (Da) of each monomer used for the preparation of the VFUR;
$M_{H2O}$=mass (g) of water formed during the preparation of the VFUR;
$N_{VFUR}$=mol of VFUR prepared from said monomers.

EX1 applies analogously for determining the $M_n$ of any curing agent as described herein, wherein $N_i$, $M_{H2O}$, $N_{VFUR}$ in EX1, would stand for: $N_i$=mol of each monomer used for the preparation of the curing agent; $MW_i$=$M_n$ (Da) of each monomer used for the preparation of the curing agent; $M_{H2O}$=mass (g) of a by-product produced during the preparation of said curing agent, for example water or alcohol e.g. methanol, ethanol, depending on the chemical composition of said curing agent;
$N_{VFUR}$=mol of curing agent prepared from said monomers.

In case $M_n$ refers to a monomer then the $M_n$ corresponds to molecular weight values calculated on the basis of the molecular formula of said monomer, as such calculation is known to one skilled in the art.

Melt viscosity (herein mentioned as viscosity, in Pa·s) measurements were carried out at 160° C. on a Brookfield CAP 2000+H Viscometer. The applied shear-rate was 70 s$^{-1}$ and a 19.05 mm spindle [cone spindle CAP-S-05 (19.05 mm, 1.8°)] was used.

The acid and hydroxyl values of the unsaturated resins comprising ethylenic unsaturations (UR) that were unsaturated polyester resins comprising 2-butenedioic acid ethylenic unsaturations, were determined titrimetrically according to ISO 2114-2000 and ISO 4629-1978; in addition the targeted (theoretical) acid and hydroxyl values of said resins were also reported herein.

$^1$H-NMR Method for the Measurement of the WPU ($^1$H-NMR Method WPU)

The WPU was measured via $^1$H-NMR spectroscopy according to the method entitled—for simplicity—"$^1$H-NMR method WPU" which is presented herein. The estimated margin of error of this method for determining the WPU is +/−2%; the margin of error was determined on the basis of measuring three samples of the same lot of a VFUR or UR.

More specifically, said WPU was measured via $^1$H-NMR spectroscopy as explained herein after and it was calculated according to the following equation EX2:

$$WPU = \left[\frac{W_{pyr}}{W_{resin}} \frac{1}{MW_{pyr}} \frac{A_{c=c}/N_{c=c}}{A_{pyr}/N_{pyr}}\right]^{-1} \quad (EX2)$$

wherein, $W_{pyr}$ is the weight of pyrazine (internal standard), $W_{resin}$ is the weight of UR such as an unsaturated polyester resin comprising 2-butenedioic acid ethylenic unsaturations, or the weight of a curing agent such as a VFUR; $W_{pyr}$ and $W_{resin}$ are expressed in the same units.

$MW_{pyr}$ is the molecular weight of the pyrazine (=80 Da) (internal standard).

$A_{pyr}$ is the peak area for methine protons attached to the aromatic ring of pyrazine and $N_{pyr}$ is the number of the methine protons of pyrazine (=4).

In case of a UR:

$A_{C=C}$ is the peak area for methine protons ( . . . —CH= . . . ) of the ethylenic unsaturations (>C=C<) of the UR; $N_{C=C}$ is the number of methine protons ( . . . —CH= . . . ) attached to the ethylenic unsaturations (>C=C<) of the UR.

In case of a VFUR:

$A_{C=C}$ is the peak area for the methine proton ( . . . —CH= . . . ) of the vinyl groups ( . . . —CH=CH$_2$) in the VFUR; $N_{C=C}$ is the number of methine protons ( . . . —CH= . . . ) of the vinyl groups ( . . . —CH=CH$_2$) in the VFUR.

The peak areas of the methine protons of pyrazine and methine protons ( . . . —CH= . . . ) of the ethylenic unsaturations (>C=C<) of the UR in EX2 were measured as follows: A sample of 75 mg of UR was diluted at 25° C. in 1 ml deuterated chloroform containing a known amount (mg) of pyrazine as internal standard for performing $^1$H-NMR spectroscopy. Subsequently, the $^1$H-NMR spectrum of the UR sample was recorded at 25° C. on a 400 MHz BRUKER NMR-spectrometer. Afterwards, the chemical shifts (ppm) of the methine protons of pyrazine and the methine protons ( . . . —CH= . . . ) of the ethylenic unsaturations (>C=C<) of the UR were identified; the chemical shifts (ppm) of the methine protons of pyrazine and the methine protons ( . . . —CH= . . . ) of the ethylenic unsaturations (>C=C<) of the UR in EX2 measured on a 400 MHz BRUKER NMR-spectrometer in methanol and deuterated chloroform were at about 8.6 and at about 6.4-6.9 ppm, respectively. Subsequently, with the help of suitable commercially available software for analyzing $^1$H-NMR spectra such as ACD/Spectrus Processor software provided by ACD/Labs, the peak areas of the methine protons of pyrazine and methine protons ( . . . —CH= . . . ) of the ethylenic unsaturations (>C=C<) of the UR of EX2 were measured and from these values the WPU was determined according to EX2.

In case in which 75 mg of a UR is not soluble at 25° C. in 1 ml of deuterated chloroform, then any other suitable solvent or mixture of solvents known to the skilled person for performing the $^1$H-NMR spectroscopy may be used; for example DMSO (dimethyl sulfoxide), pyridine, tetra-chloro ethane, and mixtures thereof. The choice of a suitable solvent or a mixture of suitable solvents depends on the solubility of the sample of the UR in said solvents. In case in which 75 mg of UR is soluble in 1 mL of deuterated chloroform at 25° C., then deuterated chloroform is the solvent of choice for performing the $^1$H-NMR spectroscopy for the UR. In case in which a different solvent or mixture of solvents is used for performing the $^1$H-NMR Method WPU, then the chemical shifts of the protons of EX2 may shift from the ones reported here for the selected solvents for the $^1$H-NMR Method WPU since the actual chemical shifts may depend on the solvent or mixture of solvents used to record the $^1$H-NMR spectrum; in such case one should identify and determine the chemical shifts of the corresponding protons and apply EX2 for the determination of WPU.

The peak areas of the methine protons of pyrazine and methine protons ( . . . —CH= . . . ) of the vinyl groups ( . . . —CH=CH$_2$) in the VFUR of EX2 were measured as follows: A sample of 75 mg of VFUR was diluted at 40° C. in a mixture of 0.200 ml methanol and 0.600 ml deuterated chloroform containing a known amount (mg) of pyrazine as internal standard for performing $^1$H-NMR spectroscopy. Subsequently, the $^1$H-NMR spectrum of the VFUR sample was recorded at 40° C. on a 400 MHz BRUKER NMR-spectrometer. Afterwards, the chemical shifts (ppm) of the methine protons of pyrazine and the methine protons ( . . . —CH= . . . ) of the vinyl groups ( . . . —CH=CH$_2$) in the VFUR were identified; the chemical shifts (ppm) of the methine protons of pyrazine and methine protons ( . . . —CH= . . . ) of the vinyl groups ( . . . —CH=CH$_2$) in the VFUR of EX2 were measured on a 400 MHz BRUKER NMR-spectrometer in methanol and deuterated chloroform were at about 8.6 and at about 6.4-6.5 ppm, respectively. Subsequently, with the help of suitable commercially available software for analyzing $^1$H-NMR spectra such as ACD/Spectrus Processor software provided by ACD/Labs, the peak areas of the methine protons of pyrazine and methine protons ( . . . —CH= . . . ) of the vinyl groups ( . . . —CH=CH$_2$) in the VFUR of EX2 were measured and from these values the WPU was determined according to EX2.

In case in which 75 mg of a VFUR are not soluble at 40° C. in a mixture of 0.200 ml methanol and 0.600 ml deuterated chloroform, then any other suitable solvent or mixture of solvents known to the skilled person for performing the $^1$H-NMR spectroscopy may be used; for example DMSO (dimethyl sulfoxide), pyridine, tetra-chloro ethane, and mixtures thereof. The choice of a suitable solvent or a mixture of suitable solvents depends on the solubility of the sample of the VFUR in said solvents. In case in which 75 mg of VFUR are soluble in a mixture of 0.200 ml methanol and 0.600 ml deuterated chloroform at 40° C., then a mixture of methanol and deuterated chloroform is the solvent of choice for performing the $^1$H-NMR spectroscopy for the VFUR.

In case in which a different solvent or mixture of solvents is used for performing the $^1$H-NMR Method WPU, then the chemical shifts of the protons of EX2 may shift from the ones reported here for the selected solvents for the $^1$H-NMR Method WPU since the actual chemical shifts may depend on the solvent or mixture of solvents used to record the $^1$H-NMR spectrum; in addition, one may perform the measurement at different temperature than the one disclosed herein, for example the measurement can be performed at higher temperature than the one disclosed herein in order to solubilize the sample intended to be analyzed for measuring its WPU according to this method and/or may use a lower amount of sample e.g. 25 mg, depending on the resolution of the NMR instrument; in such case one should identify and determine the chemical shifts of the corresponding protons and apply EX2 for the determination of WPU.

The method—as described herein—for the measurement of the WPU of the samples mentioned in the Examples, applies analogously for any UR and any curing agent, taking of course into account common general knowledge in performing and analyzing results of NMR spectroscopy, the particular chemical nature of the UR or the curing agent and the skills of one skilled in the art of NMR spectroscopy; for example, the chemical shifts may be somewhat shifted from the ones disclosed herein, and/or the temperatures used to perform the measurement different e.g. higher than the ones disclosed herein, or the amount of the sample used can be lower e.g. 25 mg, depending on the resolution of the NMR instrument; in such case one should identify and determine the chemical shifts of the corresponding protons and apply EX2 for the determination of WPU.

DSC Method for the Measurement of $T_{g\ powder}$, $T_{g,\ UR}$, $T_{g,\ VFUR}$ $T_m$, $T_c$, $\Delta H_m$, $\Delta H_c$, $\Delta H_{curing}$, $T_{peak\ curing}$, $T_{onset\ curing}$ (Mentioned as "DSC Method")

The glass transition temperature of the powder ($T_{g\ powder}$ in ° C.), glass transition temperature of the UR ($T_{g\ UR}$ in ° C.), the glass transition temperature of the VFUR ($T_{g\ VFUR}$ in ° C.), the crystallization temperature ($T_c$ in ° C.), the crystallization enthalpy ($\Delta H_c$ in J/g), the melting temperature ($T_m$ in ° C.), the melting enthalpy ($\Delta H_m$ in J/g) and the curing enthalpy ($\Delta H_{curing}$ in J/g) were measured via Differential Scanning calorimetry (DSC) on a TA instruments DSC Q2000 apparatus, in $N_2$ atmosphere calibrated with indium, within 24 hours from the time of preparation of the entity (freshly prepared entities) e.g. UR, VFUR, TPCC (powder), etc., intended to be subject to this method for the measurement of any one (those applicable) of the aforementioned parameters. The processing of the signal (DSC thermogramme, Heat Flow vs. Temperature) was carried out using Universal Analysis 2000 software version 4.5a provided by TA instruments, as described herein after:

A sample of 10±0.5 mg was weight and placed in the DSC cell. The sample was cooled down to −20° C. and the temperature was kept at −20° C. for 1 minute; upon 1 minute the sample was heated up to 200° C. at a heating rate of 5° C./minute (thermograph A) Once the sample has reached 200° C., the temperature was maintained at 200° C. for 1 minute. Subsequently, the sample was cooled down to −50° C. at a cooling rate of 5° C./minute (thermograph B); once the sample has reached −50° C., the temperature was maintained at −50° C. for 1 minute. Subsequently, the sample was heated up to 150° C. at a heating rate of 5° C./minute (thermograph C) Thermographs A, B and C were processed as the Y axis of the thermographs representing the heat flow has exotherm up and endotherm down.

Thermograph A was used for measuring the $T_{g,\ powder}$, $\Delta H_{curing}$, $T_{peak\ curing}$, $T_{onset\ curing}$.

Thermograph B was used for measuring the $T_{g\ UR}$, $T_{g\ VFUR}$, $\Delta H_m$, $T_m$.

Thermograph C was used to measure the $\Delta H_c$, $T_c$.

Each one of the $T_{g\ UR}$, $T_{g\ powder}$, $T_{g\ VFUR}$, was the midpoint temperature of the temperature range over which the glass transition took place, said midpoint temperature was the point at which the curve was intersected by a line that was equidistant between the two extrapolated baselines, as defined in § 3.2 and § 3.3 in ISO 11357-2 edition 1999-03-15 [for midpoint temperature see § 3.3.3 in ISO 11357-2; edition 1999-03-15].

The $T_m$ was measured as the temperature recorded at the minimum heat flow of the endothermic signal attributed to the melting of the sample.

The $\Delta H_m$ was measured as the integrated heat flow over the temperature range of the melting.

The $T_c$ was measured as the temperature recorded at the maximum heat flow of the exothermic signal attributed to the crystallization of the sample.

The $\Delta H_c$ was measured as the integrated heat flow over the temperature range of the crystallization.

The $\Delta H_{curing}$ was measured as the integrated heat flow during the curing reaction of the TPCC, The $T_{peak\ curing}$ was measured as the temperature recorded at the maximum heat flow of the exothermic signal (=exothermic peak) attributed to curing reactions.

The $T_{onset\ curing}$ was measured as the temperature at the intersection of:
a) the extrapolated baseline regarding the exothermic signal attributed to curing reactions, with
b) the best fitting tangent on the part of said exothermic signal contained between the $T_{peak\ curing}$ and the temperature at which an initial change in the baseline occured (=low temperature side of the exothermic peak).

The DSC method—as described herein—for the measurement of any property measured in this section that is or may be associated to the UR applies analogously for any UR.

The DSC method—as described herein—for the measurement of any property measured in this section that is or may be associated to the VFUR applies analogously for any curing agent.

The DSC method—as described herein—for the measurement of any property measured in this section that is or may be associated to the TPCC applies analogously for any TPCC.

FT-IR Method for the Measurement of the Sensitivity (S) of the TPCC to Surface Air Inhibition (FT-IR Method S)

A. Description of the Method and Definitions

The sensitivity of TPCC to surface air inhibition (abbreviated herein as S) is calculated according to the following equation E1:

$$S = R_{air}/R_{sub} \qquad \text{(equation E1)}$$

The $R_{air}$ and the $R_{sub}$ are as defined and explained in this section A.

S provides a measure of the sensitivity of a TPCC to surface air inhibition; it is calculated as shown herein and these measurements are carried out on cured films having a thickness of 80±5 μm, said cured films are powder coatings derived upon curing of TPCC (120° C. for 10 min) in air; thus, the curing conditions that are to be applied for the curing of TPCC and thus the assessment/measurement of S are: 120° C. for 10 min, in air and said assessment/measurement of S should be carried out on cured films having a thickness of 80±5 µm. The lower the S, the fewer are the remaining unsaturations present on the surface of the cured film compared to the unsaturations on the substrate side of the cured film, and as such the least sensitive is the TPCC to surface air inhibition during curing.

In order for meaningfully assess the S of TPCC, the latter needs to be comparable in terms of their composition.

The S is calculated from FT-IR measurements carried out on thermosetting powder coatings prepared according to processes disclosed in this application, parameters of said processes and compositions should be such to enable comparisons between samples. Once a powder coating is prepared on a substrate, said coating is released from the substrate on which it was cured on, affording a free standing film with two distinct sides, namely:

Surface air side ($S_{air}$): this side of the film was in contact with air during curing; and Surface substrate side ($S_{sub}$): this side of the film was in contact with the substrate, thus it had no contact with air.

Subsequently, a FT-IR spectrum of each of the two sides, $S_{air}$ and $S_{sub}$ is recorded on a Digilab Excalibur infrared spectrometer, using a Golden gate ATR accessory from Specac. FT-IR spectra are taken using a resolution of 4 cm$^{-1}$, over a range of 700 cm$^{-1}$ to 4000 cm$^{-1}$ for 64 scans; the spectra are processed via Varian Resolutions Pro software version 5.1. The FT-IR spectrum recorded for the $S_{air}$ is abbreviated as FT-IR$_{Sair}$ and the one recorded for the $S_{sub}$ is abbreviated as FT-IR$_{Ssub}$.

From the FT-IR$_{Sair}$ the following are measured:
$H_{unsat\ on\ Sair}$; and the
$H_{ref\ on\ Sair}$ The $R_{air}$ shown in equation E1 is calculated according to the following equation E2:

$$R_{air} = H_{unsat\ on\ Sair} / H_{ref\ on\ Sair} \quad \text{(equation E2)}$$

From the FT-IR$_{Ssub}$ the following are measured:
$H_{ref\ on\ Ssub}$; and the
$H_{unsat\ on\ Ssub}$.

The $R_{sub}$ shown in equation E1 is calculated according to the following equation E3:

$$R_{sub} = H_{unsat\ on\ Ssub} / H_{ref\ on\ Ssub} \quad \text{(equation E3)}$$

Feeding the values for the $R_{air}$ and $R_{sub}$ in equation E1, the S is calculated.

By "$H_{unsat\ on\ Sair}$" is meant herein the FT-IR peak height of the absorption peaks (mentioned herein for simplicity "peak" or "peaks") attributed to stretching vibration of the carbon carbon double bond of the remaining unsaturations on $S_{air}$.

By "$H_{unsat\ on\ Ssub}$" is meant herein the FT-IR peak height of the absorption peaks (mentioned herein for simplicity "peak" or "peaks") attributed to the stretching vibration of the carbon carbon double bond of the remaining unsaturations on $S_{sub}$.

By "remaining unsaturations" (for the purpose of this method) is meant herein the ethylenic unsaturations attributed to the UR and—where applicable—the unsaturations of the curing agent, being present upon curing of the TPCC; thus, the "remaining unsaturations" refer to the cured TPCC, that is the thermosetting powder coating.

In case in which, the TPCC comprises only one UR and no curing agent, then the $H_{unsat\ on\ Sair}$ or the $H_{unsat\ on\ Ssub}$ is the peak height of the peak attributed to the ethylenic unsaturations of the UR; in case in which the TPCC comprises more than one UR and no curing agent, then the $H_{unsat\ Ssair}$ or the $H_{unsat\ Ssub}$ is the sum of the peak heights of the peaks (or peak if peaks are overlapping) attributed to the ethylenic unsaturations of each UR; in case in which the TPCC comprises one or more UR and also one or more curing agents, for example a vinyl ether functionalized urethane, then the $H_{unsat\ on\ Sair}$ or the $H_{unsat\ on\ Ssub}$ is the sum of the peak height of the peaks (or peak if peaks are overlapping) attributed to the ethylenic unsaturations of each of the UR and the unsaturations of each of the curing agents.

"$R_{air}$" is as defined in this section A.
"$R_{sub}$" is as defined in this section A.

By "$H_{ref\ Saw}$" is meant herein the reference FT-IR peak height on $S_{air}$. The reference peak is chosen according to the following criteria:

a) it can be any peak recorded in the FT-IR$_{saw}$ or in the FT-IR$_{Ssub}$ that remains substantially unchanged, preferably unchanged by the cure of the TPCC and is recorded at any wavelength from 2400 up until and including 1000 cm$^{-1}$; and b) the reference peak must have an absorption that is at least equal to the $H_{unsat}$ on Saw and at most equal to ten times the $H_{unsat\ on\ Sair}$;

c) the reference peak in the FT-IR$_{Sair}$ and in the FT-IR$_{Ssub}$ must be the same.

As it was said herein above, in order for meaningfully assess the S of TPPC, the latter need to be comparable in terms of their composition; thus, the chosen reference peak according to the above mentioned criteria must also be the same for any comparison of the S, of comparable TPCC.

B. FT-IR Method S for the Thermosetting Powder Coatings CompPC1-5 and InvPC1-5

A series of thermosetting powder coatings CompPC1-5 and InvPC1-5 were prepared according to the procedure described in the Examples under "Preparation of the powder coatings CompPC1-5 and InvPC1-5". Once the powder coatings were prepared on the substrates (their corresponding TPPC were cured at 120° C. for 10 minutes in an air-circulation oven as indicated in the "Preparation of the powder coatings CompPC1-5 and InvPC1-5"; thus, the curing conditions that were applied for the curing of TPCC and thus the assessment/measurement of S were: 120° C. for 10 min in air); said coatings were released from the substrates on which they were cured on, affording free standing films. The FT-IR method S as described herein above was applied in order to calculate the S for each of the CompPC1-5 and InvPC1-5.

For the CompPCC1-3 and InvPCC1-3:
a) the $H_{unsat\ on\ Sair}$ and the $H_{unsat\ on\ Ssub}$ were each measured as a sum of the peak heights of the peaks at 1640 cm$^{-1}$ (attributed to the UR) and 1615 cm$^{-1}$ (attributed to the curing agent); and
b) the $H_{ref\ on\ Sair}$ and the $H_{ref\ on\ Ssub}$ were each measured as the peak height of the peak at 1372 cm$^{-1}$.

For the CompPCC4-5 and InvPCC4-5:
a) the $H_{unsat\ on\ Sair}$ and the $H_{unsat\ on\ Ssub}$ were each measured as a sum of the peak heights of the peaks at 1640 cm$^{-1}$ (attributed to the UR) and 1615 cm$^{-1}$ (attributed to the curing agent); and
b) the $H_{ref\ on\ Sair}$ and the $H_{ref\ on\ Ssub}$ were each measured as the peak height of the peak at 1455 cm$^{-1}$.

Once $R_{air}$ and $R_{sub}$ were calculated from equations E2 and E3 respectively, subsequently S was calculated from equation E1.

For each of the CompPC1-5 and InvPC1-5 the S values are reported in Table 3.

Method to Determine Presence of Unreacted —N═C═O Groups (Free Isocyanate Groups) (Method NCO)

An FT-IR spectrum was recorded on a Digilab Excalibur infrared spectrometer, using a Golden gate ATR accessory from Specac. FT-IR spectra were taken using a resolution of 4 cm$^{-1}$, over a range of 700 cm$^{-1}$ to 4000 cm$^{-1}$ over 64 scans and processed with Varian Resolutions pro software version 5.1. A characteristic peak for unreacted —N═C═O groups can be found around 2250 cm$^{-1}$; the presence of this peak is indicative of unreacted —N═C═O groups (free isocyanate groups).

Measurements and Assessment of Properties of the Thermosetting Powder Coating Compositions The $T_g$ of the thermosetting powder coating composition was measured after extrusion according to the DSC method mentioned herein.

The physical storage stability (PSS) of the thermosetting powder coating compositions of the present invention was tested at 23° C. for 7 weeks (for results see Table 3). Prior to assessing the PSS the thermosetting powder coating composition was left to cool down to room temperature for about 2-3 hours. The greater the extend of agglomeration or sintering the poorer the PSS, thus the lower its ranking according to the following scale. The extent of agglomeration was visually assessed and ranked according to the following rating on a 1-10 scale (1 representing the worst PSS and 10 the best PSS):

10: No change.

9: No agglomeration, very good fluidity.

8: No agglomeration, good fluidity.

7: Very low agglomeration; agglomeration can be dispersed by one light tap into a fine powder.

6: Very low agglomeration; agglomeration can be dispersed by several taps into a fine powder.

5: Low agglomeration; agglomeration can be dispersed by hand pressure into a fine powder.

4: Low agglomeration; agglomeration cannot be dispersed by hand pressure in a fine powder.

3: Severe agglomeration into several large lumps, material is pourable.

2: Severe agglomeration into several large lumps, material is not pourable.

1: product sintered to one lump, volume reduced.

In addition, the PSS of CompPCC2-5 and InvPCC2-5 was also tested at 30° C. for 7 weeks according to the above method; the PSS of any one of CompPCC2-5 upon storage at 30° C. for 7 weeks was equal to 3; the PSS of any one of InvPCC2-5 upon storage at 30° C. for 7 weeks was equal to 6.

Chemical Storage Stability (CSS)

The chemical storage stability (CSS) of the thermosetting powder coating composition of the present invention was determined on TPCC. The TPCC is tested on smoothness, $T_{peak\ curing}$ and $T_{onset\ curing}$. Smoothness is described under "Methods for the measurement of properties of the powder coatings derived upon heat-curing of the thermosetting powder coating compositions prepared herein". Smoothness is determined on panels prepared using freshly made powder and powder stored under controlled climatized conditions of 40° C. for 72 hours.

$T_{peak\ curing}$ and $T_{onset\ curing}$ were determined as described herein on freshly prepared powders, stored powder under controlled climatized conditions of 40° C. for 72 hours.

Methods for the Measurement of Properties of the Powder Coatings Derived Upon Heat-Curing of the Thermosetting Powder Coating Compositions Prepared Herein.

The properties of the powder coatings CompPC1-5 and InvPC1-5 derived upon heat-curing of their corresponding thermosetting powder coating compositions (CompPCC1-5 and InvPCC1-5) were measured on the panels that they were applied on (see also "Preparation of the powder coatings CompPC1-5 and InvPC1-5")

Smoothness (Flow)

Smoothness (or also known in the art as flow) of powder coatings derived upon cure of the corresponding heat-curable thermosetting powder coating compositions was determined by comparing the smoothness of the coating with PCI Powder Coating Smoothness panels (ACT Test Panels Inc., APR22163 (A) Batch: 50708816) at a thickness of approximately 80 µm. The rating of smoothness is from 1 to 10, with 1 representing the roughest coating and 10 representing the smoothest coating.

Acetone Double Rubs (ADR) of CompPC1-5 and Inv1-5, Said Powder Coatings were Derived Upon Heat Curing of the CompPCC1-5 and InvPCC1-5 Respectively, at 120° C. for 20 Min.

With one aceton double rub (ADR) is meant one continuous back and forward movement, in a cycle time of about one second, over the surface of a powder coating having a thickness of approximately 80 µm using a cotton cloth drenched in acetone, which cotton cloth covers a hammer head having a weight of about 980 grams and a contact surface area with the powder coating of about 2 cm$^2$. Every 10 rubs the cloth was drenched in acetone. The measurement was carried out at room temperature, and it was performed on coatings that were left at room temperature for 24-48 hours; the measurement was continued either till the coating was removed and the number of ADR at which the coating was removed was reported, or until 100 ADR were reached. A result reported as 100 ADR indicates that there was coating left after 100 ADR; in the exceptional case that the coating was removed at the 100$^{th}$ stroke, then this result is reported as 100/0 ADR.

In case in which one may wish to perform more than 100 ADR, he may do so by applying the same methodology and reporting as described in the case of performing a maximum of 100 ADR.

Each of the CompPC1-5 and InvPC1-5 powder coatings had 100 ADR (curing conditions of their corresponding powder coating compositions 120° C./20 min); therefore, inventive thermosetting powder coating compositions InvPCC1-5 were heat curable at low temperatures, thus being suitable for coating heat-sensitive articles.

Synthesis of Unsaturated Resins Comprising Ethylenic Unsaturations Said Resins being Amorphous Unsaturated Polyester Resin Comprising 2-Butenedioic Acid Ethylenic Unsaturations Table 1 presents the monomers used for the preparation of the unsaturated resins comprising ethylenic unsaturations said resins being amorphous unsaturated polyester resin comprising 2-butenedioic acid ethylenic unsaturations and the properties of said resins.

Amorphous (UR1-UR3) unsaturated polyesters comprising 2-butenedioic acid ethylenic unsaturations were prepared.

All unsaturated polyester resins comprising 2-butenedioic acid ethylenic unsaturations (UR1-UR3) prepared herein were solid at room temperature and at atmospheric pressure.

UR1

A reactor vessel fitted with a thermometer, a stirrer and a distillation device, was filled with a tin catalyst (butyl stannoic acid, 1.0 g) and the monomers for the first step (terephthalic acid (553.7 g; 3.33 mol), neopentylglycol (443.4 g; 4.26 mol) and trimethylol propan (44.1 g; 0.33 mol) as listed in Table 1. Stirring was then applied and a light nitrogen flow was passed over the reaction mixture while the temperature was raised to 220° C. Once the temperature reached 220° C., said temperature was maintained till an acid value of approximately 10 mg KOH/g resin and no water was being released. Subsequently, the reaction mixture was cooled down to 180° C.; once the temperature reached 180° C. fumaric acid (112.5 g; 0.97 mol) together with a small amount of radical inhibitor (2-t-butylhydroquinone, 0.1 g) was added at a temperature of 180° C. followed by esterification at 205° C. (second step). When an acid value of less than approximately 15 mg KOH/g resin was reached, the third step of the polyester preparation was carried out under reduced pressure at 205° C. till an acid value of approximately 5 mg KOH/g resin was reached. Vacuum was released and the reactor was cooled to 185° C. The acid value of the resin was brought below 5 mg KOH/g resin via reaction of the remaining acid-groups of the resin with 2,3-epoxy propyl neodecanoate (8.6 g). The reaction between epoxy and the acid groups of the resin continued for at least 30 minutes up until the resin reached an acid and hydroxyl value as disclosed in Table 1. Subsequently, the polyester was discharged onto an aluminum foil kept at room temperature.

UR2

A reactor vessel fitted with a thermometer, a stirrer and a distillation device, was filled with a tin catalyst (butyl stannoic acid, 1.0 g) and the monomers for the first step (terephthalic acid (631.6 g; 3.80 mol), trimethylol propane (45.1 g; 0.34 mol) and propylene glycol (362.2 g; 4.76 mol) as listed in Table 1. Stirring was then applied and a light nitrogen flow was passed over the reaction mixture while the temperature was raised to 220° C. Once the temperature reached 220° C., said temperature was maintained till an acid value of approximately 10 mg KOH/g resin and no water was being released. Subsequently, the reaction mixture was cooled down to 180° C.; once the temperature reached 180° C. fumaric acid (114.0 g; 0.92 mol) together with a small amount of radical inhibitor (2-t-butylhydroquinone, 0.1 g) was added at a temperature of 180° C. followed by esterification at 205° C. (second step). When an acid value of less than approximately 15 mg KOH/g resin was reached, the third step of the polyester preparation was carried out under reduced pressure at 205° C. till an acid value of approximately 5 mg KOH/g resin was reached. Vacuum was released and the reactor was cooled to 185° C. The acid value of the resin was brought below 5 mg KOH/g resin via reaction of the remaining acid-groups of the resin with 2,3-epoxy propyl neodecanoate (17.2 g). The reaction between epoxy and the acid groups of the resin continued for at least 30 minutes up until the resin reached an acid and hydroxyl value as disclosed in Table 1. Subsequently, the polyester was discharged onto an aluminum foil kept at room temperature.

UR3

A reactor vessel fitted with a thermometer, a stirrer and a distillation device, was filled with a tin catalyst (butyl stannoic acid, 1.0 g) and the monomers for the first step (isophthalic acid (320.1 g; 1.93 mol), neopentylglycol (314.5 g; 3.02 mol) and hydrogenated bisphenol A (270.1 g; 1.12 mol) as listed in Table 1. Stirring was then applied and a light nitrogen flow was passed over the reaction mixture while the temperature was raised to 220° C. Once the temperature reached 220° C., said temperature was maintained till an acid value of approximately 10 mg KOH/g resin and no water was being released. Subsequently, the reaction mixture was cooled down to 180° C.; once the temperature reached 180° C. fumaric acid (231.6 g; 2.0 mol) together with a small amount of radical inhibitor (2-t-butylhydroquinone, 0.1 g) was added at a temperature of 180° C. followed by esterification at 205° C. (second step). When an acid value of less than approximately 15 mg KOH/g resin was reached, the third step of the polyester preparation was carried out under reduced pressure at 205° C. till an acid value of approximately 5 mg KOH/g resin was reached. Vacuum was released and the reactor was cooled to 185° C. The acid value of the resin was brought below 5 mg KOH/g resin via reaction of the remaining acid-groups of the resin with 2,3-epoxy propyl neodecanoate (4.3 g). The reaction between epoxy and the acid groups of the resin continued for at least 30 minutes up until the resin reached an acid and hydroxyl value as disclosed in Table 1. Subsequently, the polyester was discharged onto an aluminum foil kept at room temperature.

Synthesis of Vinyl Functionalized Urethane Resins Said Resins being Vinyl Ether Functionalized Urethane Resins Amorphous and crystalline vinyl functionalized urethane resins (VFUR) were prepared and they were used as curing agents in the thermosetting powder coating compositions prepared herein.

Table 2 presents the monomers used for the preparation of VFUR1-VFUR3 and the properties of said resins.

VFUR1 and VFUR2 were crystalline vinyl functionalized urethane resins whilst VFUR3 was an amorphous vinyl functionalized urethane resin.

VFUR1 and VFUR2

A reaction vessel fitted with a thermometer and a stirrer, was filled with a tin catalyst (dibutyltin dilaurate, 0.1 g) and the monomers for the first step as listed in Tables 2. Stirring was then applied and a light nitrogen flow was passed over the reaction mixture while the temperature was raised to approximately 60° C. Subsequently, for the second step an isocyanate as listed in Tables 2 was dosed such that the reaction mixture was kept below 120° C. during addition. After all isocyanate was dosed, the temperature was kept or set at 120° C. and maintained at this temperature for approximately half an hour. The temperature was kept at 120° C. and vacuum was applied to remove all volatiles. After vacuum the content of the vessel was discharged.

VFUR3

A reaction vessel fitted with a thermometer, a stirrer and a distillation device for the removal of water formed during the synthesis, was filled with a tin catalyst (butyl stannoic acid, 0.5 g) and the monomers for the first step (except 4-hydroxybutyl vinyl ether) as listed in Tables 2. Stirring was then applied and a light nitrogen flow was passed over the reaction mixture while the temperature was raised to 220° C. The temperature was kept at 220° C. till an acid value of approximately 10 mg KOH/g resin was reached and till no water was released. Subsequently, the temperature was lowered to 120° C. and as last monomer of the first step the 4-hydroxybutyl vinyl ether and a tin catalyst (dibutyltin dilaurate, 0.5 g) were added at a temperature of 120° C. Subsequently, for the second step the isocyanate as listed in Tables 2 was dosed such that the reaction mixture was kept below 120° C. during addition. After all isocyanate was dosed, the temperature was kept or set at 120° C. and maintained at this temperature for approximately half an hour. The temperature was kept at 120° C. and vacuum was applied to remove all volatiles. After vacuum the content of the vessel was discharged.

Preparation of Thermosetting Powder Coating Compositions: General Procedure

Table 3 presents the compositions of the thermosetting powder coating compositions InvPCC1-5 and CompPCC1-5 along with their properties.

The components used to prepare the TPCC shown in Table 3 are described herein below: Unsaturated resins comprising ethylenic unsaturations, UR1-UR3;

Vinyl functionalized urethane resins, VFUR1-VFUR3;

Perkadox® L-W75 (supplied by AkzoNobel Polymer Chemicals) is a solid mixture of BPO and water wherein the amount of BPO is 75% w/w on the solid mixture; water is the carrier material for the BPO. Perkadox® L-W75 was used as the first thermal radical initiator in CompPCC1-5.

TC-R 3020 [supplied by AkzoNobel Polymer Chemicals; name of the product corresponds to experimental sample provided by AKZO], is a solid mixture of 4-MBPO and water wherein the amount of 4-MBPO is 75% w/w on the solid mixture; water is the carrier material for 4-MBPO. TC-R 3020 was used as the first thermal radical initiator in InvPCC1-5.

Kronos® 2310 (supplied by Kronos Titan GmbH) is titanium dioxide and was used as a pigment.

tert-butyl Hydroquinone (supplied by Sigma-Aldrich) was used as an inhibitor.

Resiflow® PV-5 (supplied by Worlée-Chemie GmbH) was used as a flow control agent.

Byk®-361 (supplied by Byk) was used as a flow control agent.

Martinal® ON310 (supplied by Martinswerk GmbH) is aluminum hydroxide [Al(OH)$_3$] and it was used as a filler.

Here, it needs to be stressed that the following pairs of examples of TPCC shown in Table 3 have an equivalent amount of moles of initiator per g of TPCC: InvPCC1 and CompPCC1; InvPCC2 and CompPCC2; InvPCC3 and CompPCC3; InvPCC4 and CompPCC4; InvPCC5 and CompPCC5.

The thermosetting powder coating compositions were prepared by first mixing in a blender the unsaturated resin comprising ethylenic unsaturation (UR) and the vinyl functionalized urethane resin used as curing agent, in a 90/10 ratio (UR/VFUR); said mixture was subsequently extruded in a PRISM TSE16 PC twin screw extruder at 120° C. with a screw speed of 200 rpm and a torque higher than 90%. The obtained extrudate of UR and VFUR was allowed to cool to room temperature and broken into chips. Subsequently, the extrudate of UR and VFUR was placed in a blender, together with all other paint components, including remaining VFUR, making the formulations as listed in Table 3; subsequently, the mixture obtained was extruded in a PRISM TSE16 PC twin screw extruder at 65° C. with a screw speed of 200 rpm and a torque higher than 90%. The extrudate was allowed to cool at room temperature and broken into chips. These chips were then ground in an ultra-centrifugal mill at 14,000 rpm and sieved in a Retsch ZM100 sieve. The sieve fraction with particle size below 90 µm was collected (by means of a Fritsch Analysette Spartan sieving apparatus equipped with a 90 micron sieve, sieving performed for 15 minutes at 2.5 mm amplitude) and used in the Examples.

Preparation of the Powder Coatings CompPC1-5 and InvPC1-5

The thermosetting powder coating compositions CompPCC1-5, and InvPCC1-5 prepared herein were electrostatically sprayed (corona spray gun, 60 kV) onto aluminium test panels (type AL36 test panels) at room temperature to yield a coating thickness upon curing of 80±5 µm and cured at 120° C. for 10 minutes in an air-circulation oven (Heraeus Instruments UT6120) affording white colored powder coatings CompPC1-5 and InvPC1-5, respectively.

Unless otherwise stated (see Acetone Double Rubs (ADR) of CompPC1-5 and Inv1-5), the curing conditions (120° C. for 10 minutes in an air-circulation oven) of the CompPCC1-5 and InvPCC1-5 were those at which the properties of the CompPC1-5 and InvPC1-5 were assessed.

TABLE 1

Composition and characterization of the unsaturated resins comprising ethylenic unsaturations, each of which is an unsaturated polyester resin comprising 2-butenedioic acid ethylenic unsaturations.

| UR | UR1 | UR2 | UR3 |
|---|---|---|---|
| Monomers first step | | | |
| Isophthalic acid (mol) | | | 1.93 |
| Terephthalic acid (mol) | 3.33 | 3.80 | |
| Neopentylglycol (mol) | 4.26 | | 3.02 |
| Trimethylol propane (mol) | 0.33 | 0.34 | |
| 1,2-propylene glycol (mol) | | 4.76 | |
| Hydrogenated bisphenol A (mol) | | | 1.12 |
| Monomers second step | | | |
| Fumaric acid (mol) | 0.97 | 0.98 | 2.00 |
| Total (mol) | 8.89 | 9.88 | 8.07 |
| Monomers first step | | | |
| Isophthalic acid (g) | | | 320.1 |
| Terephthalic acid (g) | 553.7 | 631.6 | |
| Neopentylglycol (g) | 443.4 | | 314.5 |
| Trimethylol propane (g) | 44.1 | 45.1 | |
| 1,2-propylene glycol (g) | | 362.2 | |
| Hydrogenated bisphenol A (g) | | | 270.1 |
| Monomers second step | | | |
| Fumaric acid (g) | 112.5 | 114.0 | 231.6 |
| Total weight (g) | 1153.7 | 1152.9 | 1136.3 |
| Water formed during synthesis (g) | 153.7 | 152.9 | 136.3 |
| Weight (g) of UR produced | 1000.0 | 1000.0 | 1000.0 |
| Characterisation of UR | | | |
| Amorphous or crystalline | amorphous | amorphous | amorphous |
| Theoretical values | | | |
| AV (mg KOH/g UR) | 5.0 | 5.0 | 5.0 |
| OHV (mg KOH/g UR) | 55.3 | 59.9 | 29.9 |
| Functionality (f) | 2.9 | 2.8 | 2.0 |
| $M_n$ (Da) | 2723 | 2458 | 3214 |
| WPU (g/mol) | 1028 | 1000 | 500 |
| Measured values | | | |
| WPU (g/mol) | 1130 | 1116 | 536 |
| $T_g$ (° C.) | 47 | 55 | 53 |
| Viscosity (Pa · s) @ 160° C. | 21.2 | 45.1 | 41.1 |
| AV (mg KOH/g UR) | 3.1 | 1.0 | 4.7 |
| OHV (mg KOH/g UR) | 42.7 | 52.6 | 35.7 |

TABLE 2

Composition and characterization of the vinyl functionalized urethane resins used as curing agents in the TPCC shown in the Examples; each of the vinyl functionalized urethane resins shown herein is a vinyl ether functionalized urethane resins)

| VFUR | VFUR1 | VFUR2 | VFUR3 |
|---|---|---|---|
| Monomers first step | | | |
| Isophthalic acid (mol) | | | 1.00 |
| Neopentylglycol (mol) | | | 1.00 |
| Hydrogenated bisphenol A (mol) | | | 1.00 |
| Hexane diol (mol) | | 0.53 | |
| 4-Hydroxylbutyl vinyl ether (mol) | 5.00 | 4.25 | 2.00 |
| Monomers second step | | | |
| Isophorone diisocyanate (mol) | | | 2.00 |
| Hexamethylene diisocyanate (mol) | 2.50 | 2.64 | |
| Total (mol) | 7.50 | 7.42 | 7.00 |
| Total weight (g) | 1000.0 | 1000.0 | 1187.6 |
| Water formed during synthesis (g) | | | 36.1 |
| Weight (g) of VFUR produced | 1000.0 | 1000.0 | 1151.5 |
| Characterisation of VFUR | | | |
| Amorphous or crystalline | crystalline | crystalline | amorphous |
| Theoretical values | | | |
| $M_n$ (Da) | 400 | 470 | 1152 |
| WPU (g/mol) | 200 | 237 | 576 |
| Measured values | | | |
| WPU (g/mol) | 202 | 223 | 623 |
| $T_g$ (° C.) | n.r. | n.r. | 41 |
| $T_c$ (° C.) | 76 | 78 | n.a. |
| $\Delta H_c$ (J/g) | 153 | 161 | n.a. |
| $T_m$ (° C.) | 99 | 96 | n.a. |
| $\Delta H_m$ (J/g) | 158 | 153 | n.a. |
| Viscosity (Pa · s) @ 160° C. | <0.1 | <0.1 | 3.9 |
| AV (mg KOH/g VFUR) | 0.0 | 0.0 | 0.5 |
| OHV (mg KOH/g VFUR) | 0.0 | 0.0 | 1.0 |

TABLE 3

Composition and properties of comparative and inventive thermosetting powder coating compositions and powder coatings thereof.

| | InvPCC1 | CompPCC1 | InvPCC2 | CompPCC2 | InvPCC3 | CompPCC3 | InvPCC4 | CompPCC4 | InvPCC5 | CompPCC5 |
|---|---|---|---|---|---|---|---|---|---|---|
| Thermosetting Powder Coating Composition (TPPC) | | | | | | | | | | |
| UR1 (g) | 74.3 | 74.3 | | | | | | | | |
| UR2 (g) | | | 81.0 | 81.0 | 81.0 | 81.0 | | | | |
| UR3 (g) | | | | | | | 72.9 | 72.9 | 72.9 | 72.9 |
| VFUR1 (g) | | | | | | | 27.1 | 27.1 | 27.1 | 27.1 |
| VFUR2 (g) | | | 19.0 | 19.0 | 19.0 | 19.0 | | | | |
| VFUR3 (g) | 25.7 | 25.7 | | | | | | | | |
| Perkadox L-W75 (contains BPO) (g) | | 3.0 | | 6.5 | | 6.5 | | 3.2 | | 3.2 |
| TC-R-3020 (contains 4-MBPO) (g) | 3.3 | | 7.2 | | 7.2 | | 3.6 | | 3.6 | |
| Kronos 2310 (g) | | | 50.0 | 50.0 | 50.0 | 50.0 | 50.0 | 50.0 | 49.9 | 49.9 |
| tert-butyl hydroquinone (g) | 0.050 | 0.050 | 0.025 | 0.025 | 0.025 | 0.025 | 0.025 | 0.025 | 0.025 | 0.025 |
| Resiflow PV5 (g) | | | 2.0 | 2.0 | 2.0 | 2.0 | 2.0 | 2.0 | 2.0 | 2.0 |
| Byk-361 (g) | 0.5 | 0.5 | | | | | | | | |
| Martinal ON310 (g) | | | 20.1 | 20.1 | 20.0 | 20.0 | | | 40.0 | 40.0 |
| Lanco TF1830 (g) | | | | | 1.5 | 1.5 | | | | |
| Total amount (g) of UR and VFUR | 100.0 | 100.0 | 100.0 | 100.0 | 100.0 | 100.0 | 100.0 | 100.0 | 100.0 | 100.0 |
| Total amount (g) of the TPCC | 103.9 | 103.6 | 179.3 | 178.5 | 180.7 | 180.0 | 155.6 | 155.2 | 195.6 | 195.2 |
| Amount of thermal radical initiator (pph) | 2.47 | 2.25 | 5.40 | 4.87 | 5.40 | 4.87 | 2.70 | 2.40 | 2.70 | 2.40 |
| Amount of thermal radical initiator (mmol/Kg UR + VFUR) | 92 | 92 | 200 | 200 | 200 | 200 | 100 | 100 | 100 | 100 |
| Properties of TPCC | | | | | | | | | | |
| Tg (° C.) | 44 | 42 | 44 | 42 | 44 | 39 | 43 | 46 | 44 | 47 |
| Extrudable | Yes | Yes | Yes | Yes | Yes | Yes | Yes | Yes | Yes | Yes |

TABLE 3-continued

Composition and properties of comparative and inventive thermosetting powder coating compositions and powder coatings thereof.

| | InvPCC1 | CompPCC1 | InvPCC2 | CompPCC2 | InvPCC3 | CompPCC3 | InvPCC4 | CompPCC4 | InvPCC5 | CompPCC5 |
|---|---|---|---|---|---|---|---|---|---|---|
| Heat curable at low temperature | Yes | Yes | Yes | Yes | Yes | Yes | Yes | Yes | Yes | Yes |
| Sensitivity of TPCC to surface air inhibition (S) | 0.95 | 1.41 | 0.83 | 1.09 | 0.77 | 1.26 | 1.16 | 1.41 | 1.24 | 1.64 |
| PSS upon storage at 23° C. for 7 weeks | 8 | 6 | 8 | 6 | 8 | 6 | 8 | 6 | 8 | 6 |
| $\Delta H_{curing}$ (J/g) (associated to reactivity) | 59 | 51 | 82 | 77 | 82 | 74 | 101 | 91 | 81 | 75 |

As it can be noticed from Table 3, the following pairs of examples of TPCC shown in Table 3 have an equal amount of moles of thermal radical initiator:
 a) InvPCC1 and CompPCC1 [amount of thermal radical initiator 92 mmol/kg UR1+VFUR3];
 b) InvPCC2 and CompPCC2 [amount of thermal radical initiator 200 mmol/kg UR2+VFUR2]
 c) InvPCC3 and CompPCC3 [amount of thermal radical initiator 200 mmol/kg UR2+VFUR2];
 d) InvPCC4 and CompPCC4 [amount of thermal radical initiator 100 mmol/kg UR3+VFUR1];
 e) InvPCC5 and CompPCC5 [amount of thermal radical initiator 100 mmol/kg UR3+VFUR1].

In the context of this invention, and in order to assess the various properties mentioned herein, the CompPCC1 was the comparable TPCC composition, for the InvPCC1, because said CompPCC1 comprised BPO instead of MBPO as a first thermal radical initiator and moreover the amount of moles BPO in the CompPCC1 was equal to the amount of moles MBPO in the InvPCC1; as per the rest of the components of each of the CompPCC1 and InvPCC1, said components were the same and contained in the same amounts in each of said compositions. Equally, CompPCC2 was the comparable TPCC composition for the InvPCC2; CompPCC3 was the comparable TPCC composition for the InvPCC3; CompPCC4 was the comparable TPCC composition for the InvPCC4; CompPCC5 was the comparable TPCC composition for the InvPCC5.

Each of InvPCC1-5 and CompPCC1-5 were heat curable at low temperatures since their corresponding powder coatings (InvPC1-5 and CompPC1-5) derived upon curing of the InvPCC1-5 and CompPCC1-5 at 120° C. for 20 min, had 100 ADR.

In addition to the results on properties shown in Table 3, the CSS of CompPCC1 and InvPCC1 were assessed according to the method described herein,
The CSS results of CompPCC1 were:
Onset temperature prior to storage: 111° C.
Onset temperature upon storage: 114° C.
Peak temperature prior to storage: 121° C.
Peak temperature upon storage: 123° C.
The smoothness (flow) of CompPC1 was not affected by the storage at 40° C. for 72 hours; the smoothness of CompPC1 prior to storage (40° C. for 72 hours) was PCI 2 and it remained PCI 2 upon storage (40° C. for 72 hours).
Here, it needs to be stressed that CompPCC1 is a duplicate of example 3.3 (Table 7) disclosed in WO 2010/052293.
The CSS results of InvPCC1 were:
Onset temperature prior to storage: 110° C.
Onset temperature upon storage: 110° C.
Peak temperature prior to storage: 117° C.
Peak temperature upon storage: 117° C.
The smoothness (flow) of InvPC1 was not affected by the storage at 40° C. for 72 hours; the smoothness of InvPC1 prior to storage (40° C. for 72 hours) was PCI 2 and it remained PCI 2 upon storage (40° C. for 72 hours).
From these CSS data it becomes clear that the change in $T_{onset\ curing}$ of the InvPCC1 before and after storage at 40° C. for 72 hours, was lower than the change in $T_{onset\ curing}$ of CompPCC1; thus InvPCC1 had enhanced CSS over the CompPCC1.

In view of the results shown in Table 3 and the results regarding the CSS, only the thermosetting powder coating compositions according to the invention of claim 1 (InvPCC1-5) surprisingly combined an array of properties such as said:
 i) thermosetting powder coating compositions were heat curable;
 ii) thermosetting powder coating compositions were less susceptible to surface air inhibition without the need for waxes or oxygen-reactive curatives, since each of the InvPCC1-5 had significantly lower S values when compared to the S values of their comparable CompPCC1-5; more specifically:
   a) the S value for the InvPCC1 was 67.4% of the S value for the CompPCC1;
   b) the S value for the InvPCC2 was 76.1% of the S value for the CompPCC2;
   c) the S value for the InvPCC3 was 61.1% of the S value for the CompPCC3;
   d) the S value for the InvPCC4 was 82.3% of the S value for the CompPCC4;
   e) the S value for the InvPCC5 was 75.6% of the S value for the CompPCC5;
 iii) thermosetting powder coating compositions had enhanced chemical storage stability (for reasons explained herein above);
 iv) thermosetting powder coating compositions had enhanced physical storage stability since each of the InvPCC1-5 had higher PSS values when compared to the PSS values of their comparable CompPCC1-5 (see definition for "enhanced physical storage stability");
 v) thermosetting powder coating compositions were extrudable;
 vi) thermosetting powder coating compositions were heat curable at low temperatures, thus they were suitable for coating heat-sensitive articles;
 vii) thermosetting powder coating compositions had enhanced reactivity since each of the InvPCC1-5 had higher $\Delta H_{curing}$ values when compared to the $\Delta H_{curing}$ values of their comparable CompPCC1-5 (see definition for "enhanced reactivity").

Especially, the unique combination of properties ii), iii), iv), v), vi) and vii) achieved by the thermosetting powder coating compositions according to the invention of claim 1 was particularly surprising, contributing at the same time a great deal in the advancement of technology of thermosetting powder coatings.

Therefore, as it can be seen from the Examples in Table 3 and the CSS results thermosetting powder coating compositions combining the array of properties i)-vii) mentioned in the preceding paragraph, can only be prepared from a thermosetting powder coating composition according to claim 1.

The invention claimed is:

1. A thermosetting powder coating composition comprising:
   (A) an unsaturated resin comprising ethylenic unsaturations (UR), that is an unsaturated polymer having i) and ii):
      i) a theoretical number average molecular weight (Mn) of at least 200 and at most 20000 Da, and
      ii) ethylenic unsaturations which are cis- or trans-configured reactive carbon-carbon double bond unsaturations and do not include aromatic unsaturations, carbon-carbon triple bonds, carbon-heteroatom unsaturations; wherein
      the UR is selected from the group consisting of polyester resins, acrylic resins, polyurethanes, epoxy resins, polyamides, polyesteramides, polycarbonates, polyureas and mixtures thereof; and
   (B) a thermal radical initiator comprising a first thermal radical initiator, wherein
   the first thermal radical initiator is a methyl-substituted benzoyl peroxide.

2. The thermosetting powder coating composition according to claim 1, wherein the first thermal radical initiator is selected from the group consisting of bis-(2-methylbenzoyl)-peroxide, bis-(3-methylbenzoyl)-peroxide, bis-(4-methylbenzoyl)-peroxide, (2-methylbenzoyl, 3-methylbenzoyl)-peroxide, (2-methylbenzoyl, 4-methylbenzoyl)-peroxide, (3-methylbenzoyl, 4-methylbenzoyl)-peroxide and mixtures thereof.

3. The thermosetting powder coating composition according to claim 1, wherein the first thermal radical initiator is selected from the group consisting of bis-(4-methylbenzoyl)-peroxide, (2-methylbenzoyl, 4-methylbenzoyl)-peroxide, (3-methylbenzoyl, 4-methylbenzoyl)-peroxide and mixtures thereof.

4. The thermosetting powder coating composition according to claim 1, wherein the first thermal radical initiator is bis-(4-methylbenzoyl)-peroxide.

5. The thermosetting powder coating composition according to claim 1, wherein the amount of thermal radical initiator is at least 0.1 and at most 20 pph.

6. The thermosetting powder coating composition according to claim 1, wherein the amount of thermal radical initiator is at least 0.1 and at most 15.2 pph.

7. The thermosetting powder coating composition according to claim 1, wherein the amount of thermal radical initiator is at least 2 and at most 9 pph.

8. The thermosetting powder coating composition according to claim 1, wherein the thermal radical initiator comprises the first thermal radical initiator in an amount of at least 10% w/w based on the total amount of the thermal radical initiator.

9. The thermosetting powder coating composition according to claim 1, wherein the thermal radical initiator comprises the first thermal radical initiator in an amount of at least 50% w/w based on the total amount of the thermal radical initiator.

10. The thermosetting powder coating composition according to claim 1, wherein the thermal radical initiator comprises the first thermal radical initiator in an amount of at least 90% w/w based on the total amount of the thermal radical initiator.

11. The thermosetting powder coating composition according to claim 1, wherein the UR is selected from the group consisting of polyester resins, polyurethanes, polyamides, polyesteramides, polyureas and mixtures thereof.

12. The thermosetting powder coating composition according to claim 1, wherein the ethylenic unsaturations of the UR are di-acid ethylenic unsaturations.

13. The thermosetting powder coating composition according to claim 1, wherein the UR is an unsaturated polyester resin comprising ethylenic unsaturations.

14. The thermosetting powder coating composition according to claim 1, wherein the UR is an unsaturated polyester resin comprising di-acid ethylenic unsaturations.

15. The thermosetting powder coating composition according to claim 1, wherein the UR is an unsaturated polyester resin comprising 2-butenedioic acid ethylenic unsaturations.

16. The thermosetting powder coating composition according to claim 1, further comprising: (C) a curing agent and/or (D) an accelerator and/or (E) a co-accelerator and/or (F) an inhibitor.

17. The thermosetting powder coating composition according to claim 16, wherein the amount of inhibitor is at least 0.025 and at most 0.20 pph.

18. The thermosetting powder coating composition according to claim 16, wherein the curing agent is a vinyl functionalized urethane resin selected from the group consisting of vinyl ether functionalized urethane resin, vinyl ester functionalized urethane resin and mixtures thereof.

19. The thermosetting powder coating composition according to claim 16, wherein the curing agent is a vinyl ether functionalized urethane resin.

20. The thermosetting powder coating composition according to claim 1, wherein
   the UR is an unsaturated polyester resin comprising di-acid ethylenic unsaturations, and
   the first thermal radical initiator is bis-(4-methylbenzoyl)-peroxide and
   the amount of thermal radical initiator is at least 0.1 and at most 15.2 pph, and
   the thermal radical initiator comprises the first thermal radical initiator in an amount of at least 50% w/w based on the total amount of the thermal radical initiator.

21. The thermosetting powder coating composition according to claim 20, further comprising:
   (C) a curing agent, said curing agent being a vinyl ether functionalized urethane resin, and
   (D) an inhibitor.

22. A process for making a thermosetting powder coating composition as defined in claim 1, comprising the steps of:
   (a) mixing the components of the thermosetting powder coating composition to obtain a premix;
   (b) heating the premix in an extruder, to obtain an extrudate;
   (c) cooling down the extrudate to obtain a solidified extrudate; and (d) grinding the solidified extrudate into smaller particles to obtain the thermosetting powder coating composition.

23. A cured thermosetting powder coating composition derived upon curing of a thermosetting powder coating composition as defined in claim 1.

24. An article having coated thereon a thermosetting powder coating composition as defined in claim 1.

25. An article having coated and cured thereon a thermosetting powder coating composition as defined in claim 1.

26. A process for making a coated article comprising the steps of:
(a) applying a thermosetting powder coating composition as defined in claim 1 to an article; and
(b) heating and/or radiating the thermosetting powder coating composition for enough time and at a suitable temperature to cure the thermosetting powder coating composition and thereby obtain the coated article.

27. The thermosetting powder coating composition according to claim 1, wherein the composition is a powder coating composition is applied as a powder coating in an application selected from the group consisting of heat-sensitive articles, non-heat-sensitive articles, 3D-printing applications, automotive applications, marine applications, aerospace applications, medical applications, defense applications, sports/recreational applications, architectural applications, bottling applications, household applications, machinery applications, can applications, coil applications, energy applications, textile applications and electrical applications.

28. The thermosetting powder coating composition according to claim 3, wherein the amount of thermal radical initiator is at least 0.1 and at most 20 pph.

29. The thermosetting powder coating composition according to claim 3, wherein the amount of thermal radical initiator is at least 0.1 and at most 15.2 pph.

30. The thermosetting powder coating composition according to claim 3, wherein the amount of thermal radical initiator is at least 2 and at most 9 pph.

31. The thermosetting powder coating composition according to claim 4, wherein the amount of thermal radical initiator is at least 0.1 and at most 20 pph.

32. The thermosetting powder coating composition according to claim 4, wherein the amount of thermal radical initiator is at least 0.1 and at most 15.2 pph.

33. The thermosetting powder coating composition according to claim 4, wherein the amount of thermal radical initiator is at least 2 and at most 9 pph.

34. The thermosetting powder coating composition according to claim 3, wherein the thermal radical initiator comprises the first thermal radical initiator in an amount of at least 90% w/w based on the total amount of the thermal radical initiator.

35. The thermosetting powder coating composition according to claim 4, wherein the thermal radical initiator comprises the first thermal radical initiator in an amount of at least 90% w/w based on the total amount of the thermal radical initiator.

36. The thermosetting powder coating composition according to claim 3, further comprising: (C) a curing agent and/or (D) an accelerator and/or (E) a co-accelerator and/or (F) an inhibitor.

37. The thermosetting powder coating composition according to claim 4, further comprising: (C) a curing agent and/or (D) an accelerator and/or (E) a co-accelerator and/or (F) an inhibitor.

38. The thermosetting powder coating composition according to claim 36, wherein the amount of inhibitor is at least 0.025 and at most 0.20 pph.

39. The thermosetting powder coating composition according to claim 37, wherein the amount of inhibitor is at least 0.025 and at most 0.20 pph.

40. A cured thermosetting powder coating composition derived upon curing of a thermosetting powder coating composition as defined in claim 3.

41. A cured thermosetting powder coating composition derived upon curing of a thermosetting powder coating composition as defined in claim 4.

42. A cured thermosetting powder coating composition derived upon curing of a thermosetting powder coating composition as defined in claim 20.

43. A cured thermosetting powder coating composition derived upon curing of a thermosetting powder coating composition as defined in claim 21.

44. A cured thermosetting powder coating composition derived upon curing of a thermosetting powder coating composition as defined in claim 20, wherein the amount of inhibitor is at least 0.025 and at most 0.20 pph.

45. A cured thermosetting powder coating composition derived upon curing of a thermosetting powder coating composition as defined in claim 21, wherein the amount of inhibitor is at least 0.025 and at most 0.20 pph.

46. The thermosetting powder coating composition according to claim 20, wherein the composition is applied in an application selected from the group consisting of heat-sensitive articles, non-heat-sensitive articles, 3D-printing applications, automotive applications, marine applications, aerospace applications, medical applications, defense applications, sports/recreational applications, architectural applications, bottling applications, household applications, machinery applications, can applications, coil applications, energy applications, textile applications and electrical applications.

* * * * *